United States Patent
Park et al.

(10) Patent No.: US 11,638,285 B2
(45) Date of Patent: Apr. 25, 2023

(54) METHOD AND APPARATUS FOR CONTROL AND DATA INFORMATION RESOURCE MAPPING IN WIRELESS CELLULAR COMMUNICATION SYSTEM

(71) Applicant: Samsung Electronics Co., Ltd., Gyeonggi-do (KR)

(72) Inventors: Sungjin Park, Incheon (KR); Jeongho Yeo, Gyeonggi-do (KR); Jinyoung Oh, Seoul (KR); Taehan Bae, Seoul (KR); Younsun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/491,450

(22) PCT Filed: Mar. 7, 2018

(86) PCT No.: PCT/KR2018/002689
§ 371 (c)(1),
(2) Date: Sep. 5, 2019

(87) PCT Pub. No.: WO2018/164474
PCT Pub. Date: Sep. 13, 2018

(65) Prior Publication Data
US 2020/0037350 A1    Jan. 30, 2020

(30) Foreign Application Priority Data

Mar. 8, 2017 (KR) .................... 10-2017-0029445
Jun. 14, 2017 (KR) .................... 10-2017-0074648

(51) Int. Cl.
*H04W 72/12*    (2023.01)
*H04W 72/04*    (2023.01)
(Continued)

(52) U.S. Cl.
CPC ....... *H04W 72/1289* (2013.01); *H04L 1/1861* (2013.01); *H04L 5/0007* (2013.01);
(Continued)

(58) Field of Classification Search
CPC ............. H04W 72/1289; H04W 76/27; H04W 72/042; H04W 28/00; H04W 72/04;
(Continued)

(56) References Cited

U.S. PATENT DOCUMENTS 11,212,059 B2    12/2021 Oh et al.
2010/0215004 A1    8/2010 Yoo
(Continued)

FOREIGN PATENT DOCUMENTS

KR    1020100124677    11/2010
KR    1020110122046    11/2011
(Continued)

OTHER PUBLICATIONS

Yang et al., "LTE Physical Layer Performance Analysis," NISTIR 7986, NIST National Institute of Standards Technology, U.S. Department of Commerce, May 2014, pp. 1-18 (Year: 2014).*
(Continued)

*Primary Examiner* — Un C Cho
*Assistant Examiner* — Lalita W Pace
(74) *Attorney, Agent, or Firm* — The Farrell Law Firm, P.C.

(57) ABSTRACT

The present disclosure relates to a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, healthcare, digital education, retail, security and safety related services, and the like) on the basis of
(Continued)

5G communication technology and IoT-related technology. The present invention provides a method for constituting the corresponding information, in a situation that a specific type service influences (interference in a wireless communication environment) on other types of services or the same type of service, into control information so as to transfer the control information from a base station to a terminal. The terminal receives the information through a control channel and can adapt a data reception method by utilizing the same.

16 Claims, 33 Drawing Sheets

(51) Int. Cl.
*H04W 76/27* (2018.01)
*H04L 1/1829* (2023.01)
*H04L 5/00* (2006.01)
(52) U.S. Cl.
CPC ......... *H04L 5/0053* (2013.01); *H04W 72/042* (2013.01); *H04W 76/27* (2018.02)
(58) Field of Classification Search
CPC .... H04W 72/12; H04L 1/1861; H04L 5/0007; H04L 5/0053; H04L 5/0094; H04L 5/0044
See application file for complete search history.

(56) References Cited

U.S. PATENT DOCUMENTS

| | | | |
|---|---|---|---|
| 2012/0051319 A1 | 3/2012 | Kwon et al. | |
| 2013/0044713 A1 | 2/2013 | Suh et al. | |
| 2013/0051356 A1 | 2/2013 | Hong et al. | |
| 2014/0133395 A1 | 5/2014 | Nam et al. | |
| 2014/0233518 A1* | 8/2014 | Lee | H04W 72/082 370/329 |
| 2015/0180625 A1 | 6/2015 | Park et al. | |
| 2015/0208394 A1 | 7/2015 | Seo et al. | |
| 2015/0256307 A1* | 9/2015 | Nagata | H04L 5/0035 370/328 |
| 2015/0341920 A1* | 11/2015 | Chmiel | H04L 5/001 370/329 |
| 2015/0341949 A1* | 11/2015 | Nagata | H04L 1/0013 370/329 |
| 2016/0174194 A1* | 6/2016 | Suzuki | H04L 5/0091 370/312 |
| 2016/0198443 A1* | 7/2016 | Chen | H04W 72/085 370/329 |
| 2017/0013626 A1 | 1/2017 | Nan et al. | |
| 2018/0092081 A1* | 3/2018 | Chen | H04W 16/14 |
| 2018/0109353 A1 | 4/2018 | Kwak et al. | |
| 2018/0131473 A1 | 5/2018 | Moon et al. | |
| 2018/0310283 A1* | 10/2018 | Deenoo | H04W 72/042 |
| 2018/0332566 A1* | 11/2018 | You | H04L 1/0091 |
| 2019/0116009 A1* | 4/2019 | Yum | H04L 5/0094 |
| 2019/0149309 A1* | 5/2019 | Kuang | H04L 5/0037 370/329 |
| 2019/0191443 A1* | 6/2019 | Sano | H04W 72/10 |
| 2019/0379491 A1* | 12/2019 | Kilinc | H04L 1/1896 |
| 2020/0127763 A1* | 4/2020 | Yasukawa | H04W 72/12 |
| 2022/0271898 A1 | 8/2022 | Yum et al. | |

FOREIGN PATENT DOCUMENTS

| | | |
|---|---|---|
| KR | 1020120000482 | 1/2012 |
| KR | 1020160055072 | 5/2016 |
| KR | 1020160121405 | 10/2016 |
| KR | 1020160132454 | 11/2016 |
| KR | 1020180047886 | 5/2018 |
| WO | WO 2014/010911 | 1/2014 |
| WO | WO 2014/035085 | 3/2014 |
| WO | WO 2016/208991 | 12/2016 |

OTHER PUBLICATIONS

NTT Docomo et al., "Views on Common PDCCH", R1-1702807, 3GPP TSG RAN WG1 Meeting #88, Feb. 13-17, 2017, 5 pages.
European Search Report dated Jan. 29, 2020 issued in counterpart application No. 18764483.6-1205, 8 pages.
PCT/ISA/210 Search Report issued on PCT/KR2018/002689, pp. 5.
PCT/ISA/237 Written Opinion issued on PCT/KR2017/002689, pp. 6.
Nokia et al.,"On the Signalling Support for Forward Compatibility", R1-1703195, 3GPP TSG-RAN WG1 Meeting #88, Feb. 13-17, 2017, 4 pages.
Samsung, "Summary of E-mail Discussions on Multiplexing eMBB and URLLC in DL", R1-1700972, TSG-RAN WG1 NR Ad-hoc Meeting, Jan. 16-20, 2017, 23 pages.
Korean Office Action dated Mar. 18, 2021 issued in counterpart application No. 10-2017-0074648, 10 pages.
Nokia, Alcatel-Lucent Shanghai Bell, "On the Signalling Support for Forward Compatibility", R1-1701053, 3GPP TSG-RAN WG1#NR, Jan. 16-20, 2017, 4 pages.
Nokia, Alcatel-Lucent Shanghai Bell, On LTE and NR Coexistence on the Same Frequency, R1-1701055, 3GPP TSG-RAN WG1#NR, Jan. 16-20, 2017, 5 pages.
Korean Office Action dated Aug. 2, 2021 issued in counterpart application No. 10-2017-0074648, 7 pages.
Indian Examination Report dated Jan. 19, 2022 issued in counterpart application No. 201937035727, 6 pages.
U.S. Office Action dated Oct. 26, 2022 issued in counterpart U.S. Appl. No. 17/511,127, 30 pages.
Chinese Office Action dated Feb. 15, 2023 issued in counterpart application No. 201880016829.7, 17 pages.
European Search Report dated Feb. 7, 2023 issued in counterpart application No. 22203521.4-1213, 8 pages.

* cited by examiner

METHOD AND APPARATUS FOR CONTROL AND DATA INFORMATION RESOURCE MAPPING IN WIRELESS CELLULAR COMMUNICATION SYSTEM

PRIORITY

This application is a National Phase Entry of PCT International Application No. PCT/KR2018/002689 which was filed on Mar. 7, 2018, and claims priority to Korean Patent Application Nos. 10-2017-0029445 and 10-2017-0074648, which were filed on Mar. 8, 2017 and Jun. 14, 2017, respectively, the content of each of which is incorporated herein by reference.

TECHNICAL FIELD

The disclosure relates to a wireless communication system and, more particularly, to a method and apparatus for control and data information transmission in a wireless communication system.

BACKGROUND ART

To meet the demand for wireless data traffic having increased since the commercialization of 4G communication systems, efforts have been made to develop an improved 5G or pre-5G communication system. For this reason, the 5G or pre-5G communication system is also called a "beyond 4G network communication system" or a "post-LTE system". In order to achieve a high data transfer rate, the 5G communication system is considered to be implemented in an ultra-high frequency (millimeter Wave (mmWave)) band (e.g., 60 GHz band). In order to reduce the path loss of radio waves and increase the transmission distance thereof in the mmWave band, techniques, such as beamforming, massive multiple-input multiple-output (MIMO), full-dimensional MIMO (FD-MIMO), array antenna, analog beam-forming, and large scale antenna, are under discussion in the 5G communication system. Also, in order to improve a network of a system, the development of techniques, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, has been conducted in the 5G communication system. In addition, hybrid frequency shift keying (FSK) and quadrature amplitude modulation (QAM) modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access techniques, have been developed in the 5G system.

Meanwhile, the Internet, which is a human centered connectivity network where humans generate and consume information, is now evolving to the Internet of things (IoT) where distributed entities, such as things, exchange and process information without human intervention. The Internet of everything (IoE) technology, which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart homes, smart buildings, smart cities, smart cars or connected cars, smart grids, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas which are the 5G communication technology. Application of a cloud RAN as the above-described big data processing technology may also be considered to be as an example of convergence between the 5G technology and the IoT technology.

As described above, a plurality of services can be provided to a user in the communication system, and there is a need for a method and apparatus that can provide each service within the same time interval in accordance with the characteristics to provide the plurality of services to the user.

DISCLOSURE OF INVENTION

Technical Problem

Therefore, the disclosure has been made in view of the above-mentioned problems, and an aspect of the disclosure is to provide a method and apparatus for simultaneously providing different types (or the same type) of services. The disclosure also provides a method for configuring corresponding information as control information and transmitting the configured information from a base station to a terminal in a situation where a specific type of service affects other types of services or services of the same type.

Solution to Problem

In accordance with an aspect of the disclosure, there is provided a method for receiving data by a terminal, including: receiving information indicating a resource to which important information is mapped from a base station; receiving downlink control information scheduling downlink data from the base station; determining a resource to which the downlink data is mapped on the basis of the information indicating the resource to which the important information is mapped; and receiving the downlink data from the base station on the basis of the determining. Also, the information indicating the resource to which the important information is mapped may be received by radio resource control (RRC) signaling. Also, the information indicating the resource to which the important information is mapped may indicate a reference signal resource. Also, when resource mapping information is included in the downlink control information, the determining may be performed on the basis of the information indicating the resource to which the important information is mapped and the resource mapping information.

In accordance with another aspect of the disclosure, there is provided a method for transmitting data by a base station, including: transmitting information indicating a resource to which important information is mapped to a terminal; transmitting downlink control information scheduling downlink data to the terminal; determining a resource to which the downlink data is transmitted on the basis of the information indicating the resource to which the important information is mapped; and transmitting the downlink data to the terminal on the basis of the determining.

In accordance with another aspect of the disclosure, there is provided a terminal for receiving data, including: a transmission/reception unit; and a processing unit configured to be connected to the transmission/reception unit that receives information indicating a resource to which important information is mapped from a base station, receives downlink control information scheduling downlink data from the base station, determines a resource to which the downlink data is mapped on the basis of the information indicating the resource to which the important information is mapped, and receives the downlink data from the base station on the basis of the determining.

In accordance with another aspect of the disclosure, there is provided a base station for transmitting data, including: a transmission/reception unit; and a processing unit configured to be connected to the transmission/reception unit that transmits information indicating a resource to which important information is mapped to a terminal, transmits downlink control information scheduling downlink data to the terminal, determines a resource to which the downlink data is transmitted on the basis of the information indicating the resource to which the important information is mapped, and transmits the downlink data to the terminal on the basis of the determining.

Advantageous Effects of Invention

According to embodiments of the disclosure, it is possible to allow a communication system to effectively transmit data using different types of services. In addition, the embodiment may provide a method by which data transmission between heterogeneous services can coexist, so that the requirements of each service can be satisfied and delay of transmission time can be reduced or at least one of frequency-time and spatial resources can be efficiently used.

MODE FOR THE INVENTION

Figure 1:
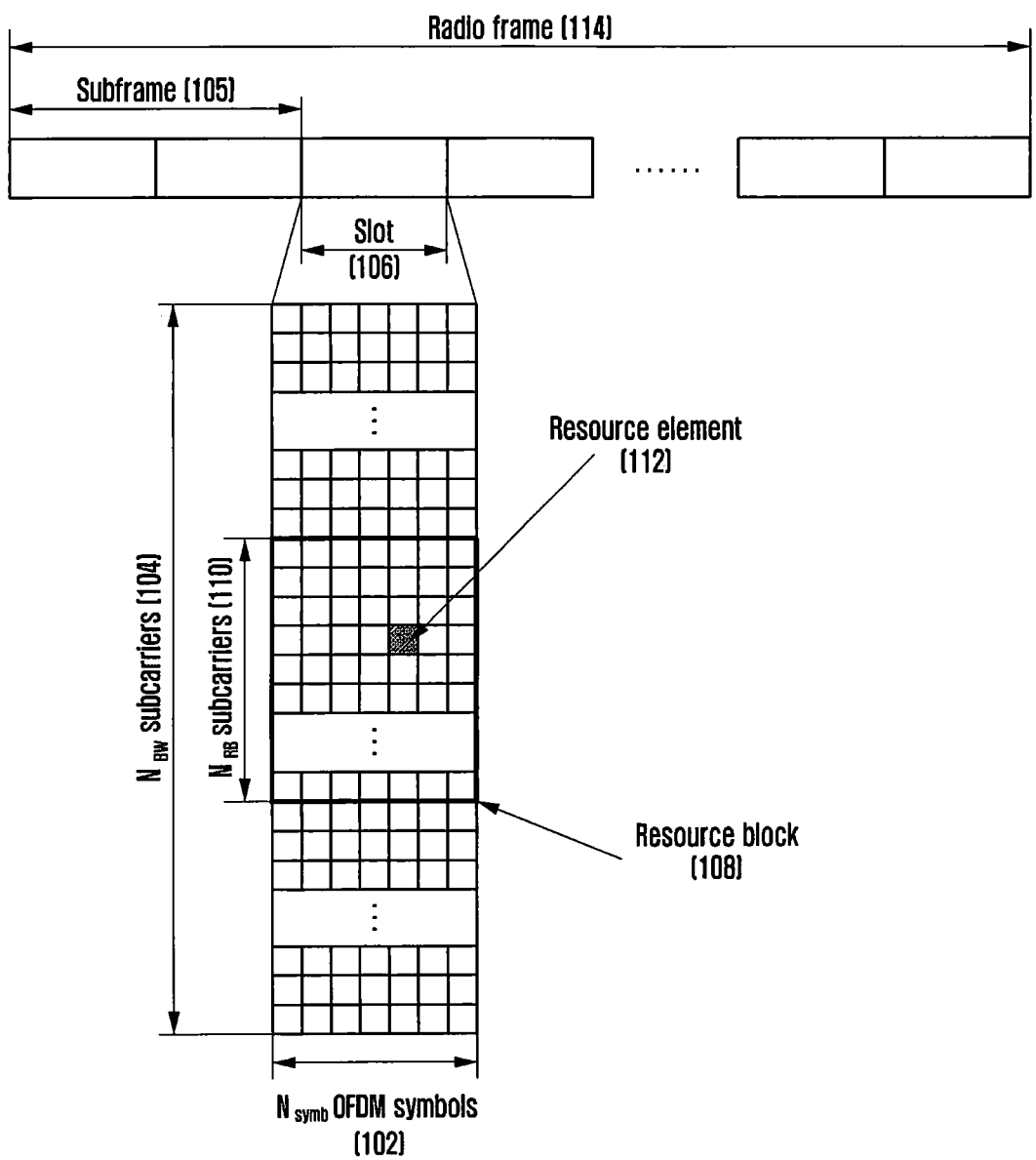
FIG. 1 is a diagram illustrating a basic structure of a time-frequency domain, which is a radio resource region in which data or a control channel is transmitted in a downlink of an LTE system or a system that is similar to the LTE system.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, "unit" may include one or more processors.

First Embodiment

A wireless communication system was initially developed for the purpose of providing a voice-oriented service, but has been expanded to, for example, a broadband wireless communication system that provides a high-speed and high-quality packet data service like communication standards, such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e. Further, as the 5th generation wireless communication system, 5G or new radio (NR) communication standards have been made.

In the wireless communication system including the 5th generation as described above, at least one service of enhanced mobile broad band (eMBB), massive machine type communications (mMTC), and ultra-reliable and low-latency communications (URLLC) may be provided to a terminal. The above-described services may be provided to the same terminal during the same time period. In an embodiment, eMBB may take aim at high-speed transmission of high-capacity data, mMTC may take aim at minimization of a terminal power and connection among plural terminals, and URLLC may take aim at high reliability and low delay, but are not limited thereto. The three kinds of services as described above may be primary scenarios in an LTE system or post-LTE 5G/new radio or next radio (NR) systems. In an embodiment, a coexistence method between eMBB and URLLC or between mMTC and URLLC, and an apparatus using the method will be described.

If a situation in which a base station may transmit URLLC data in a specific transmission time interval (TTI) occurs in a state where the base station is scheduled to transmit data that corresponds to an eMBB service to a certain terminal in the TTI, the base station may not transmit a part of the eMBB data in a frequency band in which the eMBB data has already been scheduled and transmitted, but may transmit the generated URLLC data in the frequency band. The eMBB-scheduled terminal and the URLLC-scheduled terminal may be the same terminal or different terminals. In this case, since a part of the eMBB data that has already been scheduled and transmitted may not be transmitted, a possibility that the eMBB data is lost is increased. Accordingly, it is necessary to determine a method for processing a signal that is received from the eMBB-scheduled terminal or the URLLC-scheduled terminal and a method for receiving the signal.

Therefore, in an embodiment, a coexistence method between different services will be described, which can transmit information according to the respective services if information according to the eMBB and the URLLC is scheduled through sharing of a part or the whole of the frequency band, if information according to the mMTC and the URLLC is simultaneously scheduled, if information according to the mMTC and the eMBB is simultaneously scheduled, or if information according to the eMBB, the URLLC, and the mMTC is simultaneously scheduled.

Hereinafter, embodiments of the disclosure will be described in detail with reference to the accompanying drawings. In describing the disclosure, a detailed description of related functions or configurations will be omitted if it is determined that it obscures the disclosure in unnecessary detail. The following terms are defined in consideration of the functions of the disclosure, and they may differ according to the intention of a user, operator, or custom. Accordingly, they should be defined on the basis of the contents of the whole description of the disclosure.

Hereinafter, the base station is the subject that performs resource allocation to the terminal, and may be at least one of a gNode B, an eNode B, Node B, base station (BS), radio connection unit, base station controller, and node on a network. The terminal may include user equipment (UE), mobile station (MS), cellular phone, smart phone, computer, or a multimedia system that can perform a communication function. In the disclosure, a downlink (DL) is a radio transmission path of a signal that is transmitted from the base station to the terminal, and an uplink (UL) means a radio transmission path of a signal that is transmitted from the terminal to the base station.

Although an embodiment of the disclosure is described in a state where an LTE or LTE-A system is exemplified, it is also possible to apply the embodiment of the disclosure even to other communication systems having similar technical backgrounds or channel types. For example, the 5th generation mobile communication technologies (5G, new radio, and NR) that are developed after LTE-A may be included therein. Further, the embodiment of the disclosure may also be applied to other communication systems through partial modifications thereof in a range that does not greatly deviate from the scope of the disclosure through the judgment of those skilled in the art.

In the LTE system that is a representative example of the broadband wireless communication systems, the downlink (DL) adopts an orthogonal frequency division multiplexing (OFDM) scheme, and the uplink (UL) adopts single carrier frequency division multiple access (SC-FDMA) scheme. According to the above-described multiple access schemes, data of respective users or control information can be discriminated from each other by performing an allocation and an operation so as to prevent time-frequency resources for carrying the data or control information for each user from overlapping each other, that is, to establish orthogonality.

The LTE system adopts a hybrid automatic repeat request (HARQ) scheme in which a physical layer retransmits the corresponding data if decoding failure occurs during initial data transmission. According to the HARQ scheme, a receiver may transmit information (negative acknowledgement (NACK)) for notifying of the decoding failure to a transmitter if the receiver is unable to accurately decode the data, and the transmitter may make the physical layer retransmit the corresponding data. The receiver may combine the data that is retransmitted from the transmitter with the previous data of which the decoding has failed to heighten the data reception performance. Further, if the receiver has accurately decoded the data, the receiver may transmit information (acknowledgement (ACK)) for notifying the transmitter of decoding success, and the transmitter can transmit new data.

FIG. 1 is a diagram illustrating a basic structure of a time-frequency domain, which is a radio resource region in which data or a control channel is transmitted in a downlink of an LTE system or a system that is similar to the LTE system.

Referring to FIG. 1, a horizontal axis represents a time domain, and a vertical axis represents a frequency domain. In the time domain, the minimum transmission unit is an OFDM symbol, and $N_{symb}$ OFDM symbols 102 constitute one slot 106, and two slots constitute one subframe 105. The length of the slot is 0.5 ms, and the length of the subframe is 1.0 ms. Further, a radio frame 114 is a time domain region that is composed of 10 subframes. In the frequency domain, the minimum transmission unit is a subcarrier, and the transmission bandwidth of the whole system is composed of $N_{BW}$ subcarriers 104 in total. However, such numerical values may be variably applied.

In the time-frequency domain, the basic unit of resources is a resource element (RE) 112 that may be expressed by an OFDM symbol index and a subcarrier index. A resource block (RB) (or physical resource block (PRB)) 108 may be defined by $N_{symb}$ successive OFDM symbols 102 in the time domain and $N_{RB}$ successive subcarriers 110 in the frequency domain. Accordingly, in one slot, one RB 108 may include $N_{symb} \times N_{RB}$ REs 112. In general, as the minimum allocation unit of frequency domain data in the RB or LTE system, $N_{symb}=7$, $N_{RB}=12$, and $N_{BW}$ may be in proportion to the bandwidth of the system transmission band. The data rate is increased in proportion to the number RBs that are scheduled in the terminal.

The LTE system may define and operate 6 transmission bandwidths. In the case of a frequency division duplex (FDD) system that operates to discriminate a downlink and an uplink by means of frequency, the downlink transmission bandwidth and the uplink transmission bandwidth may differ from each other. A channel bandwidth presents an RF bandwidth that corresponds to the system transmission bandwidth. Table 1 below presents the corresponding relationship between the system transmission bandwidth that is defined by the LTE system and the channel bandwidth. For example, the LTE system having 10 MHz channel bandwidth may have the transmission bandwidth that is composed of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within initial N OFDM symbols in the subframe. In an embodiment, in general, N={1, 2, 3}. Accordingly, in accordance with the amount of the control information to be transmitted to the current subframe, the N value may be variably applied to each subframe. The transmitted control information may include a control channel transmission period indicator indicating how many OFDM symbols the control information is transmitted through, scheduling information on downlink data or uplink data, and information on HARQ ACK/NACK.

In the LTE system, the scheduling information on the downlink data or the uplink data is transferred from the base station to the terminal through downlink control information (DCI). The DCI may be defined in accordance with various formats, and may indicate whether the DCI is scheduling information on the uplink data (UL grant) or scheduling information on the downlink data (DL grant) according to the respective formats, whether the DCI is a compact DCI having a small size of the control information, whether spatial multiplexing using multiple antennas is applied, and whether the DCI is a DCI for power control. For example, DCI format 1 that is the scheduling control information on the downlink data (DL grant) may include at least one piece of the following control information.

Resource allocation type 0/1 flag: This indicates whether a resource allocation scheme is of type 0 or type 1. The type 0 allocates resources in the unit of a resource block group (RBG) through application of a bitmap scheme. In the LTE system, the basic unit of scheduling is an RB that is expressed as time and frequency domain resource, and the RBG is composed of a plurality of RBs, and becomes the basic unit of scheduling in the type 0 scheme. The type 1 allocates a specific RB in the RBG.

Resource block assignment: This indicates an RB that is allocated for data transmission. An expressed resource is determined in accordance with the system bandwidth and the resource allocation scheme.

Modulation and coding scheme (MCS): This indicates a modulation scheme that is used for data transmission and the size of a transport block (TB) that is data to be transmitted.

HARQ process number: This indicates a process number of a HARQ.

New data indicator: This indicates whether scheduled data corresponds to HARQ initial transmission or retransmission.

Redundancy version: This indicates a redundancy version of a HARQ.

Transmission power control (TCP) command for a physical uplink control channel (PUCCH): This indicates a transmission power, control command for a PUCCH that is an uplink control channel.

The DCI may pass through a channel coding and modulation process, and may be transmitted on a physical downlink control channel (PDCCH) that is a downlink physical control channel (or control information) or on an Enhanced PDCCH (EPDCCH) (or enhanced control information). Hereinafter, the PDCCH or EPDCCH transmission can be understood as transmitting the DCI on the PDCCH or the EPDCCH.

In general, the DCI is scrambled with a specific radio network temporary identifier (RNTI) (or terminal identifier), independently with respect to each terminal, is added with a cyclic redundancy check (CRC) bit, is channel-coded, and then is configured as an independent PDCCH to be transmitted. In the time domain, the PDCCH is mapped during the control channel transmission period to be transmitted. The frequency domain mapping location of the PDCCH may be determined by an identifier (ID) of each terminal, and may be spread to the whole system transmission band to be transmitted.

The downlink data may be transmitted on a physical downlink shared channel (PDSCH) that is a physical channel for transmitting the downlink data. The PDSCH may be transmitted after the control channel transmission period, and scheduling information, such as a detailed mapping location in the frequency domain and the modulation scheme, is determined on the basis of the DCI that is transmitted through the PDCCH.

Through an MCS among the control information that constitutes the DCI, the base station reports to the terminal the modulation scheme that is applied to the PDSCH to be transmitted and the transport block size (TBS) of the data to be transmitted. In an embodiment, the MCS may be composed of 5 bits or more or less. The TBS corresponds to the size before a channel coding for error correction is applied to the data, that is, transport block (TB), which the base station intends to transmit.

The modulation scheme that is supported by the LTE system may be quadrature phase shift keying (QPSK), 16 quadrature amplitude modulation (16QAM), and 64QAM, and respective modulation orders Qm correspond to 2, 4, and 6. That is, in the case of QPSK modulation, 2 bits per symbol may be transmitted, in the case of 16QAM, 4 bits per symbol may be transmitted, and in the case of 64 QAM, 6 bits per symbol may be transmitted. Further, in accordance with system modification, the modulation scheme of 256QAM or more may be used.

Figure 2:
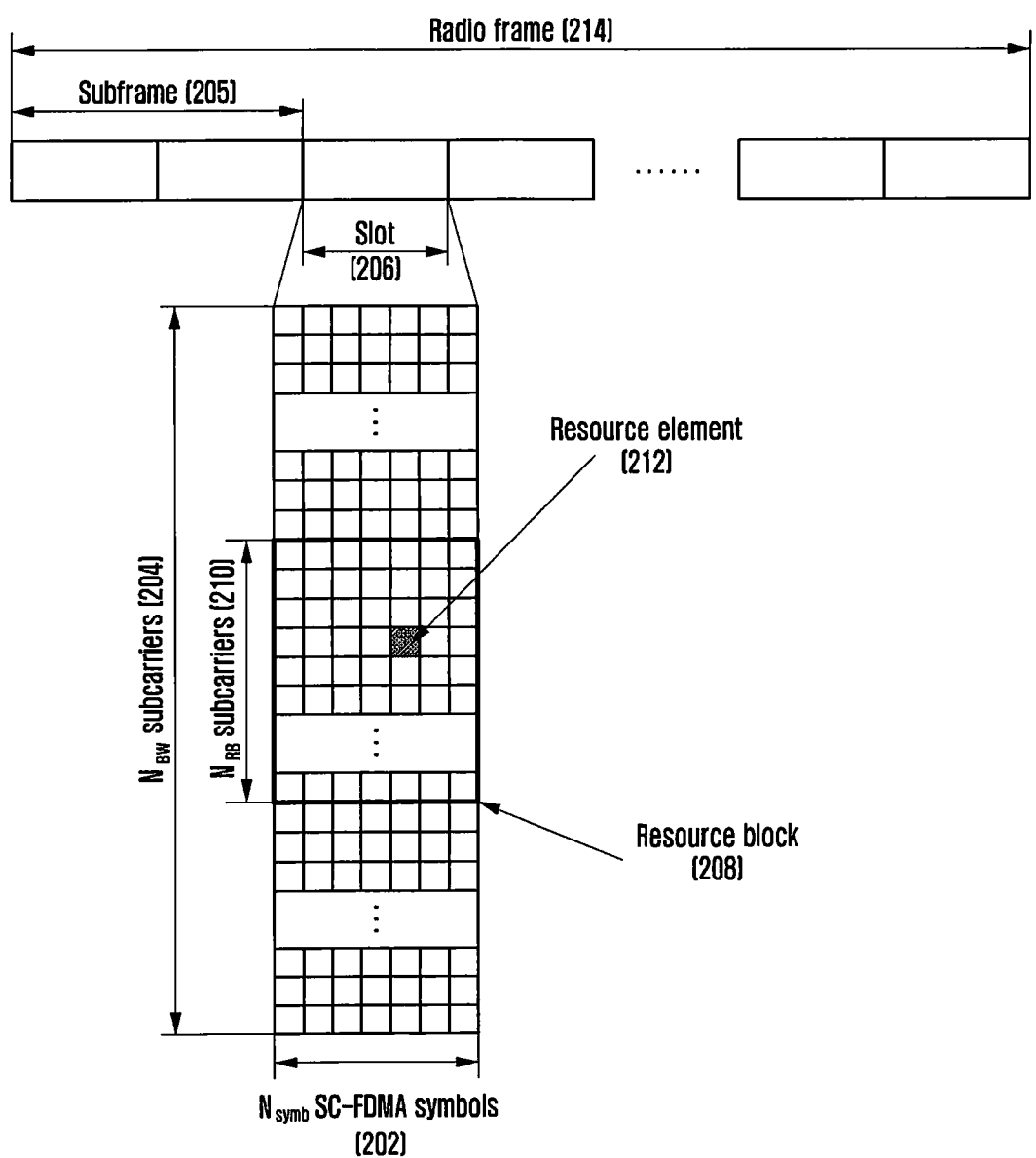
FIG. 2 is a diagram illustrating a basic structure of a time-frequency domain, which is a radio resource region in which data or a control channel is transmitted in an uplink of an LTE or an LTE-A system.

FIG. 2 is a diagram illustrating a basic structure of a time-frequency domain, which is a radio resource region in which data or a control channel is transmitted in an uplink of an LTE or an LTE-A system.

Referring to FIG. 2, a horizontal axis represents a time domain, and a vertical axis represents a frequency domain. In the time domain, the minimum transmission unit is a SC-FDMA symbol 202, and $N_{symb}$ SC-FDMA symbols may constitute one slot 206. Further, two slots constitute one subframe 205. In the frequency domain, the minimum transmission unit is a subcarrier, and the transmission bandwidth 204 of the whole system is composed of $N_{BW}$ subcarriers in total. $N_{BW}$ may have a value that is proportion to the system transmission bandwidth.

In the time-frequency domain, the basic unit of resources is a resource element (RE) 212 that may be defined by an SC-FDMA symbol index and a subcarrier index. A resource block (RB) 208 may be defined by $N_{symb}$ successive SC-FDMA symbols in the time domain and $N_{RB}$ successive subcarriers 210 in the frequency domain. Accordingly, one RB may be composed of $N_{symb} \times N_{RB}$ REs. In general, the minimum transmission unit of data or control information is an RB unit. The PUCCH is mapped on the frequency domain that corresponds to 1 RB, and is transmitted for one subframe.

In the LTE system, the timing relationship may be defined among a PDSCH that is a physical channel for transmitting downlink data, a PUCCH that is an uplink physical channel in which HARQ ACK/NACK corresponding to PDCCH/EPDDCH that includes a semi-persistent scheduling release (SPS release) is transmitted, and a physical uplink shared channel (PUSCH). As an example, in the LTE system that operates as a frequency division duplex (FDD), the PDSCH that is transmitted in an (n−4)-th subframe or the HARQ ACK/NACK that corresponds to the PDCCH/EPDCCH that includes the SPS release may be transmitted to the PUCCH or the PUSCH in an n-th subframe.

In the LTE system, the downlink HARQ adopts an asynchronous HARQ scheme in which a data retransmission time is not fixed. That is, if the base station receives a feedback of the HARQ NACK from the terminal with respect to initial transmission data that is transmitted by the base station, the base station freely determines the transmission time of the retransmission data by a scheduling operation. The terminal performs buffering of data that is determined as an error as the result of decoding the received data for the HARQ operation, and then performs combining of the error data with next retransmission data.

If the PDSCH that includes the downlink data that is transmitted from the base station in subframe n is received, the terminal transmits the uplink control information that includes HARQ ACK or NACK of the downlink data in subframe n+k to the base station through the PUCCH or PUSCH. In this case, "k" may be differently defined in accordance with the FDD or time division duplex (TDD) of the LTE system and the subframe configuration. As an example, in the case of an FDD LTE system, "k" is fixed to "4". On the other hand, in the case of a TDD LTE system, "k" may be changed in accordance with the subframe configuration and the subframe number. Further, during data transmission through a plurality of carriers, the k value may be differently applied in accordance with the TDD configuration of each carrier.

In the LTE system, unlike the downlink HARQ, the uplink HARQ adopts a synchronous HARQ scheme in which the data transmission time is fixed. That is, the uplink/downlink timing relationship among a PUSCH that is a physical channel for transmitting uplink data, a PDCCH that is a preceding downlink control channel, and a physical hybrid indicator channel (PHICH) that is a physical channel in which a downlink HARQ ACK/NACK that corresponds to the PUSCH is transmitted may be defined according to the following rule.

If the terminal receives a PDCCH that includes uplink scheduling control information that is transmitted from the base station in subframe n or a PHICH in which the downlink HARQ ACK/NACK is transmitted, the terminal transmits uplink data that corresponds to the control information through the PUSCH in subframe n+k. In this case, "k" may be differently defined in accordance with the FDD or TDD of the LTE system and the configuration thereof. As an example, in the case of an FDD LTE system, "k" may be fixed to "4". On the other hand, in the case of a TDD LTE system, "k" may be changed in accordance with the subframe configuration and the subframe number. Further, during data transmission through a plurality of carriers, the k value may be differently applied in accordance with the TDD configuration of each carrier.

Further, if the terminal receives a PHICH that includes information related to downlink HARQ ACK/NACK from the base station in subframe i, the PHICH corresponds to the PUSCH that is transmitted by the terminal in subframe I-k. In this case, "k" may be differently defined in accordance with the FDD or TDD of the LTE system and the configuration thereof. As an example, in the case of an FDD LTE system, "k" is fixed to "4". On the other hand, in the case of a TDD LTE system, "k" may be changed in accordance with the subframe configuration and the subframe number. Further, during data transmission through a plurality of carriers, the k value may be differently applied in accordance with the TDD configuration of each carrier.

TABLE 2

| Transmission mode | DCI format | Search Space | Transmission scheme of PDSCH corresponding to PDCCH |
| --- | --- | --- | --- |
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Closed-loop spatial multiplexing (see subclause 7.1.4)or Transmit diversity (see subclause 7.1.2) |
| Mode 5 | DCI format 1A | Common and UE specific by C-RNTI | Transmit diversity (see subclause 7.1.2) |
|  | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |

TABLE 2-continued

| Transmission mode | DCI format | Search Space | Transmission scheme of PDSCH corresponding to PDCCH |
|---|---|---|---|
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port; port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission; port 7 and 8 (see subclause 7.1.5A) or single-antenna port; port 7 or 8 (see subclause 7.1.1) |

Table 2 above shows supportable DCI format types in accordance with each transmission mode under conditions set by the C-RNTI in 3GPP TS 36.213. The terminal performs search and decoding on the assumption that the corresponding DCI format exists in a control domain interval according to a predetermined transmission mode. For example, if transmission mode 8 is instructed to the terminal, the terminal searches for DCI format 1A in a common search space and a UE-specific search space and searches for DCI format 2B only in the UE-specific search space.

As described above, the wireless communication system has been described on the basis of the LTE system, and the contents of the disclosure are not limited to the LTE system, but may be applied to various wireless communication system, such as NR and 5G. Further, in an embodiment, in the case of applying the disclosure to a different wireless communication system, the disclosure may be applied to a system that uses a modulation scheme that corresponds to the FDD through changing the k value.

Figure 3:
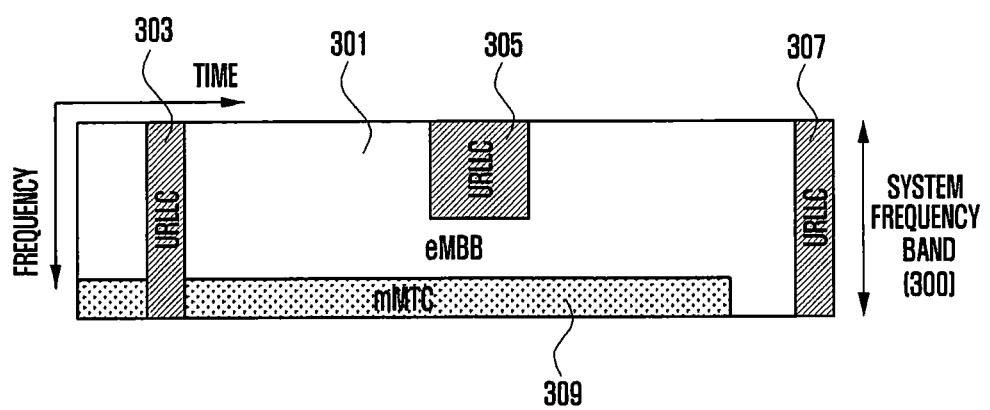
FIGS. 3 and 4 are diagrams illustrating examples in which data for eMBB, URLLC, and mMTC, which are services considered in a 5G or NR system, are allocated in frequency-time resources.
Figure 4:
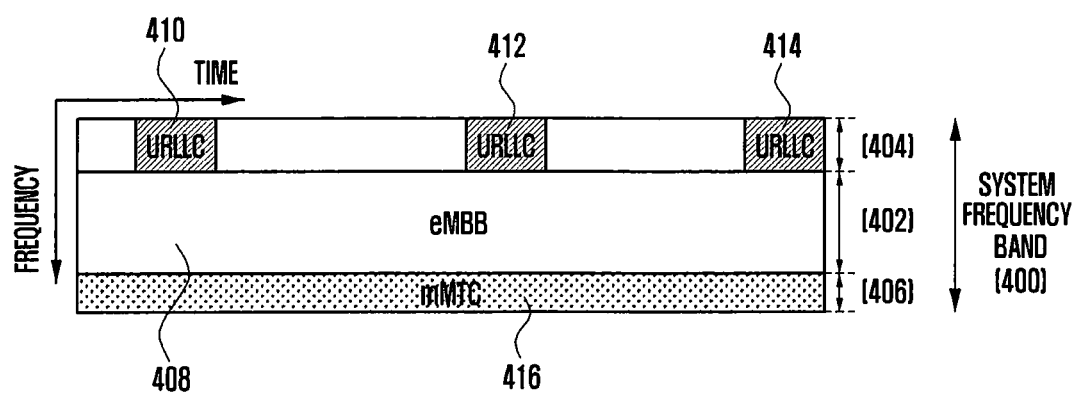

FIGS. 3 and 4 are diagrams illustrating examples in which data for eMBB, URLLC, and mMTC, which are services considered in a 5G or NR system, are allocated in frequency-time resources.

Referring to FIGS. 3 and 4, a method in which frequency and time resources are allocated for information transmission in the respective systems is disclosed. First, FIG. 3 illustrates that data for eMBB, URLLC, and mMTC are allocated in the whole system frequency band 300. If URLLC data 303, 305, and 307 are generated while eMBB 301 and mMTC 309 are allocated and transmitted in a specific frequency bandwidth, and transmission of the generated data is necessary, a transmitter may transmit the URLLC data 303, 305, and 307 without emptying a portion in which the eMBB 301 and the mMTC 309 have already been allocated or without transmitting the eMBB 301 and the mMTC 309. Since it is necessary to reduce a delay time of the URLLC during the service, the URLLC data 303, 305, and 307 may be allocated to a portion of an eMBB-allocated resource 301 to be transmitted. Of course, if the URLLC data is additionally allocated to the eMBB-allocated resource to be transmitted, eMBB data may not be transmitted in the redundant frequency-time resources, and thus transmission performance of the eMBB data may be lowered. That is, in the above-described case, an eMBB data transmission failure due to the URLLC allocation may occur.

In FIG. 4, respective subbands 402, 404, and 406 that are obtained through division of the whole system frequency band 400 may be used for the purpose of transmitting services and data. The information related to a subband configuration may be predetermined, and this information may be transmitted from the base station to the terminal through higher layer signaling. Alternatively, the information related to the subband may be optionally divided by the base station or a network node, and services may be provided to the terminal without transmission of separate subband configuration information to the terminal. FIG. 4 illustrates a state where the subband 402 is used to transmit eMBB data, the subband 404 is used to transmit URLLC data, and the subband 406 is used to transmit mMTC data.

In the whole embodiment, the length of a transmission time interval (TTI) that is used for URLLC transmission may be shorter than the length of the TTI that is used to transmit the eMBB or mMTC. Further, a response to the information related to the URLLC may be transmitted earlier than that of the eMBB or the mMTC, and thus the information can be transmitted and received with a low delay.

In order to transmit the three kinds of services or data as described above, physical layer channel structures that are used by types may differ from each other. For example, at least one of TTI lengths, frequency resource allocation units, control channel structures, and data mapping methods may differ from each other.

Although three kinds of services and three kinds of data have been described, more kinds of services and the corresponding data may exist, and even in this case, the contents of the disclosure could be applied.

The terms "physical channel" and "signal" in the LTE or LTE-A system in the related art may be used to explain a method and an apparatus proposed in an embodiment. However, the contents of the disclosure may be applied to a wireless communication system that is not the LTE or LTE-A system.

The contents of the disclosure are applicable to an FDD or TDD system. In addition, in the disclosure, higher layer signaling is a signal transfer method in which the base station transfers a signal to the terminal using a downlink data channel of a physical layer, or the terminal transfers a signal to the base station using an uplink data channel of a physical layer, and may be mentioned as radio resource control (RRC) signaling, packet data convergence protocol (PDCP) signaling, or a medium access control (MAC) control element (MAC CE).

The contents of the disclosure can be sufficiently applied to the uplink as well as the downlink. That is, in an embodiment, a downlink operation process for explaining a process of transmitting control information and data information from the base station to the terminal can be sufficiently applied to an uplink operation process for explaining a process of transmitting control information and data information from the terminal to the base station.

A first service and a second service described in the disclosure are services satisfying different requirements. For example, the first service may be an eMBB and the second service may be a URLLC, or vice versa. The mMTC may also be a first service or a second service. Alternatively, one of two of eMBB, URLLC, and mMTC may be a first service and the other may be a second service. The resources described in the disclosure can be used as a concept including time or frequency, or code or space, or all or some thereof.

In the disclosure, there may be a terminal that can use only a first service type and/or a terminal that can use only a second service type. Also, there may be a terminal that can use both the first service type and the second service type. There may also be a terminal that can use a portion of a first service type and a second service type (e.g., one of control information and data information).

Figure 5:
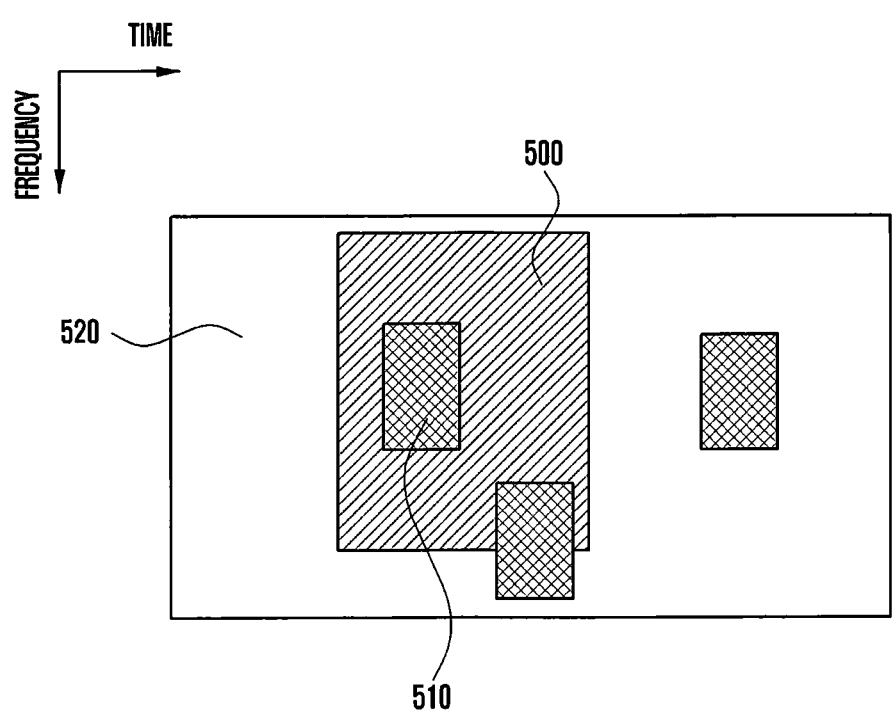
FIG. 5 is a diagram illustrating an example in which resources for a second service type are mapped to remaining resources except for important resources among resources allocated for a first service type.

FIG. 5 is a diagram illustrating an example in which resources for a second service type are mapped to remaining resources except for important resources among resources allocated for a first service type.

FIG. 5 illustrates an example, in a case where resources for control and data information of a first service type are allocated to a certain terminal in 520, in which resources for control and data information of a second service type are allocated to the same terminal or a different terminal in 500. In this case, the terminal to which the control and data information of the second service type is allocated may know that the resources for control and data information for the second service of the corresponding terminal are allocated while avoiding a resource region 510 for important information allocated to the terminal receiving data of the first service type or a resource region 510 for important information to all terminals or specific terminal groups.

Examples of the important information include a reference signal (RS) used by the terminal receiving data of the first service type for demodulating and/or decoding the data information of the terminal. The important information also includes a periodic or aperiodic channel state information reference signal (CSI-RS) transmitted from a base station for a specific terminal. The important information also includes a primary synchronization signal (PSS) or a secondary synchronization signal (SSS) transmitted from a base station to synchronize all terminals or specific terminals. The important information also includes a master information block (MIB) transferred from the base station to a physical broadcast channel (PBCH) for all terminals or a specific terminal, or a system information block (SIB) transmitted through the PDSCH. The important information also includes group common control information or UE-specific control information for all the terminals or specific terminals. The important information also includes reserved resources or reserved resource sets, which are currently unused resources for services that can be used in the future. In addition, examples of the important information may include information for helping network access of arbitrary terminals other than the above-mentioned terminal, or helping transmission and reception of control information and data information. That is, the important resource used in the disclosure can be interpreted as a resource region containing the important information. The important information includes all kinds of information necessary for preprocessing and post-processing that should be performed for the terminal to receive data, such as PBCH, PDCCH, RS, PSS and SSS described above.

In a terminal using the second service type, it is assumed that control and data information resource regions of the terminal are mapped, in 500, to the remaining resources except for resource regions 510 allocated for the important information shown in the above example. In other words, the terminal using the second service type may realize a resource region to which data information is allocated through control information, and may perform reception, and demodulation and/or decoding assuming that a data resource region of the second service type of the corresponding terminal is mapped to the remaining resource region except for the corresponding resource region if the above-described important resource region exists within the realized data resource region.

An operation of determining that data of the second service type of the corresponding terminal is mapped in the remaining resource region except for the resource region to which the important information of the terminal is allocated can be performed in a situation where the base station and the terminal determine resource regions for the important information acquired before receiving the control and data information of the second service type to be the same. Accordingly, the resource region associated with the important information can be transmitted from the base station to the terminal through upper signaling, or may be defined as a predetermined value between the base station and the terminal in advance as a system default value. Alternatively, it is possible to transmit information on the important information resource region through L1 signaling in addition to the above-mentioned higher layer signaling. Alternatively, if important information that is not transmitted through the L1 signaling and the higher layer signaling is defined in both the base station and the terminal in advance, it is possible to use data including this information for determination or to use only this information for determination.

Figure 6:
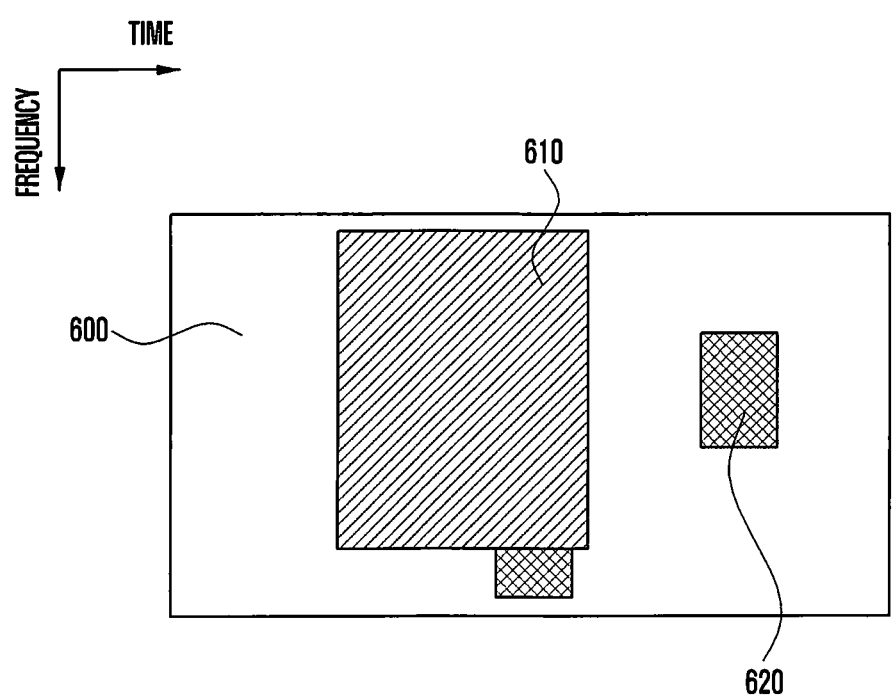
FIG. 6 is a diagram illustrating an example in which resources for a second service type are mapped to resources including important resources among resources allocated for a first service type.

FIG. 6 is a diagram illustrating an example in which resources for a second service type are mapped to resources including important resources among resources allocated for a first service type.

FIG. 6 illustrates an example in which a terminal of a second service type uses, in 610, resources for control and data information of the corresponding terminal as a part of a resource region 600 allocated to an arbitrary terminal for control and data information of a first service type. Here, the terminal of the second service type may be the same terminal as or a different terminal from a terminal of a first service type. In the terminal of the second service type, it can be assumed that resources for control and data information of the corresponding terminal are mapped to all the resource regions allocated from a base station regardless of a resource region 620 to which important information used by the terminal of the first service type or important information used by a specific terminal or a group of terminals or all the terminals is allocated. That is, regardless of whether the terminal knows or does not know the location of the above-described important in advance, the terminal of the second service type may determine that information of the corresponding terminal is mapped to all the resource regions to which control and data information for the second service type of the corresponding terminal is allocated, and may perform data reception, and demodulation and/or decoding of the corresponding terminal in the corresponding resource region. However, the terminal may operate assuming that the control and data information is subjected to rate-matching and mapped excluding resources including reference signals (RSs) for demodulating/decoding the control and data information for the second service type of at least the corresponding terminal.

Even a situation where the corresponding terminal operates in a combination of FIGS. 5 and 6 can be sufficiently applied to the terminal. That is, other than an operation in which control and data information resources are mapped (in case of FIG. 5) while the resource region allocated for important information is always excluded or an operation in which the control and data information resources are mapped (in case of FIG. 6) while the resource region is always included, a situation where the control/data information resources of the terminal are mapped while the resource region allocated for some important information is excluded and the resource region allocated for the other important information is included can be sufficiently applied. Here, mapping of the resources may mean that the resource region in which the control and data information of the second service type can be included is mapped excluding a specific resource region, other than a case where the control and data information itself of the second service type is mapped excluding a specific resource region. Thereafter, the control and data information of the second service type can be allocated to the mapped resources in a puncturing scheme, a rate-matching scheme, or a combination thereof. Accordingly, in the disclosure, it is described whether the resource region including the control and data information of the second service type is mapped by excluding or including a specific resource region including all or some of a variety of important information, and a description of the mapping before or after can be interpreted in this way.

In the disclosure, data information in the data resource region of the second service type mapped to an arbitrary terminal can be allocated using puncturing or rate-matching. In case of using puncturing, data information is sequentially allocated in the resource region to which data information of the second service type is allocated, regardless of the resource region to which important information is allocated. On the other hand, in case of using rate-matching, data information is sequentially allocated in the remaining regions except for the resource region to which the important information is allocated within the resource region to which the data information of the second service type is allocated. For example, in a situation where data information is mapped in the order of 1-2-3-4-5, a method in which data information is mapped in the same order even though the corresponding terminal cannot actually receive information corresponding to "3" is called puncturing. The rate-matching is a method in which data information is mapped while skipping "x" because the corresponding terminal cannot actually receive information corresponding to "x" in the order of 1-2-x-3-4. Whether the corresponding data is punctured or rate-matched in the resource region to which data of the second service type is allocated may be determined from the beginning in the corresponding network or system, or may be determined by higher layer signaling such as MIB or SIB (or RRC, PDCP, or MAC CE) or L1 signaling. Also, a combination thereof can be applied.

Embodiments to be described later in the disclosure may be performed by the terminal receiving specific configuration information through higher layer signaling. For example, when modes A and B are present, the terminal may operate in the mode A until receiving additional higher layer signaling configuration after the mode A is configured as the higher layer signaling. In addition, embodiments to be described later may be sufficiently performed by a combination thereof. Further, the embodiments to be described below may be sufficiently performed independently of each other.

First-1 Embodiment

Figure 7:
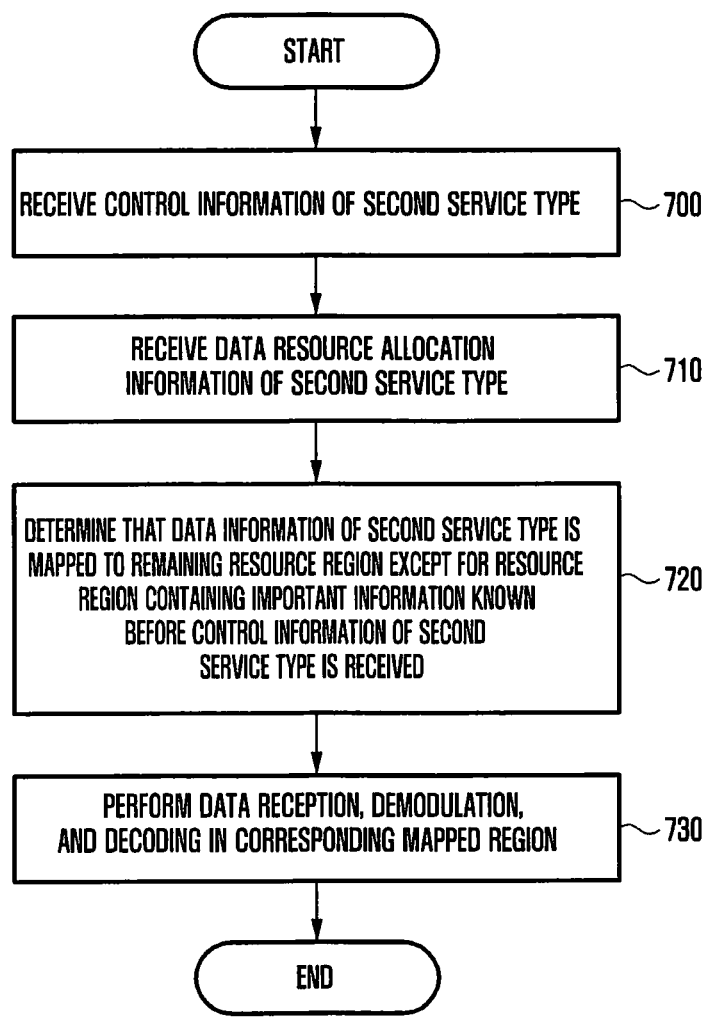
FIG. 7 is a flowchart illustrating a process of receiving control information and data information of a second service type in a case where resources of a terminal are mapped to remaining resources except for important resources known by the terminal according to a first-1 embodiment of the disclosure.

FIG. 7 is a flowchart illustrating a process of receiving control information and data information of a second service type in a case where resources of a terminal are mapped to remaining resources except for important resources known by the terminal according to a first-1 embodiment of the disclosure.

First, in operation 700, a terminal searches for and receives control information of a second service type in order to receive data of the second service type. In operation 710, the terminal receives data allocation information of the second service type of the terminal through the control information. In operation 720, the terminal determines that data resources of the second service type are mapped to the remaining resource region except for a resource region containing important information known by the terminal before the reception of the control information of the second service type. In operation 730, the terminal may perform reception, and demodulation and decoding on the data of the second service type of the terminal, which is mapped according to the above rule.

In addition, in operation 720, the terminal may determine that the data resource of the second service type is mapped in the remaining resource region except for the resource region containing a part of the important information known by the terminal before the control information of the second service type is received. In operation 730, the terminal may perform reception, demodulation, and decoding on the mapped data of the second service type of the terminal other than the resource region containing the important information.

The terminal may always operate according to the above embodiment regardless of a specific configuration, and the operation according to the above embodiment may be possible when the terminal receives an instruction from a base station by a specific higher layer signaling. Also, when the terminal receives an instruction through the control information of the second service type, the operation according to the above embodiment may be possible.

In addition, the terminal may interpret that it implicitly performs the above embodiment in association with resource allocation information or MCS or HARQ process number or ACK/NACK feedback timing (or frequency or time code resource) in the control information of the second service type. For example, only when the size of time and frequency resources in which the data of the second service type is allocated is equal to or less than a specific threshold value, the operation according to the above embodiment may be possible.

First-2 Embodiment

Figure 8:
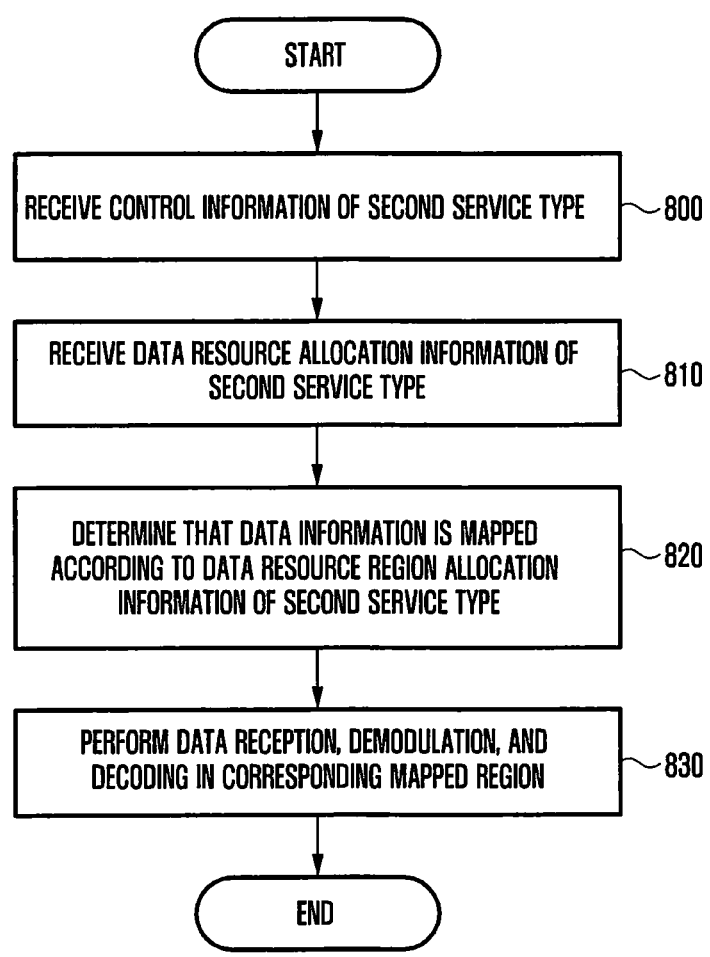
FIG. 8 is a flowchart illustrating a process of receiving control information and data information of a second service type on the basis of resource mapping of a terminal in an allocated resource region according to a first-2 embodiment.

FIG. 8 is a flowchart illustrating a process of receiving control information and data information of a second service type on the basis of resource mapping of a terminal in an allocated resource region according to a first-2 embodiment.

First, in operation 800, a terminal searches for and receives control information of a second service type in order to receive data of the second service type. In operation 810, the terminal receives data allocation information of the second service type of the terminal through the control information. In operation 820, the terminal determines that data of the terminal is mapped as is according to the data allocation information of the second service type. In operation 830, the terminal performs demodulation and decoding on the data by receiving data in all corresponding mapping regions. The corresponding operation is to perform demodulation and decoding by receiving data in all regions to which the data information of the second service type indicated through control information of the second service type is allocated without considering the resource region containing important information known by the terminal before the terminal receives the control information of the second service type.

The terminal may always operate according to the above embodiment regardless of a specific configuration. Also, the terminal may operate according to the above-described embodiment when it receives an instruction from the base station by a specific higher layer signaling. Also, when the terminal receives an instruction through the control information of the second service type, the operation according to the above embodiment may be possible.

In addition, the terminal may interpret that it implicitly performs the above embodiment in association with resource allocation information or MCS or HARQ process number or ACK/NACK feedback timing (or frequency or time code resource) in the control information of the second service type. For example, only when the size of time and frequency resources in which the data of the second service type is allocated is equal to or less than a specific threshold value, the operation according to the above embodiment may be possible.

First-3 Embodiment

Figure 9:
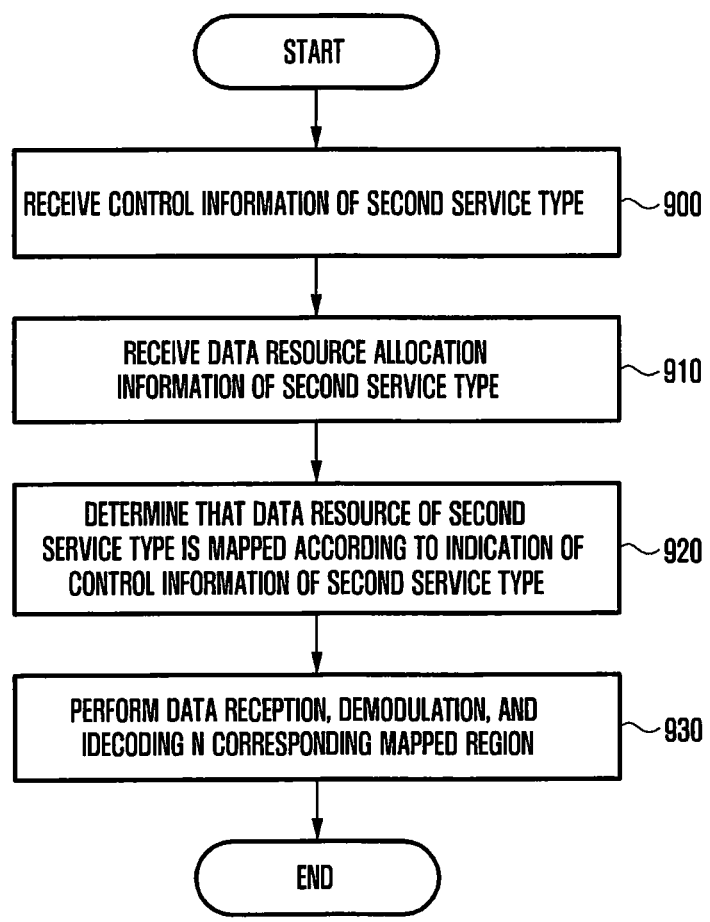
FIG. 9 is a flowchart illustrating a process of receiving control information and data information of a second service type on the basis of resource mapping of a terminal using a resource mapping rule indicated through a control region according to a first-3 embodiment.

FIG. 9 is a flowchart illustrating a process of receiving control information and data information of a second service type on the basis of resource mapping of a terminal using a resource mapping rule indicated through a control region according to a first-3 embodiment.

In operation 900, a terminal searches for and receives control information of a second service type in order to receive data of the second service type. In 910, the terminal receives data allocation information of the second service type of the terminal through the control information. In operation 920, the terminal determines that resources to which data information of the second service type of the terminal is allocated are mapped in consideration of a resource region containing important information indicated in the control information of the second service type. In operation 930, the terminal performs reception, and demodulation and decoding in the resource region including the allocated data information of the second service type.

The resource region containing the important information indicated by the control information of the second service type may be indicated in units of frequency and time. Alternatively, the resource region may be indicated in a specific pattern. Alternatively, the resource region may be indicated in association with information previously known by the terminal. For example, whether data information of the second service type is mapped including or excluding the resource region containing the important information known by the terminal may be indicated. Since this operation is divided into two operations, 1 bit is applicable. Additional bits may be used if a plurality of operations other than the operation is required. That is, it is possible to indicate whether the data information of the second service type is mapped by including or avoiding the resource region containing the important information for each interval in which frequency and time resources are subdivided using a plurality of bits.

Alternatively, one of a predetermined number of patterns is informed from the control information of the second service type, so that the terminal may determine, when the terminal receives the data of the second service type, that the data is mapped while the resource region included in the corresponding pattern is excluded or only the resource region included in the corresponding pattern is included, and may perform reception, and demodulation and decoding. Alternatively, one of the patterns determined by the higher layer signaling is informed from the control information of the second service type, so that the terminal may determine, when the terminal receives the data of the second service type, that the data is mapped while the resource region included in the corresponding pattern is excluded or only the resource region included in the corresponding pattern is included, and may perform reception, and demodulation and decoding. The patterns may be a set of resources organized in time (or frequency or a combination thereof), a set of code blocks, or a set of minimum transmission units.

The terminal may always operate according to the above embodiment regardless of a specific configuration. Also, when the terminal receives an instruction from a base station by a specific higher layer signaling, the operation according to the above embodiment may be possible. Also, when the terminal receives an instruction through the control information of the second service type, the operation according to the above embodiment may be possible. Also, the terminal may interpret that it implicitly performs the above embodiment in association with resource allocation information or MCS or HARQ process number or ACK/NACK feedback timing (or resource) in the control information of the second service type. For example, only when the size of time and frequency resources in which the data of the second service type is allocated is equal to or less than a specific threshold value, the operation according to the above embodiment may be possible.

First-4 Embodiment

Figure 10:
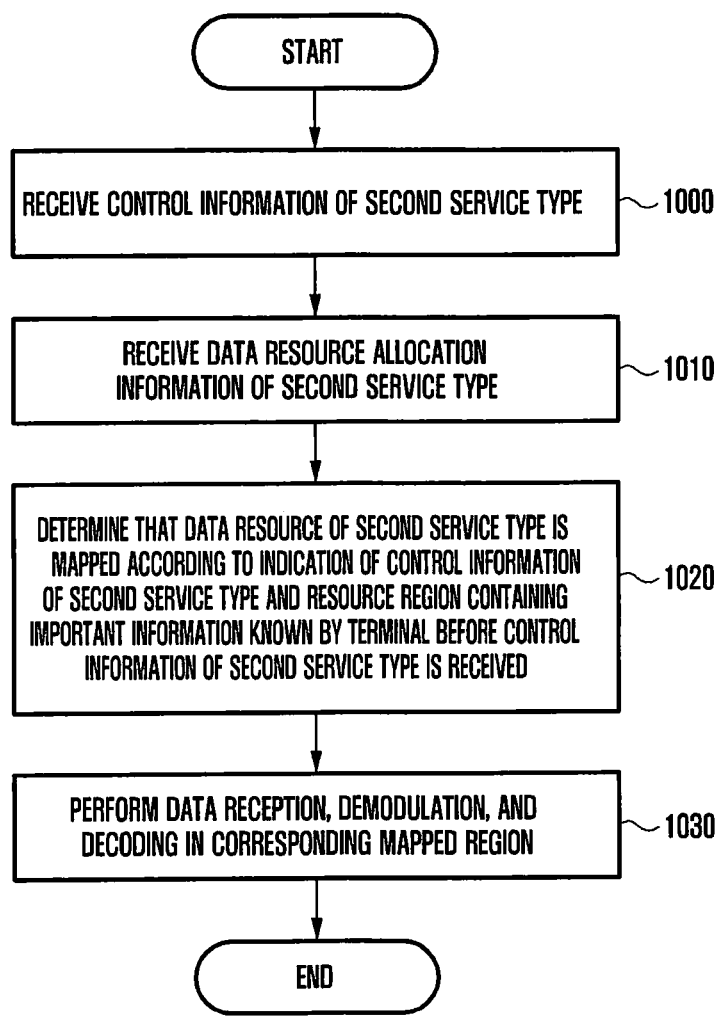
FIG. 10 is a flowchart illustrating a process of receiving control information and data information of a second service type on the basis of resource mapping of a terminal using important resource information known by the terminal and resource mapping rule information indicated through a control region according to a first-4 embodiment.

FIG. 10 is a flowchart illustrating a process of receiving control information and data information of a second service type on the basis of resource mapping of a terminal using important resource information known by the terminal and resource mapping rule information indicated through a control region according to a first-4 embodiment.

In operation 1000, a terminal searches for and receives control information of a second service type in order to receive data of the second service type. In operation 1610, the terminal receives data allocation information of the second service type of the terminal through the control information. In operation 1120, the terminal determines that data of the terminal is mapped according to a resource region (or indicator used for other purposes) containing important information indicated in the control information of the second service type, and a resource region containing important information received (or known) before the terminal receives the control information of the second service type. In operation 1130, the terminal performs reception, and demodulation and decoding on the data of the second service type in the mapped resource region.

The terminal determines that the data of the second service type of the terminal is mapped to the remaining resource region except for resource regions containing important information that is calculated as a union or an intersection or a subset (or a complementary set) of the resource region containing the important information indicated in the control information of the second service type and the resource region containing the important information known by the terminal before the terminal receives the control information of the second service type, and performs reception, and demodulation and decoding on the corresponding data. In addition, the resource region containing the important information indicated in the control information of the second service type may be used to indicate whether the resource region containing the important information known before the terminal receives the control information of the second service type is utilized in the mapping. For example, the resource region (or a specific pattern or a specific value) containing the important information indicated in the control information of the second service type may indicate whether the data of the second service type is mapped while excluding or including the resource region containing the important information known before the terminal receives the control information of the second service information (rather than informing of the resource region including the corresponding important information). The resource region containing the important information known by the terminal may be divided into information known as MIB or/and SIB, information known by a PDCP layer, information known by an MAC layer, and information known by an RRC layer among higher layer signaling. This information also contains information known by L1 signaling.

The data of the second service type may be mapped while avoiding all of the important information acquired through different channels, layers, or paths and the resource regions thereof or without avoiding the same. Also, the data of the second service type may be mapped while avoiding some of the important information acquired through the different channels, layers, or paths and the resource regions thereof or without avoiding the same. For example, the terminal may determine that the resource containing the data of the second service type is mapped to the remaining resource region in which the data of the second service type is allocated except for the resource region containing the important information known as the MIB and/or SIB, the information known by the PDCP layer, and the information known by the MAC layer. The independent elements described above can be operated in a partially or entirely combined form.

Whether each of the resource regions containing the variety of important information acquired through the different one or more channels, layers, and paths is included or excluded at the time of mapping of the resource containing the data of the second service type may be indicated as a bitmap configuration in the control information of the second service type. For example, an operation in which only the resource region containing the important information acquired by the MAC CE is included for the mapping of the resource containing the data of the second service type is sufficiently possible. Also, an operation in which only the resource region containing the important information such as an RS pattern known by L1 signaling or higher layer signaling is included for the mapping of the resource containing the data of the second service type is also sufficiently possible.

In addition, a concept in which the data of the second service type is mapped by including or excluding all or some of a variety of important information acquired through the above-described different channels, layers, or paths is applicable to other embodiments and other parts of the disclosure in addition to the present embodiment.

The terminal may always operate according to the above embodiment regardless of a specific configuration. Also, the operation according to the above embodiment is possible when the terminal receives an instruction from a base station by a specific higher layer signaling. Also, when the terminal receives an instruction through the control information of the second service type, the operation according to the above embodiment may be possible. Also, the terminal may interpret that it implicitly performs the above embodiment in association with resource allocation information or MCS or HARQ process number or ACK/NACK feedback timing (or resource) in the control information of the second service type. For example, only when the size of time and frequency resources in which the data of the second service type is allocated is equal to or less than a specific threshold value, the operation according to the above embodiment may be possible.

In the disclosure, it is possible to allocate the data information of the second service type through the control information of the first service type, and vice versa.

Figure 11:
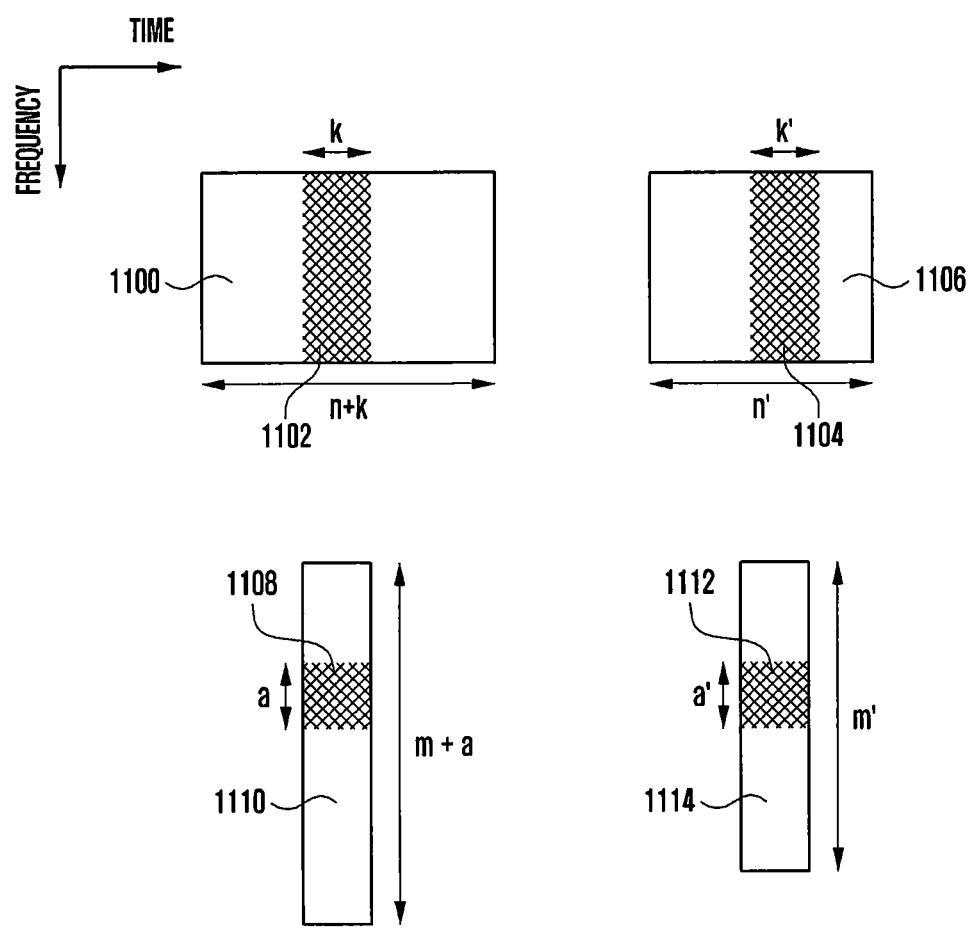
FIG. 11 is a diagram showing an example of resource mappings allocated for a second service type.

FIG. 11 is a diagram showing an example of resource mappings allocated for a second service type.

A terminal may realize a frequency or time resource location to which data information is allocated through control information of a second service type. In a case in which the time resource is allocated by n for data information of the second service type, if a time resource with a size of k of the time with the size of n is allocated for important information, the terminal may perform reception, and demodulation and decoding on the assumption that data information of the terminal is allocated to a time resource 1102 by n+k excluding the corresponding resource in 1100. That is, if the size of data time resource allocation indicated by the control information of the second service type is n, n can be determined by the terminal as the size of the data time resource allocation purely excluding the time resource allocated to the important information.

Alternatively, in a case in which the time resource is allocated by n' for data information of the second service type, if a time resource with a size of k' of the time with the size of n' is allocated for important information in 1104, the terminal may perform reception, and demodulation and decoding on the assumption that data information of the terminal is allocated to the time resource by n' including the corresponding resource in 1106. That is, if the size of data time resource allocation indicated by the control information of the second service type is n', n' can be determined by the terminal as the size of the data time resource allocation including the time resource allocated to the important information. The terminal may interpret a resource to which data of the terminal is purely allocated as n'-k' when the resource is mapped avoiding the important information resource, and may interpret the resource as n' when the resource is mapped including the important information resource, thereby receiving the data of the terminal.

In a case in which a frequency resource is allocated by m for the data information of the second service type, if a frequency resource with a size of a of the frequency with the size of m is allocated for important information in 1108, the terminal may perform reception, and demodulation and decoding on the assumption that the data information of the terminal is allocated to the frequency resource by m+a excluding the corresponding resource in 1110. That is, if the size of data frequency resource allocation indicated by the control information of the second service type is m, m can be determined by the terminal as the size of the pure data frequency resource allocation excluding the frequency resource allocated to the important information.

Alternatively, in a case in which a frequency resource is allocated by m' for the data information of the second service type, if a frequency resource with a size of a' of the frequency with the size of m' is allocated for important information in 1112, the terminal may perform reception, and demodulation and decoding on the assumption that the data information of the terminal is allocated to the frequency resource by m' including the corresponding resource in 1114. That is, if the size of the data frequency resource allocation indicated through the control information of the second service type is m', m' can be determined by the terminal as the size of the data frequency resource allocation including the frequency resource allocated to the important information. The terminal may interpret a resource to which data of the terminal is purely allocated as m'-a' when the resource is mapped avoiding the important information resource, and may interpret the resource as m' when the resource is mapped including the important information resource, thereby receiving the data of the terminal.

The interpretation of the resource allocation information in terms of the frequency or time described above can also be applied to the interpretation of the resource allocation information of a combination in consideration of the frequency and the time.

1102 and 1104 to which the above-described important information is allocated can be partially located or located over the entire frequency resource allocated for the control and data information of the second service type for a specific time interval.

1108 and 1112 to which the above-described important information is allocated can be partially located or located over the entire time resource allocated for the control and data information of the second service type for a specific frequency interval.

Figure 12:
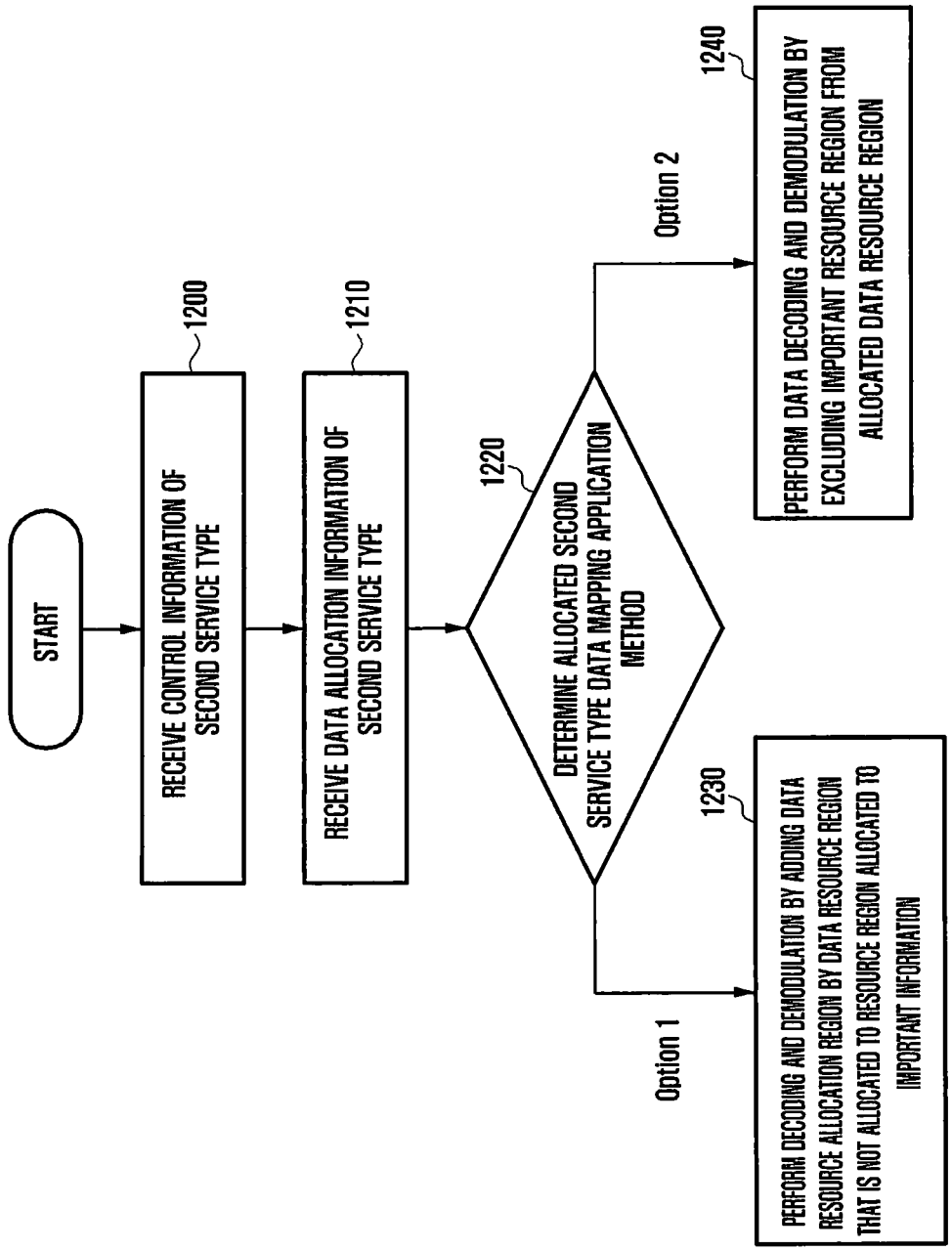
FIG. 12 is a flowchart illustrating an operation procedure of a terminal for determining mapping information of a data resource for a second service type through control information.

FIG. 12 is a flowchart illustrating an operation procedure of a terminal for determining mapping information of a data resource for a second service type through control information.

First, in operation 1200, a terminal searches for and receives control information of a second service type in order to receive data of the second service type. In operation 1210, the terminal receives data allocation information of the second service type of the terminal through the control information. In operation 1220, the terminal identifies a separate indicator through the received control information to determine whether the identified indicator corresponds to option 1 or option 2. Alternatively, in operation 1220, the terminal determines whether the identified indicator corresponds to option 1 or option 2 through higher layer signaling such as RRC or MAC CE. Alternatively, in operation 1220, the terminal determines whether the identified indicator corresponds to option 1 or option 2 through a specific value or range of an existing field (HARQ process number, RV, NDI, resource allocation information, or MCS) in the control information of the second service type.

Information on a resource region allocated to important information in operation 1230 may correspond to the entire resource region or a part thereof allocated to important information that the terminal knows before receiving the control information. If it is determined as option 1 in operation 1220, the terminal determines that data information of the second service type of the terminal is mapped in the remaining region except for the entire resource region or a part thereof containing the above-described important information, and performs data reception, and demodulation and decoding in operation 1230. At this time, the terminal may perform data reception, and demodulation and decoding by adding a data resource allocation region by the resource region allocated to the important information. Alternatively, if it is determined as option 2 in operation 1220, the terminal determines that the data information of the terminal is mapped to the entire resource region allocated to the data of the second service type, and performs data reception, and demodulation and decoding in operation 1240.

First-5 Embodiment

Figure 13:
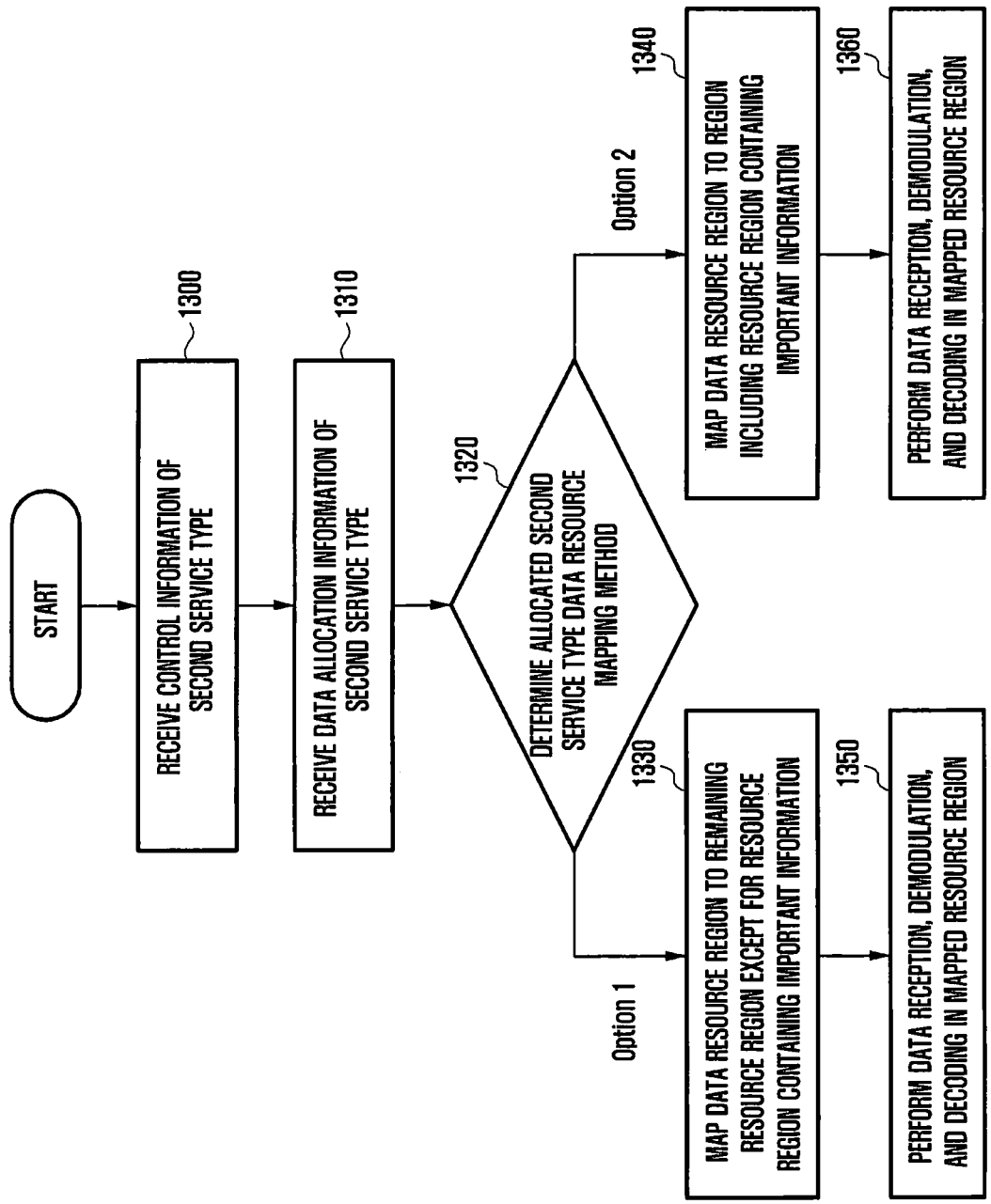
FIG. 13 is a flowchart illustrating a process of receiving control information and data information of a second service type on the basis of resource mapping of a terminal using important resource information known by the terminal and resource mapping rule information indicated through a control region according to a first-5 embodiment.

FIG. 13 is a flowchart illustrating a process of receiving control information and data information of a second service type on the basis of resource mapping of a terminal using important resource information known by the terminal and resource mapping rule information indicated through a control region according to a first-5 embodiment.

In FIG. 13, in operation 1300, a terminal receives control information of a second service type. In operation 1310, the terminal receives a resource region to which data information of the second service type is allocated through the reception of the control information. In operation 1320, the terminal determines a method in which the data information of the second service type is mapped through the control information. If the mapped method follows an option 1, it is determined that the data resource region is mapped to the remaining resource region except for a resource region containing important information in operation 1330. If the mapped method follows an option 2, it is determined that the data resource region is mapped to the region containing the resource region containing the important information in operation 1340. Next, the terminal performs data reception, and demodulation and decoding in the mapped resource region in operations 1350 and 1360.

The above-described option 1 is an indicator for instructing operation 1330, and option 2 is an indicator for instructing operation 1340. Alternatively, it is possible to establish an implicit relationship of option 1 and option 2 with one or several combinations of elements constituting the control information (e.g., data information resource allocation information, HARQ process number, MCS, RV or NDI, etc.). For example, if the size of the data information resource allocation exceeds a predetermined threshold value, it may be instructed to perform the operation of option 2, and if not, it may be instructed to perform the operation of option 1. In addition, a specific value or a specific range of other fields in the variety of control information may instruct option 1 or option 2. The configuration (or selection) between option 1 and option 2 may be determined by the terminal through the control information of the second service type transmitted together with the data of the second service type, or may be determined in advance before the data information of the second service type is received through higher layer signaling such as RRC. Alternatively, the terminal may determine a configuration method (or selection) between option 1 and option 2 indirectly through MCS constituting the control information of the second service type, resource allocation information, HARQ process number, or the like. Alternatively, the operation indicated by option 1 or option 2 depending on whether the terminal knows specific information or a set of the specific information among the above-described important information types before receiving the control information of the second service type.

Configuration information or values thereof serving as a reference of the determination operation described in the above embodiments may be configured through higher layer signaling such as SIB, MAC CE, or RRC before the corresponding operation starts. Also, the configuration information or values thereof may be configured through group common control information or UE-specific control information before the corresponding operation starts. Further, the determination and operations composed of a combination of the above embodiments are sufficiently applicable. Further, the concept, determination conditions, or operation method applied in the above embodiment are applicable to other embodiments of the disclosure.

Figure 14:
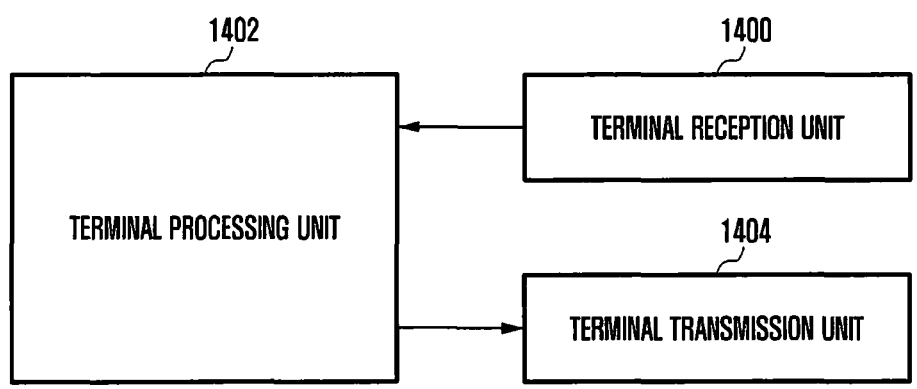
FIG. 14 is a block diagram illustrating a structure of a terminal according to an embodiment of the disclosure.

FIG. 14 is a block diagram illustrating a structure of a terminal according to an embodiment of the disclosure.

Referring to FIG. 14, a terminal according to the disclosure may include a terminal reception unit 1400, a terminal transmission unit 1404, and a terminal processing unit 1402. The terminal reception unit 1400 and the terminal transmission unit 1404 may be collectively referred to as a transmission/reception unit in the embodiment. The transmission/reception unit may transmit and receive signals to and from a base station. The signal may include control information and data. To this end, the transmission/reception unit may include an RF transmitter for up-converting and amplifying the frequency of a transmitted signal and an RF receiver for low-noise amplifying a received signal and down-converting a frequency. The transmission/reception unit may receive a signal through a wireless channel, output the signal to the terminal processing unit 1402, and transmit the signal output from the terminal processing unit 1402 through the wireless channel. The terminal processing unit 1402 may control a series of processes so that the terminal can operate according to the above-described embodiment.

Figure 15:
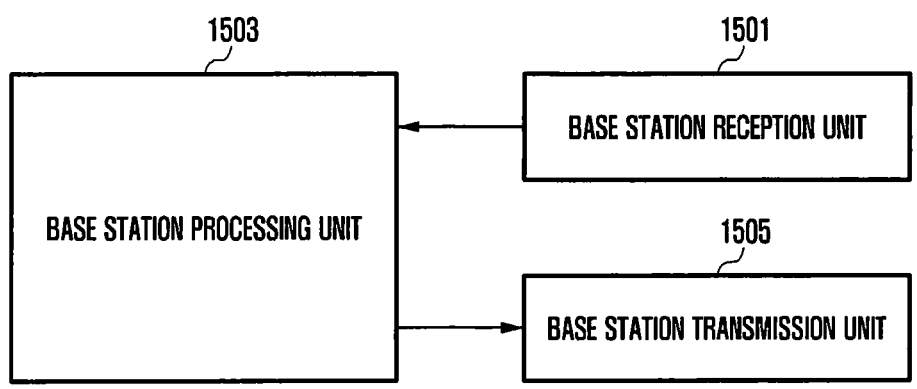
FIG. 15 is a block diagram illustrating a structure of a base station according to embodiments of the disclosure.

FIG. 15 is a block diagram illustrating a structure of a base station according to embodiments of the disclosure.

Referring to FIG. 15, a base station of the disclosure may include at least one of a base station reception unit 1501, a base station transmission unit 1505, and a base station processing unit 1503. The base station reception unit 1501 and the base station transmission unit 1505 may be collectively referred to as a transmission/reception unit in the embodiment of the disclosure. The transmission/reception unit may transmit and receive signals to and from a terminal. The signal may include control information and data. To this end, the transmission/reception unit may include an RF transmitter for up-converting and amplifying the frequency of a transmitted signal and an RF receiver for low-noise amplifying a received signal and down-converting a frequency. Also, the transmission/reception unit may receive a signal through a wireless channel, output the signal to the base station processing unit 1502, and transmit the signal output from the base station processing unit 1503 through the wireless channel. The base station processing unit 1503 may control a series of processes so that the base station can operate according to the above-described embodiment.

Second Embodiment

A wireless communication system was initially developed for the purpose of providing a voice-oriented service, but has been expanded to, for example, a broadband wireless communication system that provides a high-speed and high-quality packet data service like communication standards, such as 3GPP HSPA, LTE or E-UTRA, LTE-A, 3GPP2 HRPD, UMB, and IEEE 802.16e. Further, as the 5th generation wireless communication system, 5G or new radio or next radio (NR) communication standards have been made.

In the wireless communication system including the 5th generation as described above, at least one service of eMBB, mMTC, and URLLC may be provided to a terminal. The above-described services may be provided to the same terminal during the same time period. In an embodiment, eMBB may take aim at high-speed transmission of high-capacity data, mMTC may take aim at minimization of a terminal power and connection among plural terminals, and URLLC may take aim at high reliability and low delay, but are not limited thereto. The three kinds of services as described above may be primary scenarios in an LTE system or post-LTE 5G/NR systems. In an embodiment, a coexistence method between eMBB and URLLC or between mMTC and URLLC, and an apparatus using the method will be described.

If a situation in which a base station may transmit URLLC data in a specific TTI occurs in a state where the base station is scheduled to transmit data that corresponds to an eMBB service to a certain terminal in the TTI, a transmitter may not transmit a part of the eMBB data in a frequency band in which the eMBB data has been scheduled and transmitted, but may transmit the generated URLLC data in the frequency band. The eMBB-scheduled terminal and the URLLC-scheduled terminal may be the same terminal or different terminals. In this case, since a part of the eMBB data that has already been scheduled and transmitted may not be transmitted, a possibility that the eMBB data is lost is increased. Accordingly, it is necessary to determine a method for processing a signal that is received from the eMBB-scheduled terminal or the URLLC-scheduled terminal and a method for receiving the signal.

Therefore, in an embodiment, a coexistence method between different services will be described, which can transmit information according to the respective services if information according to the eMBB and the URLLC is scheduled through sharing of a part or the whole of the frequency band, if information according to the mMTC and the URLLC is simultaneously scheduled, if information according to the mMTC and the eMBB is simultaneously scheduled, or if information according to the eMBB, the URLLC, and the mMTC is simultaneously scheduled.

Hereinafter, embodiments of the disclosure will be described in detail with reference to the accompanying drawings. In describing the disclosure, a detailed description of related functions or configurations will be omitted if it is determined that it obscures the disclosure in unnecessary detail. The following terms are defined in consideration of the functions of the disclosure, and they may differ according to the intention of a user, operator, or custom. Accordingly, they should be defined on the basis of the contents of the whole description of the disclosure.

Hereinafter, the base station is the subject that performs resource allocation to the terminal, and may be at least one of a gNode B, an eNode B, Node B, BS, radio connection unit, base station controller, and node on a network. The terminal may include UE, MS, cellular phone, smart phone, computer, or a multimedia system that can perform a communication function. In the disclosure, a downlink (DL) is a radio transmission path of a signal that is transmitted from the base station to the terminal, and an uplink (UL) means a radio transmission path of a signal that is transmitted from the terminal to the base station.

Although an embodiment of the disclosure is described in a state where an LTE or LTE-A system is exemplified, it is also possible to apply the embodiment of the disclosure even to other communication systems having similar technical backgrounds or channel types. For example, the 5th generation mobile communication technologies that are developed after LTE-A may be included therein. Further, the embodiment of the disclosure may also be applied to other communication systems through partial modifications thereof in a range that does not greatly deviate from the scope of the disclosure through the judgment of those skilled in the art.

In the LTE system that is a representative example of the broadband wireless communication systems, the DL adopts an OFDM scheme, and the UL adopts an SC-FDMA scheme. According to the above-described multiple access schemes, data of respective users or control information can be discriminated from each other by performing an allocation and an operation so as to prevent time-frequency resources for carrying the data or control information for each user from overlapping each other, that is, to establish orthogonality.

The LTE system adopts an HARQ scheme in which a physical layer retransmits the corresponding data if decoding failure occurs during initial data transmission. According to the HARQ scheme, a receiver may transmit information (NACK) for notifying of the decoding failure to a transmitter if the receiver is unable to accurately decode the data, and the transmitter may make the physical layer retransmit the corresponding data. The receiver may combine the data that is retransmitted from the transmitter with the previous data of which the decoding has failed to heighten the data reception performance. Further, if the receiver has accurately decoded the data, the receiver may transmit information (ACK) for notifying the transmitter of decoding success, and the transmitter can transmit new data.

Figure 16:
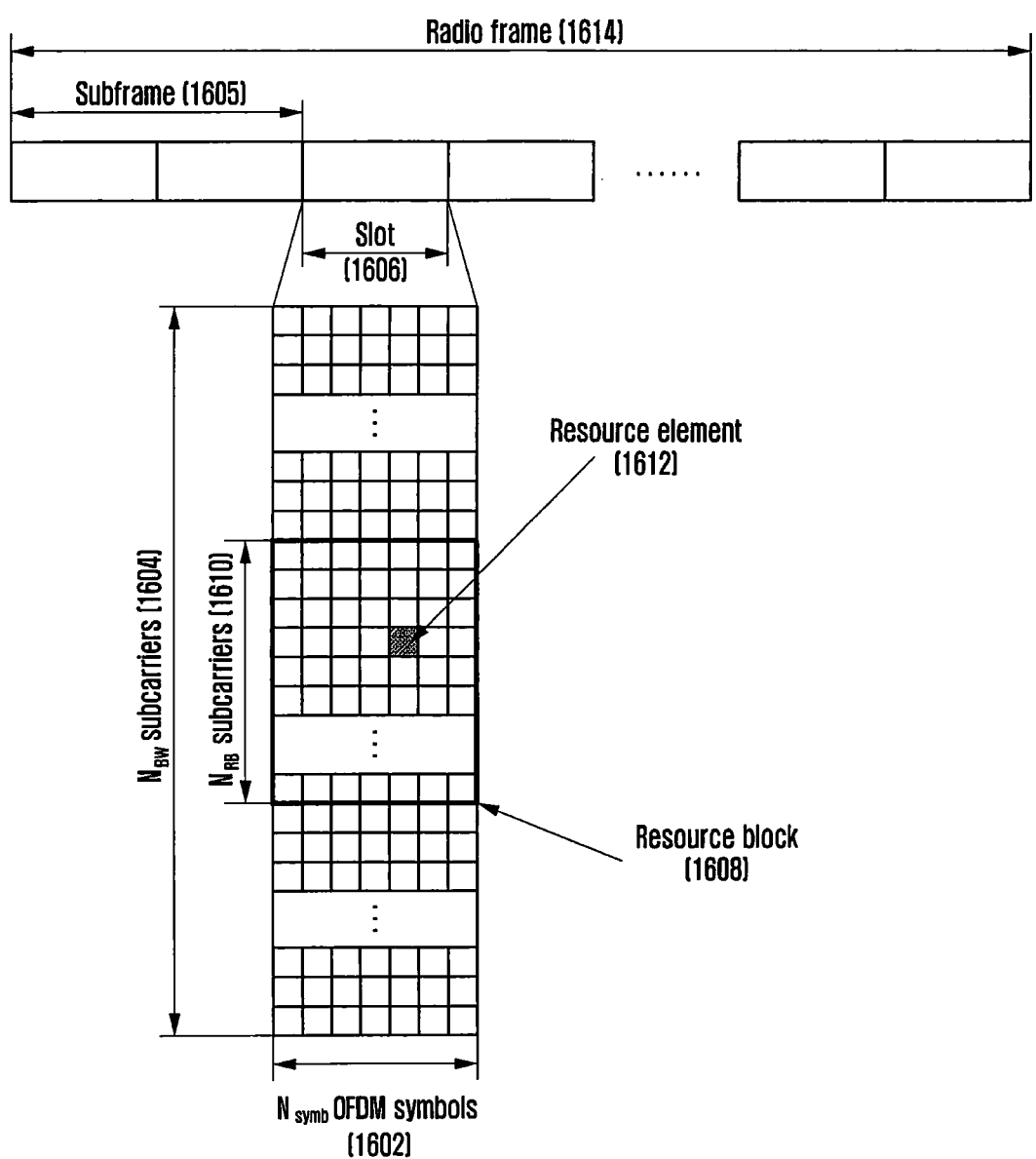
FIG. 16 is a diagram illustrating a basic structure of a time-frequency domain, which is a radio resource region in which data or a control channel is transmitted in a downlink of an LTE system or a system that is similar to the LTE system.

FIG. 16 is a diagram illustrating a basic structure of a time-frequency domain, which is a radio resource region in which data or a control channel is transmitted in a downlink of an LTE system or a system that is similar to the LTE system.

Referring to FIG. 16, a horizontal axis represents a time domain, and a vertical axis represents a frequency domain. In the time domain, the minimum transmission unit is an OFDM symbol, and $N_{symb}$ OFDM symbols 1602 constitute one slot 1606, and two slots constitute one subframe 1605. The length of the slot is 0.5 ms, and the length of the subframe is 1.0 ms. Further, a radio frame 1614 is a time domain region that is composed of 10 subframes. In the frequency domain, the minimum transmission unit is a subcarrier, and the transmission bandwidth of the whole system is composed of $N_{BW}$ subcarriers 1604 in total. However, such numerical values may be variably applied.

In the time-frequency domain, the basic unit of resources is a resource element (RE) 1612 that may be expressed by an OFDM symbol index and a subcarrier index. A resource block (RB) (or physical resource block (PRB)) 1608 may be defined by $N_{symb}$ successive OFDM symbols 1602 in the time domain and $N_{RB}$ successive subcarriers 1610 in the frequency domain. Accordingly, in one slot, one RB 1608 may include $N_{symb} \times N_{RB}$ REs 1612. In general, the frequency domain minimum allocation unit of data is the RB, and in the LTE system, $N_{symb}=7$, $N_{RB}=12$, and $N_{BW}$ may be in proportion to the bandwidth of the system transmission band. The data rate is increased in proportion to the number RBs that are scheduled in the terminal.

The LTE system may define and operate 6 transmission bandwidths. In the case of a FDD system that operates to discriminate a downlink and an uplink by means of frequency, the downlink transmission bandwidth and the uplink transmission bandwidth may differ from each other. A channel bandwidth presents an RF bandwidth that corresponds to the system transmission bandwidth. Table 3 below presents the corresponding relationship between the system transmission bandwidth that is defined by the LTE system and the channel bandwidth. For example, the LTE system having 10 MHz channel bandwidth may have the transmission bandwidth that is composed of 50 RBs.

TABLE 3

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within initial N OFDM symbols in the subframe. In an embodiment, in general, N={1, 2, 3}. Accordingly, in accordance with the amount of the control information to be transmitted to the current subframe, the N value may be variably applied to each subframe. The transmitted control information may include a control channel transmission period indicator indicating how many OFDM symbols the control information is transmitted through, scheduling information on downlink data or uplink data, and information on HARQ ACK/NACK.

In the LTE system, the scheduling information on the downlink data or the uplink data is transferred from the base station to the terminal through DCI. The DCI may be defined in accordance with various formats, and whether the DCI is scheduling information on the uplink data (UL grant) or scheduling information on the downlink data (DL grant) according to the respective formats, whether the DCI is a compact DCI having a small size of the control information, whether spatial multiplexing using multiple antennas is applied, and whether the DCI is a DCI for power control may differ. For example, DCI format 1 that is the scheduling control information on the downlink data (DL grant) may include at least one piece of the following control information.

Resource allocation type 0/1 flag: This indicates whether a resource allocation scheme is of type 0 or type 1. The type 0 allocates resources in the unit of a RBG through application of a bitmap scheme. In the LTE system, the basic unit of scheduling is an RB that is expressed as time and frequency domain resource, and the RBG is composed of a plurality of RBs, and becomes the basic unit of scheduling in the type 0 scheme. The type 1 allocates a specific RB in the RBG.

Resource block assignment: This indicates an RB that is allocated for data transmission. An expressed resource is determined in accordance with the system bandwidth and the resource allocation scheme.

Modulation and coding scheme (MCS): This indicates a modulation scheme that is used for data transmission and the size of a transport block (TB) that is data to be transmitted.

HARQ process number: This indicates a process number of a HARQ.

New data indicator: This indicates whether scheduled data corresponds to HARQ initial transmission or retransmitted.

Redundancy version: This indicates a redundancy version of a HARQ.

Transmission power control (TCP) command for a physical uplink control channel (PUCCH): This indicates a transmission power control command for a PUCCH that is an uplink control channel.

The DCI may pass through a channel coding and modulation process, and may be transmitted on a PDCCH that is a downlink physical control channel (or control information) or on an Enhanced PDCCH (EPDCCH) (or enhanced control information). Hereinafter, the PDCCH or EPDCCH transmission can be understood as transmitting the DCI on the PDCCH or the EPDCCH.

In general, the DCI is scrambled with a specific radio network temporary identifier (RNTI) (or terminal identifier), independently with respect to each terminal, is added with a cyclic redundancy check (CRC) bit, is channel-coded, and then is configured as an independent PDCCH to be transmitted. In the time domain, the PDCCH is mapped during the control channel transmission period to be transmitted. The frequency domain mapping location of the PDCCH may be determined by an ID of each terminal, and may be spread to the whole system transmission band to be transmitted.

The downlink data may be transmitted on a PDSCH that is a physical channel for transmitting the downlink data. The PDSCH may be transmitted after the control channel transmission period, and scheduling information, such as a detailed mapping location in the frequency domain and the modulation scheme, is determined on the basis of the DCI that is transmitted through the PDCCH.

Through an MCS among the control information that constitutes the DCI, the base station reports to the terminal the modulation scheme that is applied to the PDSCH to be transmitted and the transport block size (TBS) of the data to be transmitted. In an embodiment, the MCS may be composed of 5 bits or more or less. The TBS corresponds to the size before a channel coding for error correction is applied to the data, that is, data transport block (TB), which the base station intends to transmit.

The modulation scheme that is supported by the LTE system may be QPSK, 16 quadrature amplitude modulation (16QAM), and 64QAM, and respective modulation orders Qm correspond to 2, 4, and 6. That is, in the case of QPSK modulation, 2 bits per symbol may be transmitted, in the case of 16QAM, 4 bits per symbol may be transmitted, and in the case of 64 QAM, 6 bits per symbol may be transmitted. Further, in accordance with system modification, the modulation scheme of 256QAM or more may be used.

Figure 17:
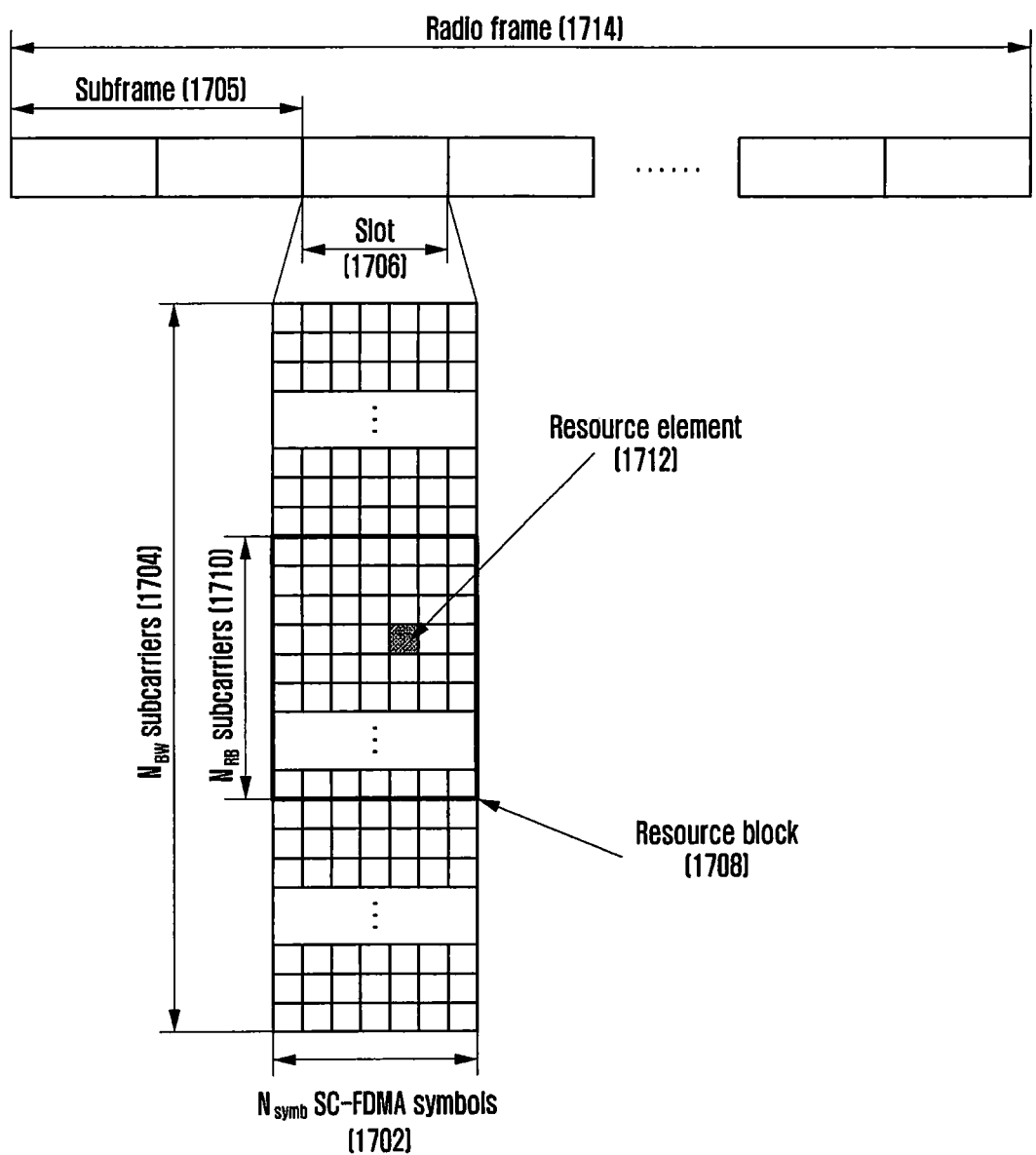
FIG. 17 is a diagram illustrating a basic structure of a time-frequency domain, which is a radio resource region in which data or a control channel is transmitted in uplinks of LTE and LTE-A systems.

FIG. 17 is a diagram illustrating a basic structure of a time-frequency domain, which is a radio resource region in which data or a control channel is transmitted in uplinks of LTE and LTE-A systems.

Referring to FIG. 17, a horizontal axis represents a time domain, and a vertical axis represents a frequency domain. In the time domain, the minimum transmission unit is a SC-FDMA symbol 1702, and $N_{symb}$ SC-FDMA symbols may constitute one slot 1706. Further, two slots constitute one subframe 1705. In the frequency domain, the minimum transmission unit is a subcarrier, and the transmission bandwidth 1704 of the whole system is composed of $N_{BW}$ subcarriers in total. $N_{BW}$ may have a value that is proportion to the system transmission bandwidth.

In the time-frequency domain, the basic unit of resources is an RE 1712 that may be defined by an SC-FDMA symbol index and a subcarrier index. An RB 1708 may be defined by $N_{symb}$ successive SC-FDMA symbols in the time domain and $N_{RB}$ successive subcarriers in the frequency domain. Accordingly, one RB may be composed of $N_{symb} \times N_{RB}$ REs. In general, the minimum transmission unit of data or control information is an RB unit. The PUCCH is mapped on the frequency domain that corresponds to 1 RB, and is transmitted for one subframe.

In the LTE system, the timing relationship may be defined among a PDSCH that is a physical channel for transmitting downlink data, a PUCCH that is an uplink physical channel in which HARQ ACK/NACK corresponding to PDCCH/EPDDCH that includes a semi-persistent scheduling release (SPS release) is transmitted, and a PUSCH. As an example, in the LTE system that operates as a frequency division duplex (FDD), the PDSCH that is transmitted in an (n−4)-th subframe or the HARQ ACK/NACK that corresponds to the PDCCH/EPDCCH that includes the SPS release may be transmitted to the PUCCH or the PUSCH in an n-th subframe.

In the LTE system, the downlink HARQ adopts an asynchronous HARQ scheme in which a data retransmission time is not fixed. That is, if the base station receives a feedback of the HARQ NACK from the terminal with respect to initial transmission data that is transmitted by the base station, the base station freely determines the transmission time of the retransmission data by a scheduling operation. The terminal performs buffering of data that is determined as an error as the result of decoding the received data for the HARQ operation, and then performs combining of the error data with next retransmission data.

If the PDSCH that includes the downlink data that is transmitted from the base station in subframe n is received, the terminal transmits the uplink control information that includes HARQ ACK or NACK of the downlink data in subframe n+k to the base station through the PUCCH or PUSCH. In this case, "k" may be differently defined in accordance with the FDD or TDD of the LTE system and the subframe configuration. As an example, in the case of an FDD LTE system, "k" is fixed to "4". On the other hand, in the case of a TDD LTE system, "k" may be changed in accordance with the subframe configuration and the subframe number. Further, during data transmission through a plurality of carriers, the k value may be differently applied in accordance with the TDD configuration of each carrier.

In the LTE system, unlike the downlink HARQ, the uplink HARQ adopts a synchronous HARQ scheme in which the data transmission time is fixed. That is, the uplink/downlink timing relationship among a PUSCH that is a physical channel for transmitting uplink data, a PDCCH that is a preceding downlink control channel, and a PHICH that is a physical channel in which a downlink HARQ ACK/NACK that corresponds to the PUSCH is transmitted may be defined according to the following rule.

If the terminal receives a PDCCH that includes uplink scheduling control information that is transmitted from the base station in subframe n or a PHICH in which the downlink HARQ ACK/NACK is transmitted, the terminal transmits uplink data that corresponds to the control information through the PUSCH in subframe n+k. In this case, "k" may be differently defined in accordance with the FDD or TDD of the LTE system and the configuration thereof. As an example, in the case of an FDD LTE system, "k" may be fixed to "4". On the other hand, in the case of a TDD LTE system, "k" may be changed in accordance with the subframe configuration and the subframe number. Further, during data transmission through a plurality of carriers, the k value may be differently applied in accordance with the TDD configuration of each carrier.

Further, if the terminal receives a PHICH that includes information related to downlink HARQ ACK/NACK from the base station in subframe i, the PHICH corresponds to the PUSCH that is transmitted by the terminal in subframe i-k. In this case, "k" may be differently defined in accordance with the FDD or TDD of the LTE system and the configuration thereof. As an example, in the case of an FDD LTE system, "k" is fixed to "4". On the other hand, in the case of a TDD LTE system, "k" may be changed in accordance with the subframe configuration and the subframe number. Further, during data transmission through a plurality of carriers, the k value may be differently applied in accordance with the TDD configuration of each carrier.

Figure 18:
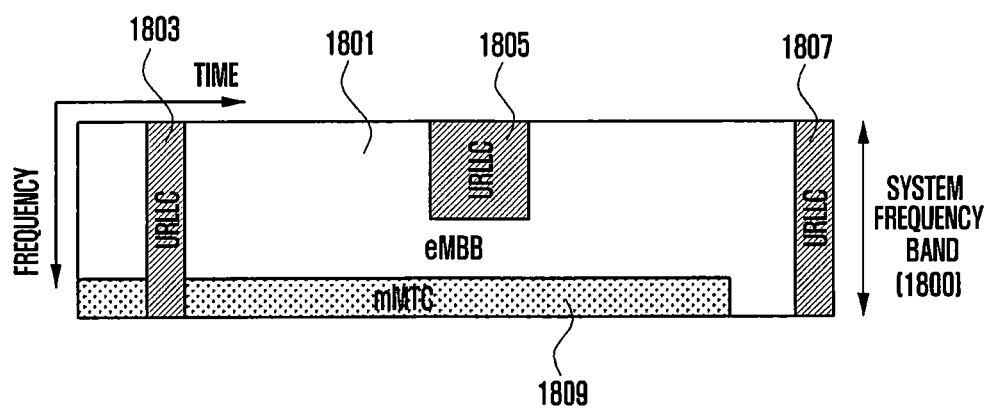
FIGS. 18 and 19 are diagrams illustrating examples in which data for eMBB, URLLC, and mMTC, which are services considered in a 5G or NR system, is allocated in frequency-time resources.
Figure 19:
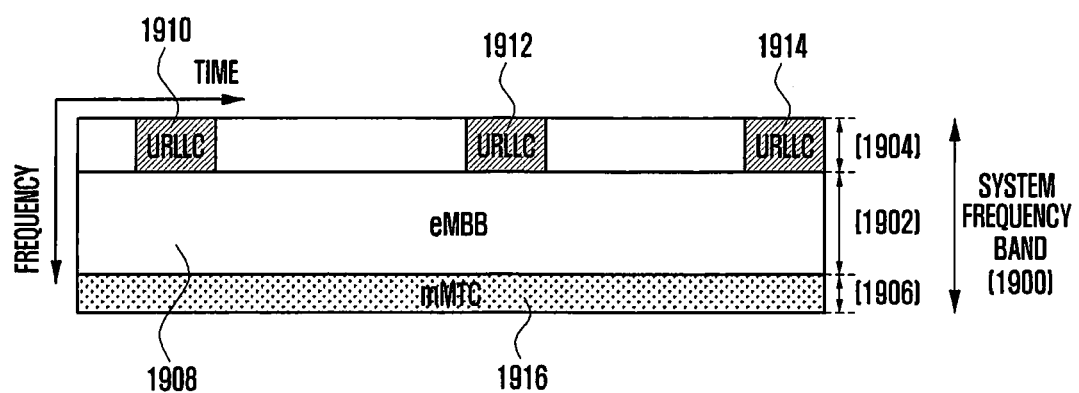

Referring to FIGS. 18 and 19, a method in which frequency and time resources are allocated for information transmission in each system is disclosed.

First, in FIG. 18, data for eMBB, URLLC, and mMTC are allocated in the whole system frequency band 1800. If URLLC data 1803, 1805, and 1807 are generated while eMBB 1801 and mMTC 1809 are allocated and transmitted

TABLE 4

| Transmission mode | DCI format | Search Space | Transmission scheme of PDSCH corresponding to PDCCH |
| --- | --- | --- | --- |
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Closed-loop spatial multiplexing (see subclause 7.1.4)or Transmit diversity (see subclause 7.1.2) |
| Mode 5 | DCI format 1A | Common and UE specific by C-RNTI | Transmit diversity (see subclause 7.1.2) |
|  | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 1 | UE specific by C-RNTI | Single-antenna port; port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 2B | UE specific by C-RNTI | Dual layer transmission; port 7 and 8 (see subclause 7.1.5A) or single-antenna port; port 7 or 8 (see subclause 7.1.1) |

Table 4 above shows supportable DCI format types in accordance with each transmission mode under conditions set by the C-RNTI in 3GPP TS 36.213. The terminal performs search and decoding on the assumption that the corresponding DCI format exists in a control domain interval according to a predetermined transmission mode. For example, if transmission mode 8 is instructed to the terminal, the terminal searches for DCI format 1A in a common search space and a UE-specific search space and searches for DCI format 2B only in the UE-specific search space.

As described above, the wireless communication system has been described on the basis of the LTE system, and the contents of the disclosure are not limited to the LTE system, but may be applied to various wireless communication system, such as NR and 5G. Further, in an embodiment, in the case of applying the disclosure to a different wireless communication system, the disclosure may be applied to a system that uses a modulation scheme that corresponds to the FDD through changing the k value.

FIGS. 18 and 19 are diagrams illustrating examples in which data for eMBB, URLLC, and mMTC, which are services considered in a 5G or NR system, is allocated in frequency-time resources.

in a specific frequency bandwidth, and transmission of the generated data is necessary, a transmitter may transmit the URLLC data 1803, 1805, and 1807 without emptying a portion in which the eMBB 1801 and the mMTC 1809 have already been allocated or without transmitting the eMBB 1801 and the mMTC 1809.

Since it is necessary to reduce a delay time of the URLLC during the service, the URLLC data 1803, 1805, and 1807 may be allocated to a portion of an eMBB-allocated resource 1801 to be transmitted. Of course, if the URLLC data is additionally allocated to the eMBB-allocated resource to be transmitted, eMBB data may not be transmitted in the redundant frequency-time resources, and thus transmission performance of the eMBB data may be lowered. That is, in the above-described case, an eMBB data transmission failure due to the URLLC allocation may occur.

In FIG. 19, respective subbands 1902, 1904, and 1906 that are obtained through division of the whole system frequency band 1900 may be used for the purpose of transmitting services and data. The information related to a subband configuration may be predetermined, and this information may be transmitted from the base station to the terminal through higher layer signaling. Alternatively, the information related to the subband may be optionally divided by the base station or a network node, and services may be provided to the terminal without transmission of separate subband configuration information to the terminal. FIG. 19 illustrates a state where the subband 1902 is used to transmit eMBB data, the subband 1904 is used to transmit URLLC data, and the subband 1906 is used to transmit mMTC data.

In the whole embodiment, the length of a TTI that is used for URLLC transmission may be shorter than the length of the TTI that is used to transmit the eMBB or mMTC. Further, a response to the information related to the URLLC may be transmitted earlier than that of the eMBB or the mMTC, and thus the information can be transmitted and received with a low delay.

In order to transmit the three kinds of services or data as described above, physical layer channel structures that are used by types may differ from each other. For example, at least one of TTI lengths, frequency resource allocation units, control channel structures, and data mapping methods may differ from each other.

Although three kinds of services and three kinds of data have been described, more kinds of services and the corresponding data may exist, and even in this case, the contents of the disclosure could be applied.

The terms "physical channel" and "signal" in the LTE or LTE-A system in the related art may be used to explain a method and an apparatus proposed in an embodiment. However, the contents of the disclosure may be applied to a wireless communication system that is not the LTE or LTE-A system.

The contents of the disclosure are applicable to an FDD or TDD system. In addition, in the disclosure, higher layer signaling is a signal transfer method in which the base station transfers a signal to the terminal using a downlink data channel of a physical layer, or the terminal transfers a signal to the base station using an uplink data channel of a physical layer, and may be mentioned as RRC signaling, PDCP signaling, or a MAC CE.

The contents of the disclosure can be sufficiently applied to the uplink as well as the downlink. That is, in an embodiment, a downlink operation process for explaining a process of transmitting control information and data information from the base station to the terminal can be sufficiently applied to an uplink operation process for explaining a process of transmitting control information and data information from the terminal to the base station.

A first service and a second service described in the disclosure are services satisfying different requirements. For example, the first service may be an eMBB and the second service may be a URLLC, or vice versa. The mMTC may also be a first service or a second service.

Alternatively, one of two of eMBB, URLLC, and mMTC may be a first service and the other may be a second service. The resources described in the disclosure can be used as a concept including time or frequency, or code or space, or all or some thereof.

In the disclosure, there may be a terminal that can use only a first service type and/or a terminal that can use only a second service type. Also, there may be a terminal that can use both the first service type and the second service type. There may also be a terminal that can use a portion of a first service type and a second service type (e.g., one of control information and data information).

Figure 20:
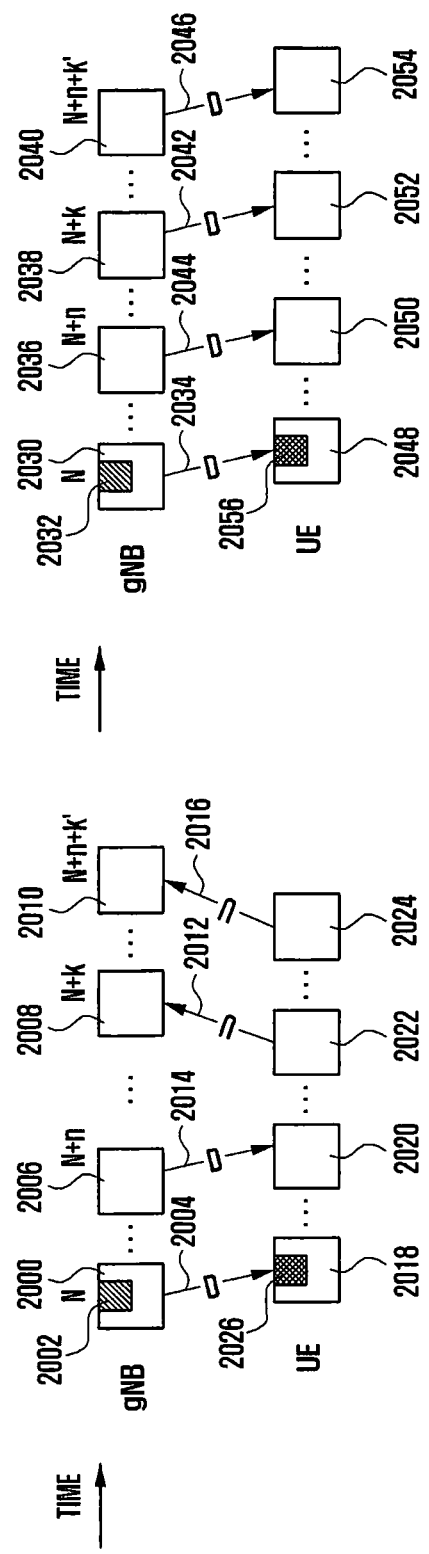
FIG. 20 is a diagram illustrating an example of data transmission and feedback resource configuration between a base station and a terminal.

FIG. 20 is a diagram illustrating an example of data transmission and feedback resource configuration between a base station and a terminal.

In FIG. 20, a base station (gNB) transmits control information and data information 2000 of a first service type to a terminal (UE) in 2004 in an N-th transmission resource (here, the N-th transmission resource can be interpreted as an N-th transmission period, an N-th slot, an N-th mini-slot, an N-th frequency and/or time resource, and the like), and the UE performs a reception result report on the control and data information reception 2018 through an uplink resource 2022 given from the gNB. The N-th transmission resource may be referred to as an N-th resource or an N resource in the disclosure. After receiving the reception result report 2012 of the UE in an (N+k)-th transmission resource in 2008, the gNB may know whether the data transmission of the UE has succeeded or failed.

If control information and data information 2002 of a second service type satisfying requirements different from the first service is generated for the same UE or a different UE in a situation where the gNB schedules the control and data information 2000 of the first service type to an arbitrary terminal, the gNB may use a portion of the resource for first service control or data information transmission in the transmission of the control and data information of the second service type. At this time, in the case of the UE receiving the control information and the data information of the first service type, control information and data information 2026 of the second service type may exist as interference if they are not their own data.

However, if a separate indicator is not transmitted together with the transmission of the control information and data information of the first service type, the UE may determine that demodulation and/or decoding of part or all of the corresponding data due to a channel has failed. On the other hand, if a separate indicator (e.g., a second service occurrence indicator) is transmitted together with the transmission of the control information and data information of the first service type, the UE may determine that the remaining resource 2018 except for the resource 2026 allocated to the control information and data information of the second service type is allocated to the control information and data information of the first service type of the UE, and performs demodulation and/or decoding only on this portion.

Even when some resources are not allocated by the control and data information of the second service type according to the decoding and/or demodulation method of the data information of the first service type, demodulation and/or decoding on the data of the first service type may succeed or demodulation and/or decoding on partial data of the first service type may succeed. For example, when one transmission block is composed of n code blocks (CBs), demodulation and/or decoding on all of the n CBs may be possible through the indicator, or demodulation and/or decoding on a smaller number of CBs than the n CBs may be possible. If demodulation and/or decoding on the data of the first service type fails due to the control and data information of the second service type, the gNB must perform retransmission on the corresponding data.

In the LTE system, fundamentally, the gNB determines that initial data transmission to the UE has failed by receiving feedback from the UE, and then retransmits the data that failed in the transmission. In the NR system, since some of the resources allocated to the control information or data information already allocated to the first service type can be used for the second service type, the gNB may know that demodulation and decoding on the control information or data information of the first service type is unsuccessful even if feedback about the corresponding transmission is not received from the UE. For example, if the control information and data information of the second service type occupy more than x % of the allocated resources for the control information and data information of the first service type to which the control information and data information of the second service type have already been allocated, a situation in which gNB can predict the demodulation and decoding failure on the corresponding data may occur even if the UE successfully performs demodulation and decoding on the control information and data information of the first service type of the remaining resources other than the resource allocated for the control information and data information of the second service type by using the indicator.

Accordingly, when the transmission of some of control information and data information of the first service type to the UE to which the control information and data information of the first service type is allocated is not performed due to the control information and data information of the second service type, the gNB may retransmit the same control information and data information 2006 of the first service type in 2014 before the resource 2008 configured to receive a transmission result feedback of the existing control information and data information of the first service type. In this case, the gNB may retransmit, in 2014, only the control information or data information 2006 of the first service type which is affected by the control information and data information of the second service type before the resource 2008 configured to receive the transmission result feedback of the existing control information and data information of the first service type. Also, the gNB may transmit, in 2014, the control information and data information (or some of these pieces of information) 2006 of the first service type which are previously transmitted together with a separate indicator before the resource 2008 configured to receive the transmission result feedback of the existing control information and data information of the first service type.

A method in which the UE determines the transmission of the same control information and data information of the first service type before the resource 2008 configured to transmit the transmission result feedback of the existing control information and data information of the first service type may be performed through an HARQ process number, a new data indicator (NDI), a redundancy version (RV), an occurrence indicator indicating the occurrence of the data of the second service type, or the like. The occurrence indicator may be configured as a separate bit resource in the control information of the first service type or may be interpreted in connection with some of the existing HARQ process number, NDI, and RV values. For example, if the HARQ process number, the NDI, or the RV confirmed by the reception of the control information has the same value as the HARQ process number, the NDI, the RV of the previously received control information, or if some of these values are the same, the UE may determine that the same data as the previously transmitted data is transmitted. Also, the UE may recognize, through an NDI non-toggle or toggle, that the corresponding transmission is the retransmission of the previously transmitted data information of the first service type through the HARQ process number and the NDI.

Accordingly, the UE determines whether the second service has occurred in the previous transmission through second service type occurrence indicator information. The UE may decide whether to perform HARQ combining or not, or partially perform HARQ combining on the previously transmitted data of the first service type and the currently transmitted data of the first service type through the second service type occurrence indicator information. Through the second service type occurrence indicator information, the location of the resource to which the control and data information of the second service type is allocated from the resource region to which the data of the first service type is allocated may be indicated using the resource composed of time or frequency, space or code, or a combination thereof.

In addition, the UE may determine, through the second service type occurrence indicator, whether the same control information and data information of the first service type occurs before the resource 2008 configured to transmit the transmission result feedback of the existing control information and data information of the first service type. When the second service type occurrence indicator indicates retransmission for the previous transmission, the UE determines that the corresponding data information of the first service type is the data information of the first service type previously transmitted. The data information of the first service type to be retransmitted may refer to a unit of a specific resource region (frequency or time), a code block, or a code block group, which includes the data of the first service type that fails to be transmitted due to the entire data information of the first service type that is desired to be transmitted previously or the data of the second service type or the data of the first service type that fails to be transmitted due to the data of the second service type.

The terminal performs HARQ combining on the previously transmitted data through the second service type occurrence indicator, and receives only the data of the first service type that is retransmitted without performing HARQ combining on the data that fails to be previously transmitted due to the transmission of the control and data information of the second service type. Here, among a plurality of pieces of the retransmitted data of the first service type, there may be a plurality of pieces of data that has been previously scheduled but is not actually transmitted for the transmission of the control and data information of the second service type. Thus, strictly speaking, the retransmission of data that fails to be previously transmitted due to the control and data information of the second service type may be interpreted as initial transmission other than the retransmission. In the disclosure, it is noted that, although actual transmission of the data of the first service type has not been previously performed, a case in which the data that was previously scheduled by the gNB is re-scheduled and transmitted later may be interpreted as retransmission. Such an operation may be interpreted as initial transmission depending on the actual implementation and operation method.

In the disclosure, when the same data (or part of the same data) 2006 is transmitted from the GNB to the UE in 2014 before the resource 2008 that receives a transmission result feedback which is predicted to be received in 2012 by the gNB from the UE, this is called additional data transmission. The additional data transmission may also be named as additional data retransmission or auxiliary data (re)transmission. The additional data transmission occurs in an (N+n)-th resource, where n is greater than 1 and less than k.

The UE may perform HARQ combining on additionally transmitted data 2020 received from the gNB in 2014 and data 2018 previously received in 2004 or perform partial HARQ combining thereon. Also, if the additionally transmitted data 2020 exists, the UE may discard the previously received data 2018 and perform demodulation and decoding on only the additionally transmitted data 2020. Also, the terminal may or may not be allocated with a feedback reporting resource 2024 for the additionally transmitted data from the gNB. For example, if the feedback reporting resource is allocated, the UE may transmit a reception result on the additional data transmission through an (N+n+k')-th resource to the gNB in 2016.

The above-described additional transmission is applicable to other situations other than the case where some of the resources allocated for the control information and data information of the first service type in which the control information and data information of the second service type are previously scheduled are used. Also, the additionally transmitted data may be all of the previously transmitted data or a part of the data. Further, the additionally transmitted data may simultaneously include a part of the previously transmitted data and other data, or may correspond to the previously transmitted data and other data.

In the above-described x-th transmission resource (or resource), the resource means time or frequency, code or space, or a combination of at least one of thereof. If the resource means time, the unit can be interpreted as a slot, a mini-slot, or a group thereof.

In FIG. 20, N denotes a resource to which first data is transmitted, and N+n denotes a resource to which the same (or partially the same) data as the first data is transmitted. N+k denotes a resource on which result feedback reporting is performed for reception, demodulation and decoding on the first data transmitted from the N-th resource, and N+n+k' denotes a resource on which result feedback reporting is performed for reception, demodulation, and decoding on the same (or partially the same) data as the first data transmitted from an (N+n)-th resource. Alternatively, N+n+k' denotes a resource on which result feedback reporting is performed for demodulation and decoding after (partial) HARQ combining on the same (or partially the same) data as the first data transmitted from the N-th resource and the first data transmitted from the (N+n)-th resource is performed.

In addition, the UE receives scheduling-related information on downlink data reception or uplink data transmission which is performed in N-th transmission resources 2000 and 2032 (or slot), from (N+k)-th transmission resources 2008 and 2038 through control information via a UE-common or UE-specific downlink control channel. Information for the downlink data reception or the uplink data transmission corresponds to a DL grant or an UL grant in the LTE system, and a specific HARQ process number is together included in scheduling control information.

If, before the actual (N+k)-th transmission resource, the HARQ process number related to downlink data or uplink data scheduling in the control information received by the UE via the UE-common or UE-specific control channel in the (N+n)-th transmission resources 2006 and 2036 is the same as the HARQ process number in the control information previously received by the UE in the N-th transmission resources 2000 and 2032, the UE may not perform downlink data reception or uplink data transmission in the (N+k)-th transmission resource which has been scheduled in the existing N-th transmission resource. Alternatively, the UE may perform downlink data reception or uplink data transmission in the (N+n+k')-th transmission resource indicated by the control information of the (N+n)-th transmission resources 2006 and 2036.

That is, when the UE receives, in 2020 and 2050, the downlink control information containing the same HARQ process number as the HARQ process number associated with the corresponding data before performing uplink data transmission 2014 or downlink data reception 2042, the UE updates uplink data transmission 2016 or downlink data reception 2046 indicated by downlink control information containing the latest HARQ process number.

In addition, if the UE receives downlink control information containing the same HARQ process number as the HARQ process number associated with the corresponding data before performing the uplink data transmission 2014 or downlink data reception 2042, the terminal follows uplink or downlink data transmission resource configuration indicated by the downlink control information containing the latest HARQ process number and may perform the uplink data transmission 2016 or downlink data reception 2046 in the corresponding transmission resource (or slot).

In addition, if the UE receives downlink control information containing the same HARQ process number as the HARQ process number associated with the corresponding data before performing the uplink data transmission 2014 or the downlink data reception 2042, the UE may not perform the uplink data transmission 2014 or the uplink data reception 2042.

If the UE receives uplink or downlink data allocation information having a specific HARQ process number through the control information, the UE is expected not to receive the control information having the specific HARQ process number before the uplink data transmission 2014 or the downlink data reception 2042 are actually performed. If receiving the control information having the specific HARQ process number before the uplink data transmission or the downlink data reception are performed, the UE determines that uplink data allocation information 2018 or downlink data allocation information 2048 which are scheduled together with the corresponding HARQ process number are canceled.

In FIG. 20, the transmission resources 2000, 2002, 2006, 2008, 2010, 2030, 2032, 2036, 2038, and 2040 of the gNB in FIG. 20 are the same resources as the transmission resources 2018, 2026, 2020, 2022, 2024, 2048, 2056, 2050, 2052, and 2054 in terms of physical channels.

The above operation is normally applicable even if the operation is not according to FIG. 20. The uplink data includes reference signal transmission information for uplink channel information estimation. The downlink data includes reference signal reception information for downlink channel estimation information.

Figure 21:
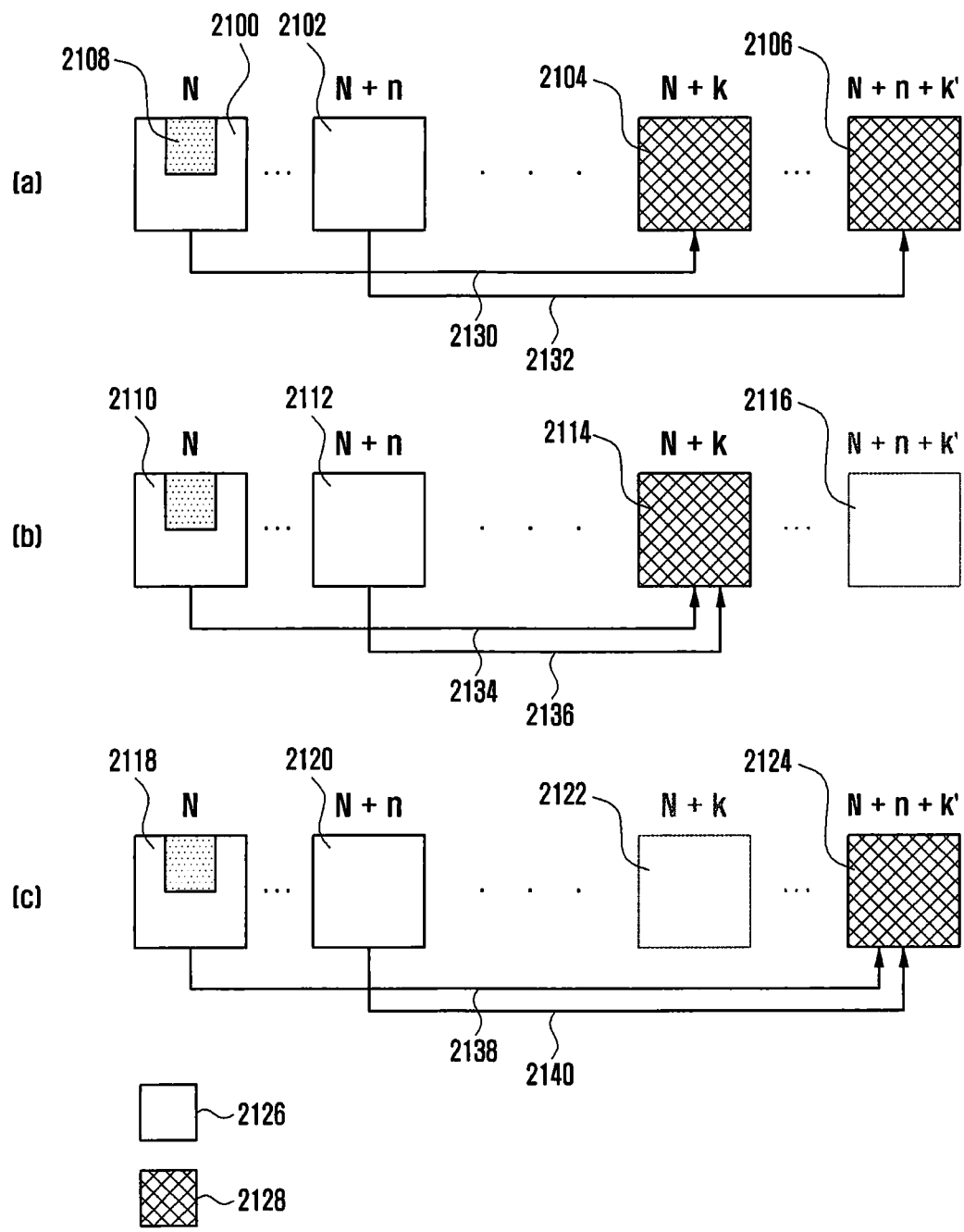
FIGS. 21A to 21C are diagrams illustrating data transmission and feedback relationship between a base station and a terminal.

FIGS. 21A to 21C are diagrams illustrating data transmission and feedback relationship between a base station and a terminal.

In FIGS. 21A to 21C, a base station may transmit control information and data information to a terminal using an N-th resource in 2100, and may receive the corresponding reception result feedback from the terminal through an (N+k)-th resource in 2104. If additional transmission of the same control information and data information or a part thereof is performed using the (N+n)-th resource in 2102, the corresponding reception result feedback may be received through an (N+n+k')-th resource from the terminal in 2106. Here, reference numeral 2126 denotes a downlink resource and reference numeral 2128 denotes an uplink resource. In such a situation, the terminal may perform briefly three different feedback reporting processes.

FIG. 21A illustrates a case in which a base station receives feedback on each transmission through different resources. In this case, a feedback 2130 for a first transmission and a feedback 2132 for a second transmission (or additional transmission) are respectively present. The feedback result of the second transmission may be a result obtained by the terminal performing (partially) HARQ combining with first transmitted data or may be a result obtained by demodulating or decoding second transmitted data itself. This operation is performed in a situation where all or a part of data of HARQ process number, NDI, and RV is different, and this operation is fundamentally supported even by an LTE system.

FIG. 21B illustrates a case in which a feedback 2136 on a second transmission is performed through a feedback resource 2114 on a first transmission. That is, the feedback on the second transmission may be performed by using the feedback resource on the first transmission, and the terminal ignores the feedback result for the first transmission. Alternatively, the feedback result for the first transmission and the feedback result for the second transmission may be bundled or multiplexed and transmitted using the feedback resource for the first transmission. Such an operation may be determined according to a relationship between n and k. For example, if k is sufficiently larger than n, the terminal may report the feedback for the second transmission (or additional transmission) to the base station via the feedback resource for the first transmission. Also, if there is no feedback related information in control information transmitted together during the second transmission, the terminal may transmit the feedback result for the second transmission to the base station through the feedback resource configured for the first transmission.

FIG. 21C illustrates a case in which a feedback 2138 on a first transmission is performed through a feedback resource 2124 for a second transmission other than the feedback resource for the first transmission. That is, the feedback result for the first transmission is reported via the feedback resource 2124 allocated for the second transmission, such as the feedback result for the second transmission. At this time, the terminal can report HARQ (partial) combining of the first transmission and the second transmission or only the second transmission result through the feedback resource allocated to the second transmission. That is, the feedback result and resource for the first transmission may all be ignored in terms of the terminal. Such an operation is possible when k is not sufficiently larger than n. That is, if the time required to prepare the feedback for the second transmission result is later than the feedback time for the first transmission result, the terminal may transmit the feedback resource for the second transmission result. Also, when the terminal unconditionally receives the second transmission (or the additional transmission), the terminal may perform feedback reporting on the first transmission result or the second transmission result only with the feedback resource indicated in the second transmission. Also, if there is no feedback resource configuration for the corresponding data information transmitted for the second transmission, the terminal may use a value indicated by the previous L1 signaling or a value indicated by the higher layer signaling such as RRC or MAC CE as the feedback resource.

In addition, if control information (downlink control information (DCI)) having the same HARQ process number, NDI, and RV or new control information in which some of the HARQ process number, NDI, and RV are the same (by the same control information having HARQ process number, NDI, or RV which is previously received) is received before a predicted HARQ feedback resource (e.g., timing), the feedback on the data information (or PDSCH) received through the HARQ feedback resource (or PUCCH resource) indicated by the corresponding new control information may be transmitted. Also, in a situation where control information (DCI) having the same HARQ process number, NDI, and RV or new control information in which some of HARQ process number, NDI, and RV are the same (by the same control information having HARQ process number, NDI, or RV which is previously received) is received before a predicted HARQ feedback resource, if there is no HARQ feedback resource (or PUCCH resource) indicated by the corresponding new control information, the terminal may transmit the feedback on the data information (or PDSCH) received through the HARQ feedback resource previously indicated through L1, SIB, RRC, or MAC CE.

In addition, when control information containing a separate indicator (e.g., second service type occurrence indicator) is received before a predicted HARQ feedback resource (e.g., timing), the terminal may transmit the feedback on data information (or PDSCH) received through the HARQ feedback resource (or PUCCH resource) indicated by the corresponding control information. Also, if the control information containing the separate indicator (e.g., second service type occurrence indicator) is received before the predicted HQRQ feedback resource (e.g., timing) and there is no HARQ feedback resource (or PUCH resource) indicated by the corresponding control information, the terminal may transmit the feedback on the data information (or PDSCH) received through the HQRQ feedback resource previously indicated by L1, SIB, RRC, or MAC CE.

In addition, in a case of using only one feedback resource, the terminal may report results obtained by performing HARQ combining on first transmitted data and second transmitted (or additionally transmitted) data and demodulating and decoding the same or results obtained by demodulating and decoding the second transmitted data to the base station through the feedback resource.

In FIG. 21A, N denotes a resource to which the first data is transmitted, and N+n denotes a resource to which the same (or partially the same) data as the first data is transmitted. N+k denotes a resource on which result feedback reporting is performed for the first data reception, and demodulation and decoding transmitted from the N-th resource, and N+n+k' denotes a resource on which result feedback reporting is performed for reception, and demodulation and decoding on the same (or partially the same) data as the first data transmitted from the (N+n)-th resource. Alternatively, N+n+k' may denote a resource on which result feedback reporting is performed for demodulation and decoding after performing (partial) HARQ combining on the first data transmitted from the N-th resource and the same (or partially the same) data as the first data transmitted from the (N+n)-th resource.

In FIG. 21B, N denotes a resource to which first data is transmitted and N+n denotes a resource to which the same (partial same) data as the first data is transmitted. N+k denotes a resource on which result feedback reporting is performed for demodulation and decoding after performing (partial) HARQ combining on the first data transmitted from the N-th resource and the same (partial same) data as the first data transmitted from the (N+n)-th resource. Alternatively, N+k denotes a resource that feeds back each of individual demodulation and decoding results for individual data transmissions.

In FIG. 21C, N denotes a resource to which the first data is transmitted, and N+n denotes a resource to which the same (or partially the same) data as the first data is transmitted. N+n+k' denotes a resource on which result feedback reporting is performed for demodulation and decoding after performing (partial) HARQ combining on the first data transmitted from the N-th resource and the same (partial same) data as the first data transmitted from the (N+n)-th resource. Alternatively, N+n+k' may denote a resource that feeds back each of individual demodulation and decoding results for individual data transmissions.

Figure 22:
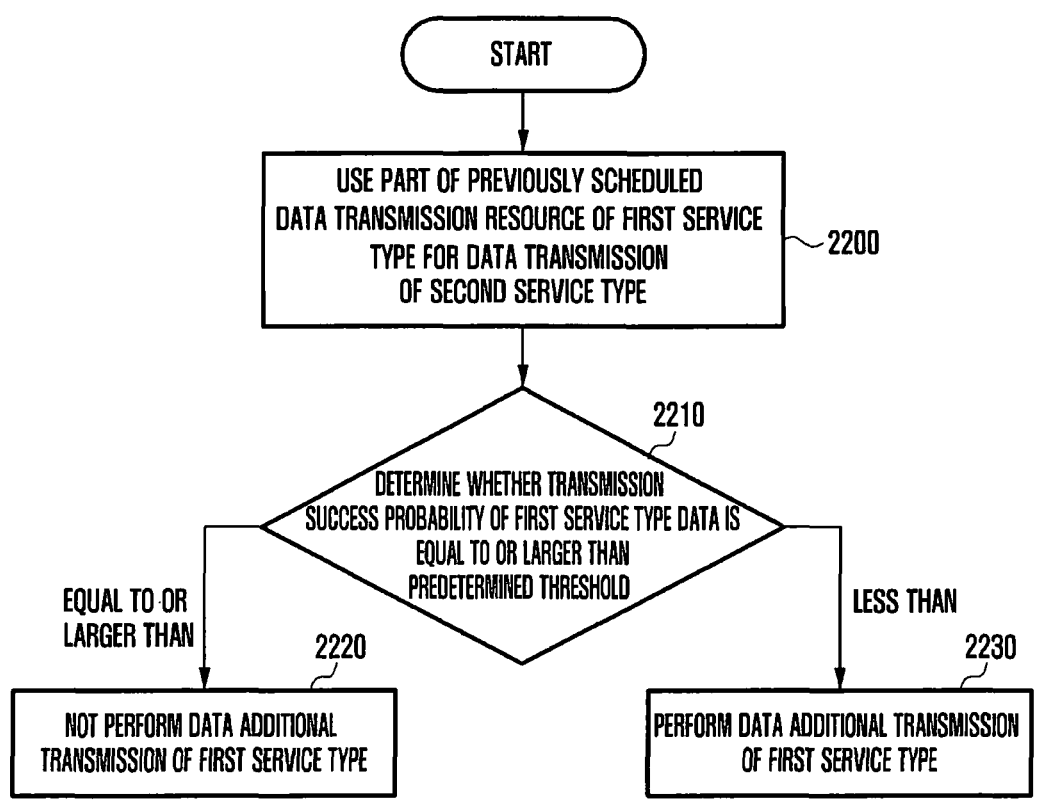
FIG. 22 is a diagram illustrating an example of the operation of a base station for additional data transmission.

FIG. 22 is a diagram illustrating an example of the operation of a base station for additional data transmission.

In operation 2200, a base station determines the use of a part of a first (service) type data transmission resource prescheduled for a specific terminal for the purpose of second (service) type data transmission. At this time, in operation 2210, the base station determines a transmission success probability of the first service type data due to the resource used for the second service type data. If the data transmission success probability is high (that is, is equal to or larger than a predetermined threshold value), the base station does not perform first (service) type data additional transmission in operation 2220. If the data transmission success probability is low (that is, is less than the threshold value), the base station performs the first (service) type data additional transmission in operation 2230. The transmission success probability of data having the first service type may be comprehensively determined by a ratio of the remaining resources excluding the resources used for data of the second service type to the total allocated resources among the resources allocated for data of the first service type, a modulation value of the data having the first service type, a size of a transmission block, and the number of code blocks, or may be determined by considering only some values thereof.

In addition to the determination operation of operation 2210, whether additional transmission is performed may be determined by ACK/NACK feedback resource (e.g., timing) indicated by control information of the prescheduled first service type. For example, if the control information and data information of the first service type are transmitted from the base station to the terminal at the n-th resource or time, ACK/NACK reporting for the corresponding transmission result is performed in n+k, and k may be determined as a value determined through the control information, a value predetermined by higher layer signaling, or a predetermined value. At this time, in a case in which a situation such as operation 2200 occurs, the base station may perform additional transmission if k is larger than an arbitrary value. On the other hand, if k is smaller than the arbitrary value, the base station may not perform additional transmission. Alternatively, other determination conditions may be applied. Also, an operation combining the transmission success probability and the HARQ feedback timing can be applied.

Embodiments to be described later in the disclosure may be performed by the terminal receiving specific configuration information by higher layer signaling. For example, if A and B modes are present and the terminal is set to A mode by higher layer signaling, the terminal may operate in the A mode until an additional higher layer signaling configuration is received later. Also, the embodiments described below may be performed in combination with each other or independently of each other.

Second-1 Embodiment

Figure 23:
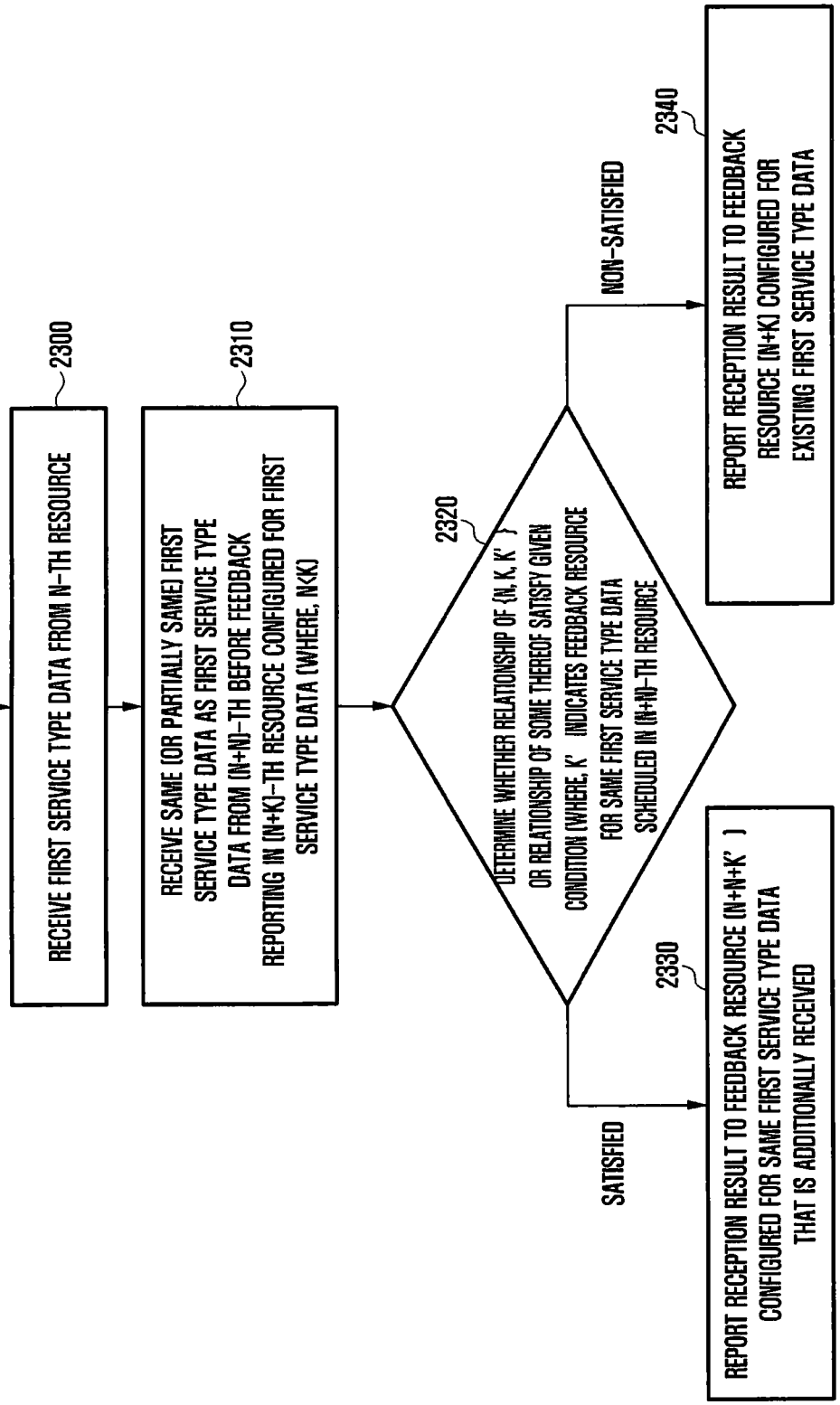
FIG. 23 is a diagram illustrating the operation of a terminal that receives additional data according to a second-1 embodiment.

FIG. 23 is a diagram illustrating the operation of a terminal that receives additional data according to a second-1 embodiment.

In operation 2300, a terminal first receives data of a first (service) type from a base station in an N-th resource. Next, in operation 2310, the terminal receives first service type data which is the same (partially the same) as data of the first service type in an (N+n)-th resource before feedback reporting in an (N+k)-th resource configured for the data of the first service type. Here, determination of the identity of the data of the first service type may be performed through a configuration value such as HARQ process number, NDI, or RV in control information transmitted together with the data information of the first service type. Here, n is generally considered to be smaller than k. Next, in operation 2320, the terminal determines whether a relationship of {n, k, k' } values or a relationship of some of {n, k, k' } satisfies at least one of the following conditions.

k ◇ n> alpha (where alpha is an arbitrary constant value)
k' ◇ k> beta (where beta is an arbitrary constant value)
k' ◇ n> theta (where theta is an arbitrary constant value)
k' ◇ k ◁ n> gamma (where gamma is an arbitrary constant value)
◇, ◁ is arithmetic operation (addition, subtraction, multiplication, and division) or a function operator of log or exp.

Here, N+n+k' is a feedback resource for the first type data scheduled for the (N+n)-th resource, and the control information transmitted together with the data information in the (N+n)-th resource may or may not include the configuration information. If the configuration information is not included, the terminal uses a value configured by L1 signaling such as the previously received PDCCH or higher layer signaling such as SIB, RRC, or MAC CE.

The terminal determines whether all or some of the above conditions are satisfied. If all or some of the above-described conditions are satisfied, the terminal reports a feedback result to a feedback resource (N+n+k') configured (or including the previously transmitted data) for data having the same (or partially the same) first service type received through additional transmission in operation 2430. If all or some of the above-described conditions are not satisfied, the terminal reports a reception result to the feedback resource (N+k) configured for the existing first type data in operation 2440.

The condition search result for reporting the feedback result is divided to whether the feedback result is reported to the feedback resource configured for the existing first type data or whether the feedback result is reported to the feedback resource configured for the data having the same (or partially the same) first service type received through additional transmission. That is, the condition search result corresponds to a method of determining whether the feedback resource is selected as N+k or N+n+k'. The terminal may transmit the result obtained by performing demodulation and decoding by performing HARQ combining on data transmitted twice, to the selected feedback resource, or may transmit the result obtained by performing demodulation and decoding on recently transmitted data to the selected feedback resource.

In the above example, as to whether the feedback result is reported to the feedback resource configured (that is N+k resource) configured for the existing (transmitted through N resource) first type data or whether the feedback result is reported to the feedback resource configured (that is N+n+k' resource) configured for the same data having the same (or partially the same) first service type received through additional transmission (through N+n resource), the terminal may select and report one of two resources through the relation of {n, k, k' }. This operation is possible when the terminal receives both k or k' or both the values from the base station through higher layer signaling or when the value is a predetermined value from the beginning. That is, when k or k' or the two values are not transmitted from the base station to the terminal by L1 signaling, the corresponding operation is possible. Alternatively, if k or k' or the two values are transmitted from the base station to the terminal by L1 signaling, the terminal may unconditionally follow k'. Here, if k' indicates the (N+K)-th resource, it is also possible to interpret as using a PUCCH or PUSCH resource configured to perform feedback on the data transmission of the first service type.

Second-2 Embodiment

Figure 24:
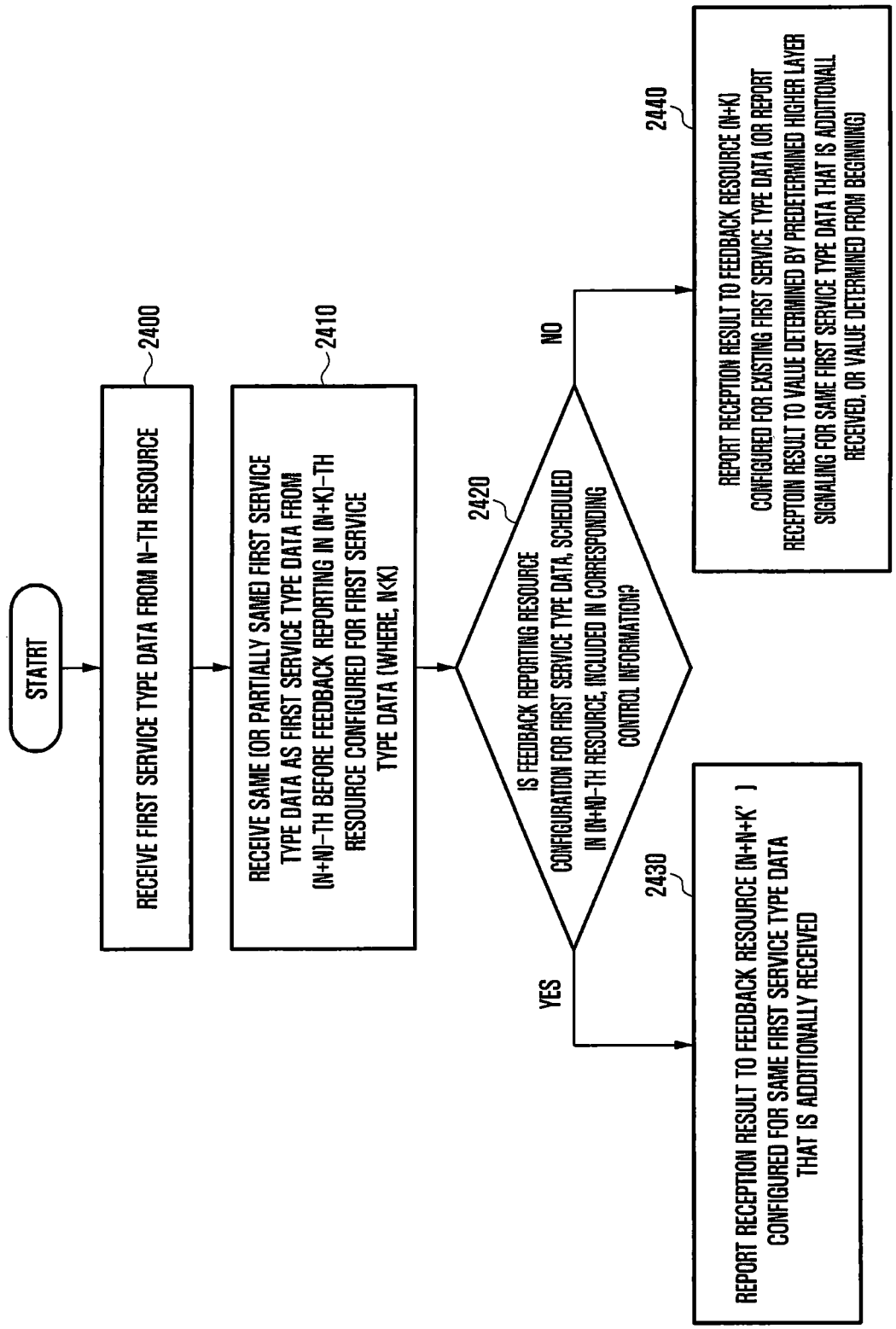
FIG. 24 is a diagram illustrating the operation of a terminal that receives additional data according to a second-2 embodiment.

FIG. 24 is a diagram illustrating the operation of a terminal that receives additional data according to a second-2 embodiment.

In operation 2400, a terminal first receives data of a first (service) type in an N-th resource from a base station. Next, in operation 2410, the terminal receives first service type data which is the same (or partially the same) as data of the first service type in an (N+n)-th resource before feedback reporting in an (N+k)-th resource configured for the data of the first service type. Here, determination of the identity of the data of the first service type may be performed through a configuration value such as HARQ process number, NDI, or RV in control information transmitted together with the data information of the first service type. Here, n is generally considered to be smaller than k. Next, in operation 2420, the terminal determines whether feedback reporting resource configuration for the first type data scheduled in the (N+n)-th resource is included in the corresponding control information.

If the feedback reporting resource configuration is included in the corresponding control information, the terminal reports the feedback result to the feedback resource (N+n+k') configured for the same (or partially the same) data having the first service type (or including previously transmitted data) received through additional transmission in operation 2430. If the feedback reporting resource configuration is not included in the corresponding control information, the terminal reports a reception result to the feedback resource (N+k) configured for the existing first type data in operation 2440. The condition search result for reporting the feedback result is divided to whether the feedback result is reported to the feedback resource configured for the existing first type data or whether the feedback result is reported to the feedback resource configured for the data having the same (or partially the same) first service type received through additional transmission. That is, the condition search result corresponds to a method of determining whether the feedback resource is selected as N+k or N+n+k'.

Among individually configured feedback resources, the terminal may transmit the result obtained by performing demodulation and decoding by performing HARQ combining on data transmitted twice, to the selected feedback resource, or may transmit only the result obtained by performing demodulation and decoding on recently transmitted data to the selected feedback resource. Alternatively, if the feedback reporting resource configuration is not included in the corresponding control information, the terminal reports the reception result using a value determined by predetermined higher layer signaling for the same first service type data which is additionally received, or a value determined from the beginning. That is, even when the feedback reporting resource configuration is not included therein, a method of applying the determined value by higher layer signaling such as SIB, RRC, or MAC CE or applying a value determined as a system default value from the beginning is possible. In this case, k and k' themselves may be determined by the higher layer signaling described above, other than the value determined by L1 signaling, or may be system default values applied from the beginning (operation 2440).

Second-Third Embodiment

Figure 25:
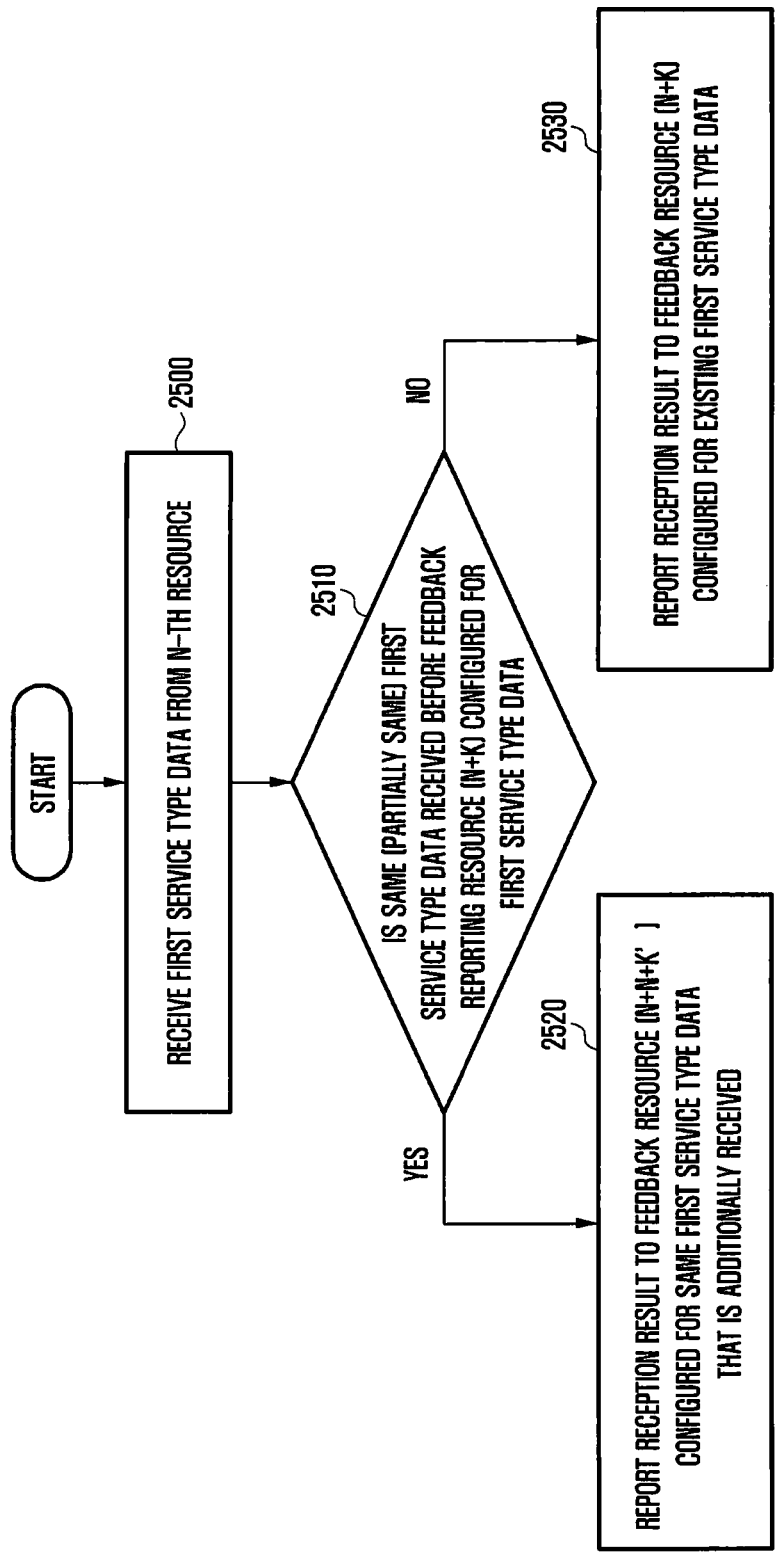
FIG. 25 is a diagram illustrating the operation of a terminal that receives additional data according to a second-3 embodiment.

FIG. 25 is a diagram illustrating the operation of a terminal that receives additional data according to a second-3 embodiment.

In operation 2500, a terminal receives first service type data in an N-th resource. The terminal determines that the result report on data reception of the first service type is made in an (N+k)-th resource. Next, in operation 2510, the terminal determines whether to additionally receive the same (or partially the same) first type data before (N+k) that is a feedback reporting resource configured for the data of the first service type. Here, determination of the identity of the data of the first service type may be performed through a configuration value such as HARQ process number, NDI, or RV in control information transmitted together with the data information of the first service type. If the same first type data is additionally received, the terminal reports the reception result to the feedback resource (N+n+k') configured for the same first type data additionally received in operation 2520. The configuration of the feedback resource (N+n+k') may be confirmed through the control information transmitted together with the first service type data or may be confirmed through SIB, RRC, or MAC CE. In this case, the terminal may use the result obtained by performing demodulation and decoding on the same data information transmitted twice through (partial) HARQ combining that considers or does not consider a separate indicator, as the feedback result, or may use the result obtained by performing demodulation or decoding on only the most recently transmitted data information among two transmissions as the feedback result. If there is no additional data reception, the terminal reports the reception result to the feedback resource (N+k) configured for the existing first type data in operation 2530.

Second-4 Embodiment

Figure 26:
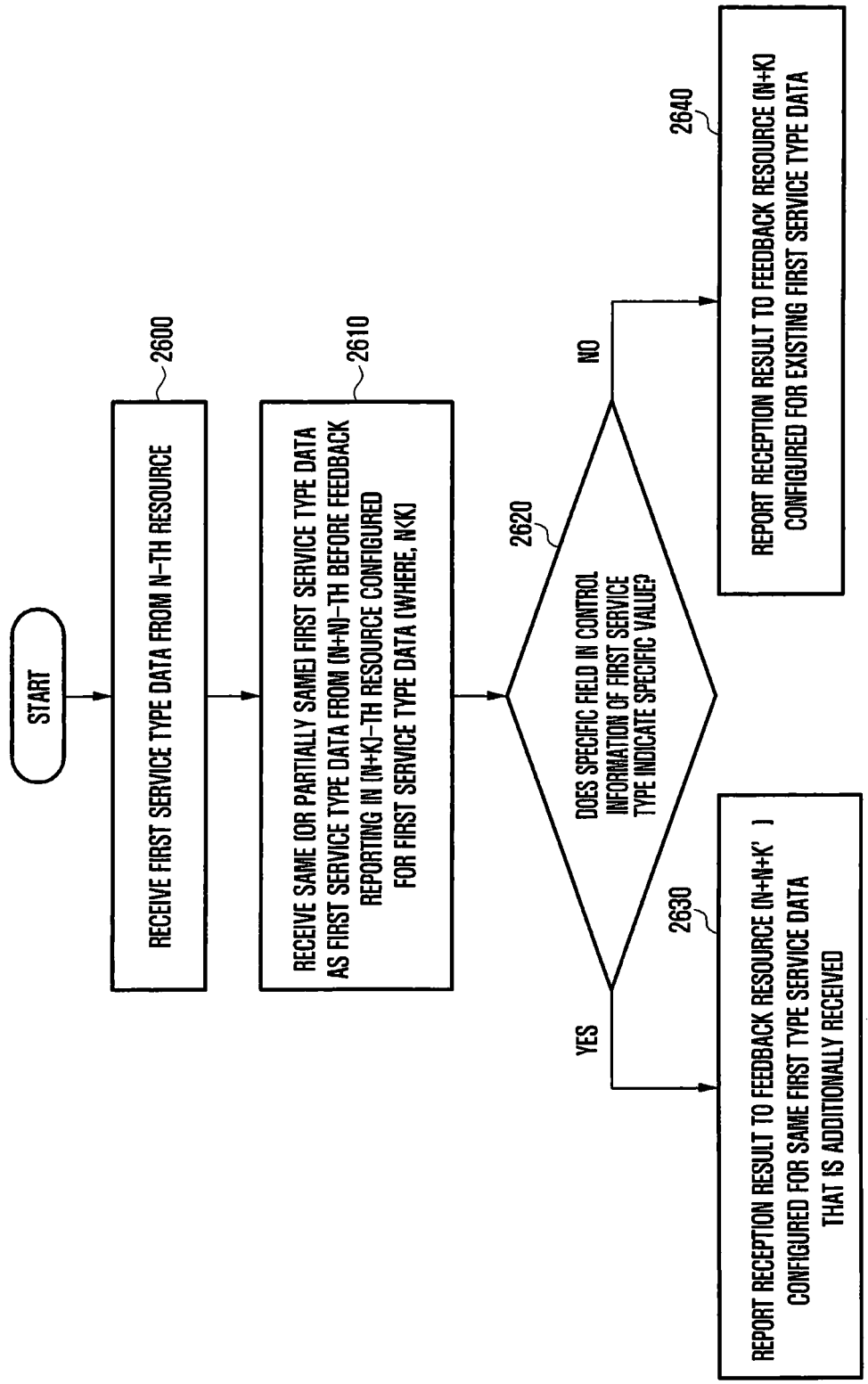
FIG. 26 is a diagram illustrating the operation of a terminal that receives additional data according to a second-4 embodiment.

FIG. 26 is a diagram illustrating the operation of a terminal that receives additional data according to a second-4 embodiment.

In operation 2600, a terminal first receives data of a first service type in an N-th resource from a base station. Next, in operation 2610, the terminal receives the same (or partially the same) first service type data as the data of the first service type from the (N+n)-th resource before the feedback reporting in the (N+k)-th resource configured for the data of the first service type. Here, determination of the identity of the data of the first service type may be performed through a configuration value such as HARQ process number, NDI, or RV in control information transmitted together with the data information of the first service type. Here, n is generally considered to be smaller than k. Next, in operation 2620, the terminal determines whether a specific field in the control information of the first service type scheduled in the (N+n)-th resource indicates a specific value. For example, if the HARQ process number is included in a specific value or a specific range, the terminal reports the reception result to the feedback resource (N+n+k') configured for the same first service type data that is additionally received, in operation 2630. Alternatively, if the HARQ process number is not included in the specific value or the specific range, the terminal reports, in 2640, the reception result to the feedback resource (N+k) configured for the existing first service type data. As described above, the HARQ process number is taken as an example, but MCS, NDI, RV, resource allocation field, or a control information resource (frequency and/or time) region in which the control region is decoded or the terminal successfully searches corresponds to the configuration value. That is, the fields constituting the control region, which are used in the LTE system, may serve as a criterion enabling the corresponding operation. A combination of the respective fields can also be used as such a criterion.

Second-5 Embodiment

Figure 27:
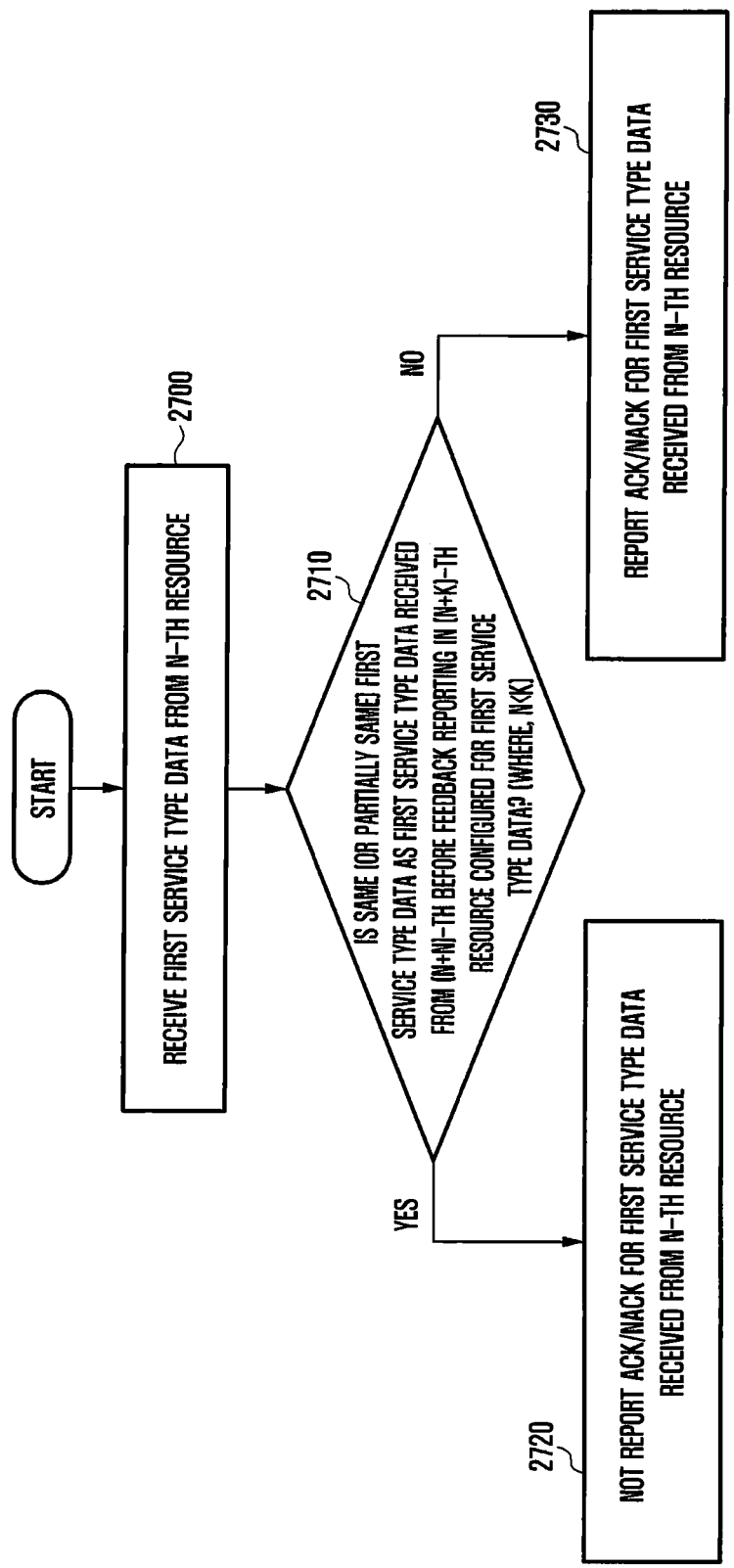
FIG. 27 is a diagram illustrating the operation of a terminal that receives additional data according to a second-5 embodiment.

FIG. 27 is a diagram illustrating the operation of a terminal that receives additional data according to a second-5 embodiment.

In FIG. 27, in operation 2700, a terminal receives first service type data from an N-th resource. Next, in operation 2710, the terminal determines whether there is the reception of the same (or partially the same) first service type data as the first service type data in an (N+n)-th resource before feedback reporting in an (N+k)-th resource configured for the first service type data. A criterion that the terminal determines whether the data of the first service type transmitted from the (N+n)-th resource is the same as the data of the first service type transmitted from the N-th resource is as follows. Depending on whether an HARQ process number contained in control information of the first service type transmitted from the (N+n)-th resource is the same as an HARQ process number contained in control information of the first service type transmitted from the N-th resource and has a different NDI value, determination of whether the data of the first service type transmitted from the (N+n)-th resource is the same as the data of the first service type transmitted from the N-th resource may be possible. That is, if the corresponding data has the same HARQ process number and a different (or the same) NDI value, the terminal may determine that the corresponding transmission is retransmission for the previous transmission. Here, as to the RV value, the control information of the first service type transmitted from the N-th resource and the control information of the first service type transmitted from the (N+n)-th resource may have different values or the same value.

Alternatively, if the corresponding data has the same HARQ process number, the terminal may determine whether the data of the first service type transmitted from the N-th resource and the data of the first service type transmitted from the (N+n)-th resource are the same or different from each other through a second service type occurrence indicator. The second service type occurrence indicator may be always included in the control information or included only in the DCI to be retransmitted. A method in which the second service type occurrence indicator is included only in the DCI to be retransmitted is applicable to a case in which the NDI value is not toggled with the previous value. A method of determining whether the data of the first service type transmitted from the N-th resource and the data of the first service type transmitted from the (N+n)-th resource are the same can be commonly applied to the disclosure including the present embodiment.

In operation 2720, if it is determined that the data of the first service type transmitted from the N-th resource and the data of the first service type transmitted from the (N+n)-th resource are the same, the terminal does not perform ACK/NACK reporting for the first service type data received from the N-th resource. In other words, if the above condition (determination of identity) is satisfied even though the ACK/NACK reporting resource for the first service type data received from the N-th resource is configured, this means that the ACK/NACK reporting for the first service type data received from the N-th resource through the corresponding resource is not performed. In operation 2730, if it is determined that the data of the first service type transmitted from the N-th resource and the data of the first service type transmitted from the (N+n)-th resource are not the same, the terminal, performs HARQ ACK/NACK reporting for the first service type data received from the N-th resource in the configured resource. As to a method of indicating the ACK/NACK reporting resource configuration, the ACK/NACK reporting resource may be dynamically configured as the control information of the first service type associated with the data of the first service type (L1 signaling), or may be configured as RRC (or MAC CE) in a quasi-static or static manner. Alternatively, quasi-static and dynamic manners can be combined. For example, if multiple HARQ ACK/NACK reporting resources are determined in a quasi-static manner, one (or several) of the multiple HARQ ACK/NACK reporting resources can be dynamically selected. This method is sufficiently applicable to HARQ ACK/NACK feedback reporting on data transmission of other first service type.

Second-6 Embodiment

Figure 28:
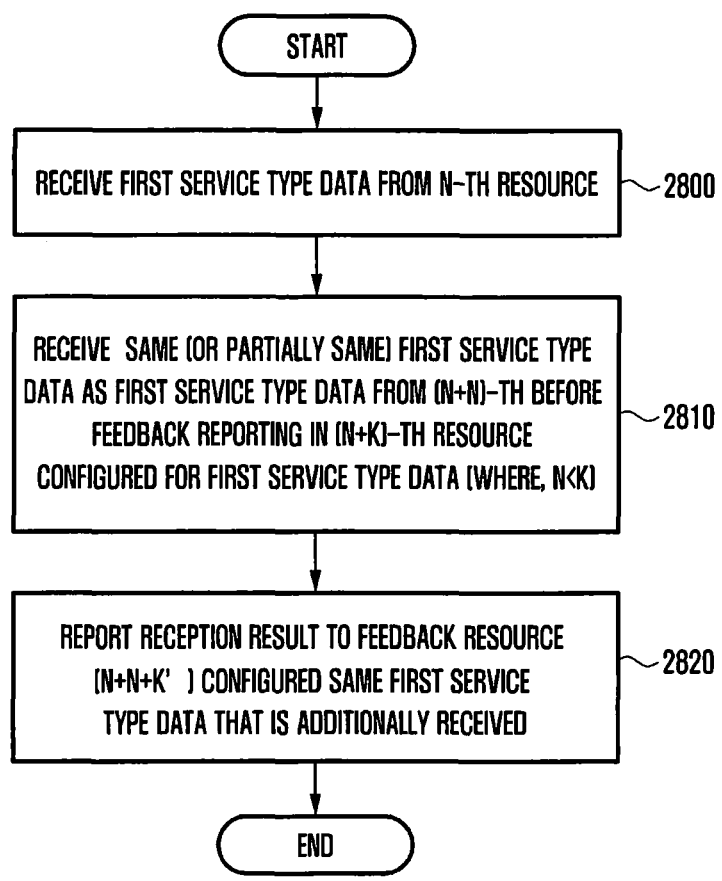
FIG. 28 is a diagram illustrating the operation of a terminal that receives additional data according to a second-6 embodiment.

FIG. 28 is a diagram illustrating the operation of a terminal that receives additional data according to a second-6 embodiment.

In FIG. 28, in operation 2800, a terminal receives first service type data from an N-th resource. Next, the terminal determines whether there is the reception of the same (or partially the same) first service type data as the first service type data in an (N+n)-th resource before feedback reporting in an (N+k)-th resource configured for the first service type data. The process described in the second-5 embodiment is equally applicable to the above-described determination method. The terminal receives data information of the first service type from the (N+n)-th resource in operation 2810, and then reports a feedback result in a feedback resource (e.g., N+n+k') indicated by the control information of the first service type associated with the data information of the first service type received from the (N+n)-th resource in operation 2820. Alternatively, if there is no feedback resource indicated by the control information of the first service type, the terminal assumes that the feedback resource is determined according to a value known by the previous higher layer signaling or a predetermined specific (default) value on the system, and reports the feedback using the corresponding resource in operation 2820. With respect to the feedback result, the terminal may report only the reception, demodulation and decoding results of the data information of the first service type received from the (N+n)-th resource. This operation is applicable when there is no second service type occurrence indicator (that is, information indicating which part of the resource allocated to the information of the first service type transmitted from the N-th resource is used for data of the second service type). Alternatively, the terminal may report the demodulation and decoding results after performing HARQ combining on the data information of the first service type received from the N-th resource and the (N+n)-th resource, respectively. This operation is applicable when there is the second service type occurrence indicator (that is, information indicating which part of the resource allocated to the information of the first service type transmitted from the N-th resource is used for data of the second service type) included in the control information of the first service type received from the (N+n)-th resource.

Second-7 Embodiment

Figure 29:
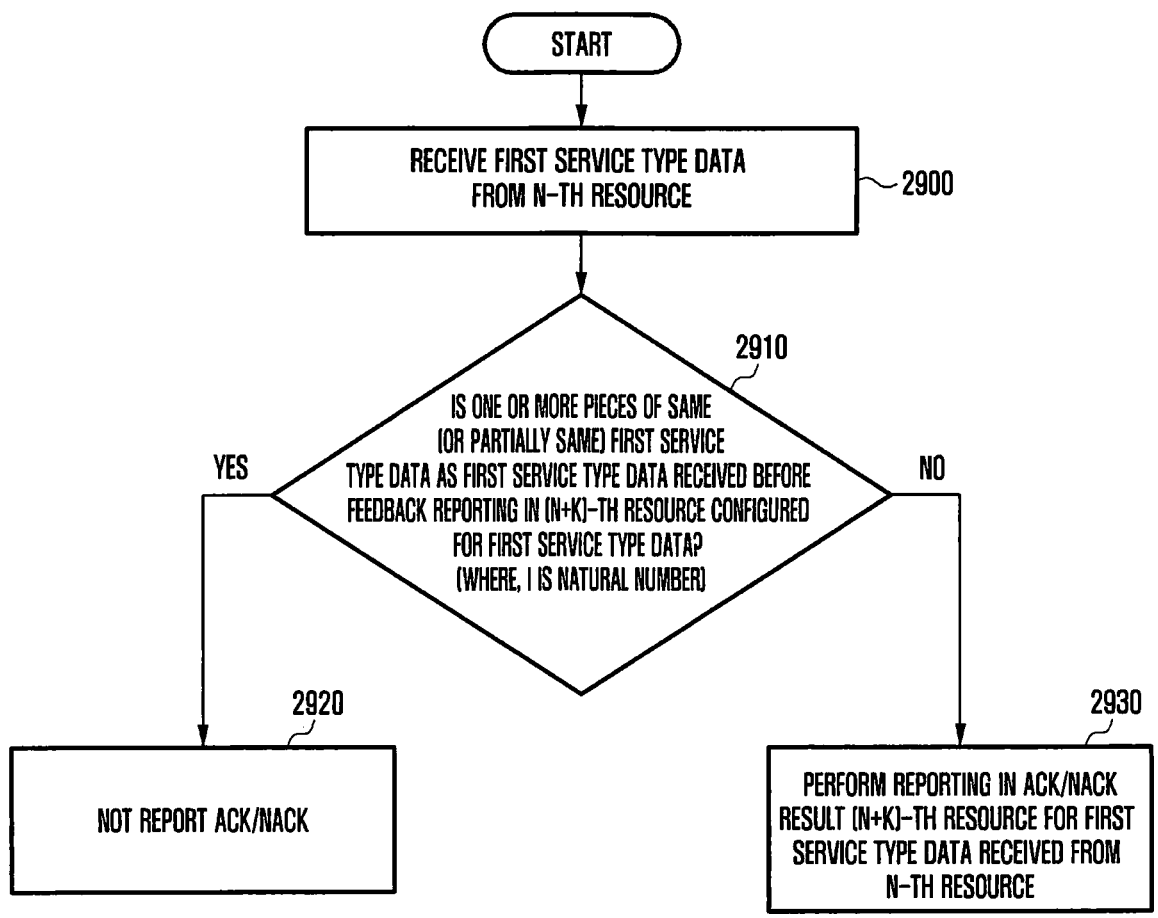
FIG. 29 is a diagram illustrating the operation of a terminal that receives additional data according to a second-7 embodiment.

FIG. 29 is a diagram illustrating the operation of a terminal that receives additional data according to a second-7 embodiment.

In FIG. 29, in operation 2900, a terminal receives first service type data from an N-th resource. Next, in operation 2910, the terminal determines whether at least i pieces of the same (partially the same) first service type data as the first service type data are received before feedback reporting in the (N+k)-th resource configured for the first service type data. The process described in the second-5 embodiment is equally applicable to the above-described determination method. If the same data is received i times or more (where i is a natural number) based on the determination result, the terminal does not perform ACK/NACK reporting on the reception of the corresponding data in operation 2920. If the same data is not received i times or more (where i is a natural number) based on the determination result, the terminal performs ACK/NACK reporting on the reception of the corresponding data in the (N+k)-th resource in operation 2930. Alternatively, if the same data is not received i times or more (where i is a natural number) based on the determination result, the terminal performs ACK/NACK reporting on the reception of the corresponding data in the (N+n+k')-th resource in operation 2930. Alternatively, if the same data is not received i times or more (where i is a natural number) the determination result, the terminal performs ACK/NACK reporting on the reception of the corresponding data in the (N+k)-th resource and the (N+n+k')-th resource, respectively, in operation 2930. Here, n is a value smaller than k and a resource value in which additional transmission after first transmission of the data is performed. If the same data is transmitted a plurality of times, n is a resource value of the last transmitted data. Also, k' is a feedback resource value of the first service type data scheduled in the (N+n)-th resource. For example, if the transmission of the data is repeated transmission, the terminal does not perform ACK/NACK reporting on the transmission of the corresponding data. On the other hand, if the transmission of the data is single transmission, the terminal reports the transmission result of the corresponding data to the HARQ ACK/NACK result reporting resource (or timing) determined in the conventional manner.

Second-8 Embodiment

Figure 30:
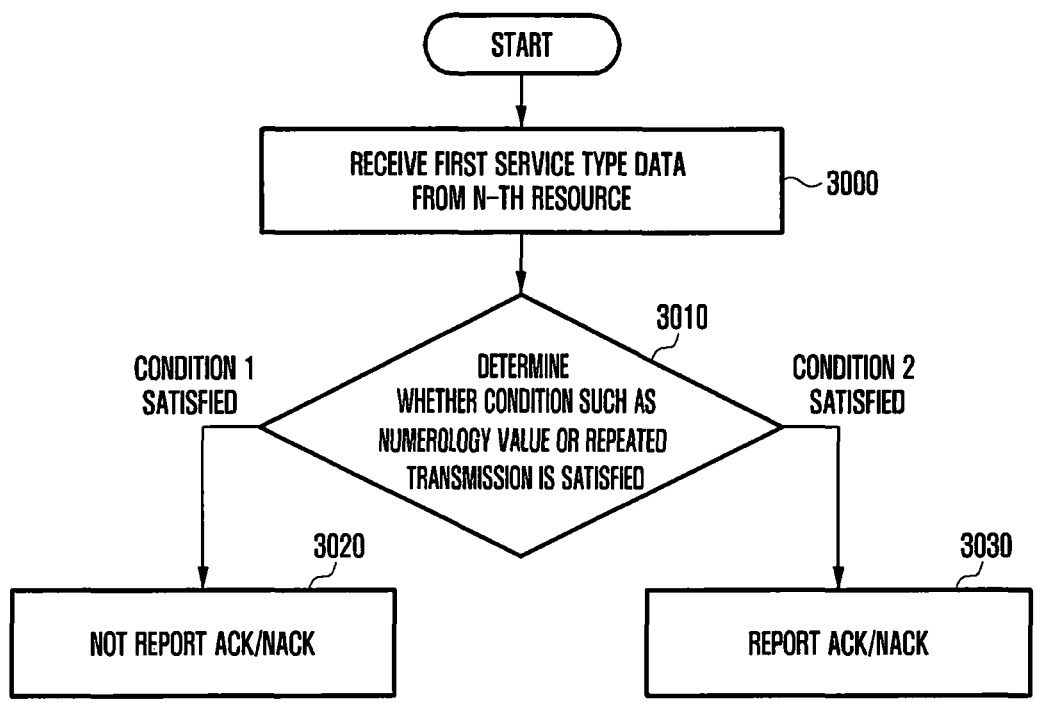
FIG. 30 is a diagram illustrating the operation of a terminal that receives data of a first service type according to a second-8 embodiment.

FIG. 30 is a diagram illustrating the operation of a terminal that receives data of a first service type according to a second-8 embodiment.

In FIG. 30, in operation 3000, a terminal receives first service type data from an N-th resource. In operation 3010, the terminal determines numerology to which data of the first service type is transmitted or whether repeated transmission is performed. The numerology may be a subcarrier spacing value, a TTI length (the number of symbols in the TTI), a maximum TB size, or a maximum timing advance (TA) value, a maximum transmission (Tx) processing time, a maximum reception (Rx) processing time, or a combination thereof. The TTI is a set of symbols transmitted using the above-mentioned numerology, as a unit in which the data of the first service type is transmitted. If the terminal satisfies a condition 1, the terminal does not perform ACK/NACK reporting on the reception of the first service type in operation 3020. For example, if the numerology is 15 kHz and the number of symbols in the TTI is 2, the terminal does not perform ACK/NACK reporting on the reception of the first service type data. The above condition 1 may include the following cases.

Subcarrier interval value (or set of values)
The number of symbols constituting the TTI (or set of symbols)
Maximum TB size
Maximum TA value
Maximum Tx processing time
Maximum Rx processing time
Whether the same (or partial) data is repeatedly transmitted
Combination of the above cases (or combination of some thereof)

In the example of the above cases, the maximum TB size denotes the size of a maximum transmission block that the can be transmitted from the corresponding base station to the terminal. The maximum TA value denotes an allowable timing advance value between the terminal and the base station. The maximum Tx processing time denotes the time required for a preprocessing process (for example, including modulation and decoding) for the base station or the terminal to send data to the other party. The maximum Rx processing time denotes the time required for post-processing (for example, including demodulation and decoding) data that is received by the base station or the terminal from the other party. The configured information of the above cases may be determined by the terminal through terminal group control information (or UE-specific control information) first transmitted together with the data of the first service type. Alternatively, the above information may be determined in advance by the terminal through higher layer signaling such as SIB, RRC, or MAC CE. Alternatively, the above information may be predetermined between the base station and the terminal in advance from the beginning of the system.

If the terminal satisfies a condition 2, the terminal performs ACK/NACK reporting on the reception of the corresponding first service type data in operation 3030. The above condition 2 may correspond to cases below. Also, among the cases below, whether the same (partial) data is repeated transmitted may be determined through field information (or field information configured through higher layer signaling) configured in the control information indicating initial transmission of the corresponding data. Alternatively, if the terminal receives the same (or partially the same) data before ACK/NACK feedback reporting resource corresponding to the initial transmission of the corresponding data, the terminal may determine that the corresponding data is repeatedly transmitted.

Subcarrier interval value (or set of values)
The number of symbols constituting the TTI (or set of symbols)
Maximum TB size
Maximum TA value
Maximum Tx processing time
Maximum Rx processing time
Whether the same (or partial) data is repeatedly transmitted
Combination of the above cases (or combination of some thereof)

Among these, in the case of whether the same (or partial) data is repeated transmitted, if the reception of the first service type data is first performed in the N-th resource, and then the final reception of the same data of the first service type is performed in the (N+n)-th resource, an ACK/NACK reporting resource reference value for the corresponding data may be the (N+n)-th resource other than the N-th resource. For example, the ACK/NACK reporting resource value may be N+k with respect to the initially transmitted N-th resource while the above plurality of pieces of data are repeatedly transmitted, or may be N+n+k' with respect to the last transmitted (N+n)-th resource while the above plurality of pieces of data are repeatedly transmitted. Alternatively, if the fact that the data of the first service type is repeatedly transmitted is initially configured by the base station with respect to the terminal, the terminal may determine that the (N+k)-th resource is the ACK/NACK reporting resource for the repeatedly transmitted data.

Alternatively, if the same transmission is performed of the above data (part thereof) before the ACK/NACK reporting resource having the (N+k) value in a situation where the fact that the data of the first service type is repeatedly transmitted is not initially configured by the base station with respect to the terminal, the terminal may perform reception result reporting on the data to the ACK/NACK resource corresponding to the same transmission of the data (or part thereof) that has been lastly transmitted (or most recently transmitted) before the (N+k)-th resource. For example, if receiving the last same data from the (N+n)-th resource before the (N+k)-th resource, the terminal performs reception result reporting on the data in the (N+n+k')-th resource that is the ACK/NACK reporting resource for the data received from the (N+n)-th resource, and ignores the ACK/NACK reporting resource for the same data before the previously configured (N+n+k')-th resource in addition to the previously configured (N+k)-th resource. Here, k and k' which are parameters indicating the ACK/NACK reporting timing (or resource) may be adaptively configured in the control information associated with the data of the first service type. Also, k and k' may be configured by higher layer signaling. In this situation, k and k' may have the same value (or different values) until receiving new higher layer signaling configuration.

The configured information of the above case may be determined by the terminal through terminal group control information (or UE-specific control information) first transmitted together with the data of the first service type. Alternatively, the configuration information may be determined in advance by the terminal through higher layer signaling such as SIB, RRC, or MAC CE. Alternatively, the configuration information may be predetermined between the base station and the terminal in advance from the beginning of the system.

In addition, if a plurality of pieces of data of the same first service type is transmitted from the base station to the terminal before HARQ ACK/NACK feedback reporting on the data of the first service type, the terminal may assumed that a value (or a value predetermined by higher layer signaling or a system initial configuration value) indicated by the control information of the first service type associated with the data of the first service type which has been most recently transmitted among them is the HARQ ACK/NACK feedback resource for the data of the first service type.

The result reported through the feedback resource may be the result obtained by demodulating and decoding the data of the first service type which has been most recently transmitted, the result obtained by demodulating and decoding all of the transmitted same data of the first service type after performing HARQ combining on the same, or the result obtained by demodulating and decoding a part of the transmitted same data of the first service type after performing HARQ combining (or partial HARQ combining) on the same. As to the partial HARQ combining, since the data information of the first service type which is not actually transmitted due to the resource allocated to the control and data information of the second service type and the resource region thereof are not included at the time of HARQ combining, this can be referred to as partial HARQ combining. For example, in a case in which the data information of the first service type is briefly divided into A, B, and C in code block units or (time and/frequency) resource region units, in a situation where B is not transmitted due to the control and then data information of the second service type and A, B, and C are transmitted later, the terminal performs HARQ combining on the remaining A and C except for B to perform demodulation and decoding, and performs demodulation and decoding only on B that is transmitted later (however, if A and C have already successfully demodulated and decoded, this operation may not be further performed). That is, HARQ combining is required to be performed only on code blocks damaged due to a channel, and performance degradation may occur when performing HARQ combining on data damaged such that the control and data of the second service type other than the channel occupy the resources.

The configuration information or values thereof which are criteria of the above-described determination may be configured through higher layer signaling such as SIB, MAC CE, or RRC before the corresponding operation starts. Also, the configuration information or values thereof may be configured through group common control information or UE-specific control information before the corresponding operation starts. Also, the determination and implementation operation configured in a combination of the above embodiments are also applicable. Further, the concept, determination condition, or operation method applied in the above embodiments is applicable to other embodiments of the disclosure.

In addition, the above embodiments are also applicable even when the plurality of pieces of data information of the first service type can be transmitted in a plurality of bundles. For example, assuming that three different transmission blocks are transmitted through each slot (transmission in a total of three slots) as a slot-aggregation transmission, if a second transmission block belonging to a second slot is punctured by the control information and data information of the second service type, the base station may perform addition transmission on only the second transmission block through an additional slot before receiving the ACK/NACK feedback report for the slot-aggregation transmission after the completion of the slot-aggregation transmission.

At this time, when the terminal confirms the second transmission block in the additionally transmitted slot, two operations are possible. First, when multiplexing ACK/NACK for the transmission blocks transmitted through the slot-aggregation transmission, the terminal may report the ACK/NACK through the use of another PUCCH or another PUSCH resource only for the transmission block punctured by the control information and data information of the second service type. That is, the ACK/NACK reporting resource for other transmission blocks which are not punctured by the control information and data information of the second service type are not changed. Second, when bundling the ACK/NACK for the transmission blocks transmitted through the slot-aggregation transmission, the terminal determines whether the ACK/NACK bundled including the results obtained by receiving, demodulating, and decoding the additionally transmitted transmission block is transmitted using the existing ACK/NACK bundling resource according to a relationship {n, k, k'} as in the second-2 embodiment, the second-3 embodiment, or the second-4 embodiment, or transmitted using the ACK/NACK bundling resource indicated by the control information transmitted together with the additionally transmitted transmission block. Here, (partial) HARQ combining may be performed on the additionally transmitted transmission block together with the previously transmitted block to perform demodulation and decoding. Alternatively, the previously transmitted transmission block may be discarded and only a newly additionally transmitted transmission block may be demodulated or decoded.

Second-9 Embodiment

Figure 31:
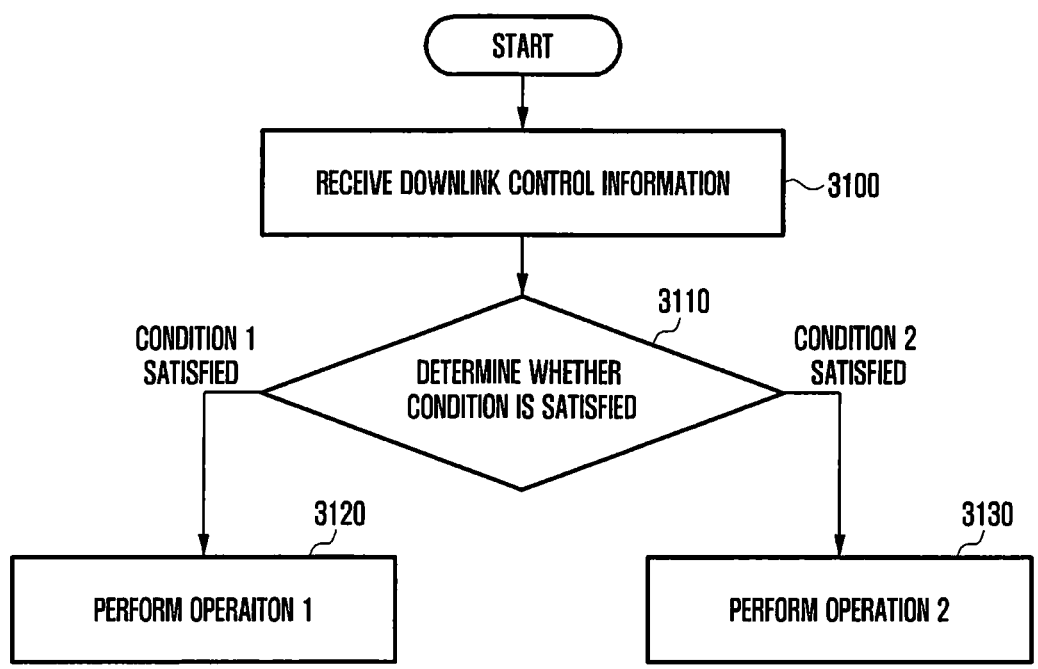
FIG. 31 is a diagram illustrating the operation of a terminal that receives downlink control information according to a second-9 embodiment.

FIG. 31 is a diagram illustrating the operation of a terminal that receives downlink control information according to a second-9 embodiment.

In FIG. 31, in operation 3100, a terminal receives downlink control information through a terminal group common, UE common, or UE-specific downlink control channel. A time point when the downlink control information is received is X. When the downlink control information indicates a resource to transmit uplink data or a resource to receive downlink data, the terminal identifies an HARQ process number associated with uplink or downlink data scheduling included in the corresponding control information. The terminal determines whether the uplink or downlink data resource that has been scheduled in control information Z that has been most recently applied as the HARQ process number is actually processed or used. Alternatively, the terminal identifies a time point Y for the use of the uplink or downlink data resource scheduled in the control information Z that has been most recently applied as the HARQ process number. Next, the terminal determines whether the following condition 1 or condition 2 is satisfied in operation 3110.

The condition 1 is applied to a case in which the uplink or downlink data resource scheduled in the control information Z that has been most recently applied as the HARQ process number is actually processed, or the time point Y of the use of the uplink or downlink data resource scheduled in the control information Z that has been most recently applied as the HARQ process number is earlier than X. That is, this means a case in which another uplink data transmission having the same HARQ process number is not scheduled before uplink data transmission scheduled by specific control information is performed, or downlink data transmission having another identical HARQ process number is not scheduled before feedback information transmission (uplink transmission) on downlink data transmission scheduled by specific control information is performed.

The condition 2 is applied to a case in which the uplink or downlink data resource scheduled in the control information Z that has been most recently applied as the HARQ process number is not actually processed, or the time point Y of the use of the uplink or downlink data resource scheduled in the control information Z that has been most recently applied as the HARQ process number is equal to or slower than X. That is, this means a case in which uplink data transmission having another identical HARQ process number is scheduled before uplink data transmission scheduled by specific control information is performed, or downlink data transmission having another identical HARQ process number is scheduled before feedback information transmission (uplink transmission) on downlink data transmission scheduled by specific control information is performed.

If the condition 1 is satisfied, the terminal performs operation 1 in 3120. Operation 1 is as follows.

1. The terminal follows an operation indicated by the downlink control information received through the terminal group common, terminal common, or UE-specific downlink control channel.

If the condition 2 is satisfied, the terminal performs operation 2 in 3130. Operation 2 may be composed of one or a combination of two or more of the following.

1. The terminal follows an operation indicated by the downlink control information received through the terminal group common, terminal common, or UE-specific downlink control channel.

2. The uplink or downlink data resource scheduled in the control information Z that has been most recently applied as the HARQ process number is not processed (or ignored or omitted). That is, the terminal does not perform the corresponding downlink or uplink data scheduling.

3. The uplink or downlink data resource scheduled in the control information Z that has been most recently applied as the HARQ process number is processed.

Alternatively, the following situation may be additionally considered.

Information indicating the fact that a part of the downlink data resource region for the first type service, which is identified by the terminal receiving downlink data for the first type service (e.g., eMBB service) through the downlink control information reception in 3100, has been used for data for a second service type (e.g., URLLC service) may be received through a terminal common, cell common, UE-specific, or terminal group common downlink control channel. This is called a second type service occurrence indicator (or a preemption indication or a data puncturing area indicator for a first type service). This is called a second type service occurrence indicator (or a preemption indication or a data puncturing region indicator for a first type service).

If receiving the corresponding information (e.g., if the control information is detected by a specific RNTI or the control information searching is successful), the terminal determines this as the condition 1. On the other hand, if does not receiving the corresponding information (e.g., if the control information is not detected by a specific RNTI or the control information searching is not successful), the terminal determines this as the condition 2. At this time, if the condition 1 is satisfied, the terminal performs operation 1. If the condition 2 is satisfied, the terminal performs operation 2.

Operation 1 may be one or a combination of two or more of the following.

1. The HARQ-ACK transmission resource configuration for the downlink data resource region for the received first type service is not changed. Alternatively, operation 1 follows the HARQ-ACK transmission resources for the downlink data resource region for the previously received first type service.

2. The HARQ-ACK transmission resource configuration for the downlink data resource region for the received first type service is changed, and the corresponding changed value is transmitted together with the control information including the second type service occurrence indicator.

3. The HARQ-ACK transmission resource configuration for the downlink data resource region for the received first type service is changed, and the corresponding changed value follows a value defined in the existing standard, or is transmitted to the terminal in advance by higher layer signaling such as SIB, RRC, or MAC CE.

4. The HARQ-ACK transmission resource configuration for the downlink data resource region for the received first type service is changed, and the corresponding changed value is transmitted to the terminal in advance by L1 signaling through the downlink control information.

5. The HARQ-ACK transmission resource configuration for the downlink data resource region for the received first type service is changed, and the corresponding changed value is a value obtained by adding a specific value from the time when the second type service occurrence indicator is transmitted. The specific value follows the value defined in the existing standard, or is transmitted to the terminal in advance by higher layer signaling such as SIB, RRC or MAC CE, or is transmitted to the terminal in advance by L1 signaling through the downlink control information. Alternatively, the specific value may be a difference between the downlink data resource region for the received first type service and the HARQ-ACK transmission resource region.

6. The HARQ-ACK transmission resource configuration for the downlink data resource region for the received first type service is changed, and the corresponding changed value is a value delayed by the time point at which the second type service occurrence indicator is transmitted.

Operation 2 may be one or a combination of two or more of the following.

1. HARQ-ACK transmission resource configuration for the downlink data resource region for the received first type service is not changed. Alternatively, operation 2 follows the HARQ-ACK transmission resources for the downlink data resource region for the previously received first type service.

Figure 32:
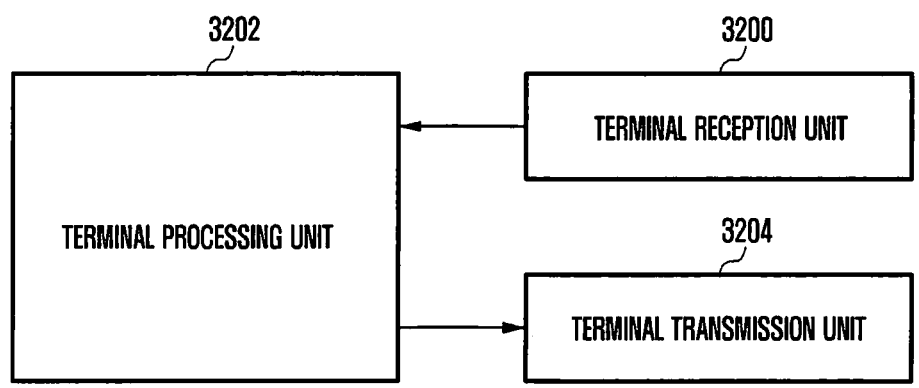
FIG. 32 is a block diagram illustrating a structure of a terminal according to embodiments of the disclosure.

FIG. 32 is a block diagram illustrating a structure of a terminal according to embodiments of the disclosure.

Referring to FIG. 32, a terminal of the disclosure may include a terminal reception unit 3200, a terminal transmission unit 3204, and a terminal processing unit 3202. The terminal reception unit 3200 and the terminal transmission unit 3204 may collectively be referred to as a transmission/reception unit. The transmission/reception unit may transmit and receive signals to and from the base station. The signals may include control information and data. To this end, the transmission/reception unit may include an RF transmitter for up-converting and amplifying the frequency of a transmitted signal and an RF receiver for low-noise amplifying a received signal and down-converting a frequency. Also, the transmission/reception unit may receive a signal through a wireless channel, output the signal to the terminal processing unit 3202, and transmit the signal output from the terminal processing unit 3202 through the wireless channel. The terminal processing unit 3202 may control a series of processes so that the terminal can operate according to the above-described embodiment.

Figure 33:
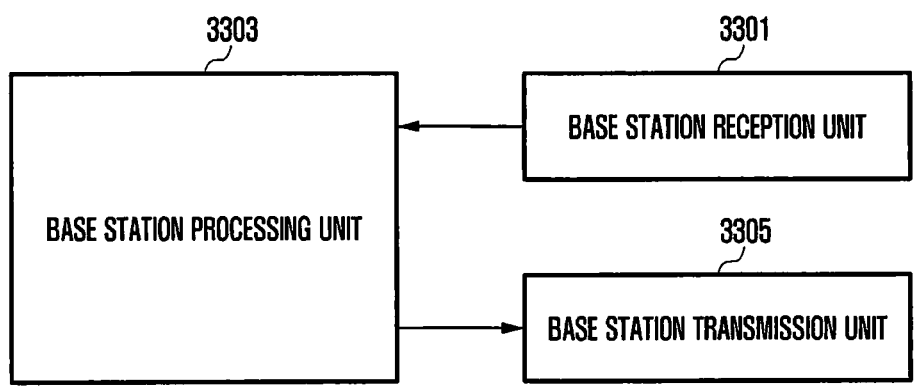
FIG. 33 is a block diagram illustrating a structure of a base station according to embodiments of the disclosure.

FIG. 33 is a block diagram illustrating a structure of a base station according to embodiments of the disclosure.

Referring to FIG. 33, a base station of the disclosure may include at least one of a base station reception unit 3301, a base station transmission unit 3305, and a base station processing unit 3303. The base station reception unit 3301 and the base station transmission unit 3305 may be collectively referred to as a transmission/reception unit in the embodiment of the disclosure. The transmission/reception unit may transmit and receive signals to and from a terminal. The signal may include control information and data. To this end, the transmission/reception unit may include an RF transmitter for up-converting and amplifying the frequency of a transmitted signal and an RF receiver for low-noise amplifying a received signal and down-converting a frequency. Also, the transmission/reception unit may receive a signal through a wireless channel, output the signal to the base station processing unit 3303, and transmit the signal output from the base station processing unit 3303 through the wireless channel. The base station processing unit 3303 may control a series of processes so that the base station can operate according to the above-described embodiment.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, some of the embodiments of the disclosure may be combined with each other so that the base station and the terminal can be operated. Further, although the above embodiments are described on the basis of the NR system, other modifications on the basis of the technical idea of the embodiment will be possible even in other systems such as an FDD or TDD LTE system, and the like.

The invention claimed is:

1. A method performed by a terminal in a wireless communication system, the method comprising:
   receiving, from a base station, a radio resource control (RRC) message configuring a first rate matching pattern and a second rate matching pattern, wherein the first rate matching pattern corresponds to first frequency resource information and first time resource information, and wherein the second rate matching pattern corresponds to second frequency resource information and second time resource information;
   receiving, from the base station, downlink control information (DCI) scheduling a physical downlink shared channel (PDSCH), the DCI including 2-bit information associated with rate matching; and
   receiving, from the base station, downlink data on the PDSCH based on the DCI,
   wherein a first bit of the 2-bit information corresponds to the first rate matching pattern and a second bit of the 2-bit information corresponds to the second rate matching pattern,
   wherein the first bit of the 2-bit information indicates whether a corresponding the first rate matching pattern is not available for the PDSCH and the second bit of the 2-bit information indicates whether the second rate matching pattern is not available for the PDSCH,
   wherein in case that the 2-bit information indicates the first rate matching pattern and the second rate matching pattern are not available for the PDSCH, a union of resources not available for the PDSCH is formed by the first rate matching pattern and the second rate matching pattern, based on the 2-bit information, and the downlink data is not mapped on the union of resources, and
   wherein the first frequency resource information and the first time resource information for the first rate matching pattern or the second frequency resource information and the second time resource information for the second rate matching pattern is determined based on frequency resource information and time resource information associated with a physical downlink control channel (PDCCH) resource respectively.

2. The method of claim 1, wherein the downlink data on the PDSCH is sequentially mapped on resources allocated by the DCI except for the union of the resources indicated as not available for the PDSCH, based on the 2-bit information.

3. The method of claim 1, wherein at least one of the first rate matching pattern and the second rate matching pattern is associated with a physical broadcast channel.

4. A method performed by a base station in a wireless communication system, the method comprising:
  transmitting, to a terminal, a radio resource control (RRC) message configuring a first rate matching pattern and a second rate matching pattern, wherein the first rate matching pattern corresponds to first frequency resource information and first time resource information, and wherein the second rate matching pattern corresponds to second frequency resource information and second time resource information;
  transmitting, to the terminal, downlink control information (DCI) scheduling a physical downlink shared channel (PDSCH), the DCI including 2-bit information associated with rate matching; and
  transmitting, to the terminal, downlink data on the PDSCH based on the DCI,
  wherein a first bit of the 2-bit information corresponds to the first rate matching pattern and a second bit of the 2-bit information corresponds to the second rate matching pattern,
  wherein the first bit of the 2-bit information indicates whether the first rate matching pattern is not available for the PDSCH and the second bit of the 2-bit information indicates whether the second rate matching pattern is not available for the PDSCH,
  wherein in case that the 2-bit information indicates the first rate matching pattern and the second rate matching pattern are not available for the PDSCH, a union of resources not available for the PDSCH is formed by the first rate matching pattern and the second rate matching pattern, based on the 2-bit information, and the downlink data is not mapped on the union of resources, and
  wherein the first frequency resource information and the first time resource information for the first rate matching pattern or the second frequency resource information and the second time resource information for the second rate matching pattern is determined based on frequency resource information and time resource information associated with a physical downlink control channel (PDCCH) resource respectively.

5. The method of claim 4, wherein the downlink data on the PDSCH is sequentially mapped on resources allocated by the DCI except for the union of the resources indicated as not available for the PDSCH, based on the 2-bit information.

6. The method of claim 4, wherein the at least one of the first rate matching pattern and the second rate matching pattern is associated with a physical broadcast channel.

7. A terminal in a wireless communication system, the terminal comprising:
  a transceiver configured to transmit and receive a signal; and
  at least one processor coupled with the transceiver and configured to:
    receive, from a base station, a radio resource control (RRC) message configuring a first rate matching pattern and a second rate matching pattern, wherein the first rate matching pattern corresponds to first frequency resource information and first time resource information, and wherein the second rate matching pattern corresponds to second frequency resource information and second time resource information,
    receive, from the base station, downlink control information (DCI) scheduling a physical downlink shared channel (PDSCH), the DCI including 2-bit information associated with rate matching, and
    receive, from the base station, downlink data on the PDSCH based on the DCI, wherein a first bit of the 2-bit information corresponds to the first rate matching pattern and a second bit of the 2-bit information corresponds to the second rate matching pattern,
  wherein the first bit of the 2-bit information indicates whether a the first rate matching pattern is not available for the PDSCH and the second bit of the 2-bit information indicates whether the second rate matching pattern is not available for the PDSCH,
  wherein in case that the 2-bit information indicates the first rate matching pattern and the second rate matching pattern are not available for the PDSCH, a union of resources not available for the PDSCH is formed by the first rate matching pattern and the second rate matching pattern, based on the 2-bit information, and the downlink data is not mapped on the union of resources, and
  wherein the first frequency resource information and the first time resource information for the first rate matching pattern or the second frequency resource information and the second time resource information for the second rate matching pattern is determined based on frequency resource information and time resource information associated with a physical downlink control channel (PDCCH) resource respectively.

8. The terminal of claim 7, wherein the downlink data on the PDSCH is sequentially mapped on resources allocated by the DCI except for the union of the resources indicated as not available for the PDSCH, based on the 2-bit information.

9. The terminal of claim 7, wherein the at least one of the first rate matching pattern and the second rate matching pattern is associated with a physical broadcast channel.

10. A base station in a wireless communication system, the base station comprising:
  a transceiver configured to transmit and receive a signal; and
  at least one processor coupled with the transceiver and configured to:
    transmit, to a terminal, a radio resource control (RRC) message configuring a first rate matching pattern and a second rate matching pattern, wherein the first rate matching pattern corresponds to first frequency resource information and first time resource information, and wherein the second rate matching pattern corresponds to second frequency resource information and second time resource information,
    transmit, to the terminal, downlink control information (DCI) scheduling a physical downlink shared channel (PDSCH), the DCI including 2-bit information associated with rate matching, and
    transmit, to the terminal, downlink data on the PDSCH based on the DCI,
  wherein a first bit of the 2-bit information corresponds to the first rate matching pattern and a second bit of the 2-bit information corresponds to the second rate matching pattern,
  wherein the first bit of the 2-bit information indicates whether the first rate matching pattern is not available for the PDSCH and the second bit of the 2-bit information indicates whether the second rate matching pattern is not available for the PDSCH, wherein in case that the 2-bit information indicates the first rate matching pattern and the second rate matching pattern are not available for the PDSCH, a union of resources not available for the PDSCH is formed by the first rate matching pattern and the second rate matching pattern, based on the 2-bit information, and the downlink data is not mapped on the union of resources, and wherein the first frequency resource information and the first time resource information for the first rate matching pattern or the second frequency resource information and the second time resource information for the second rate matching pattern is determined based on frequency resource information and time resource information associated with a physical downlink control channel (PDCCH) resource respectively.

11. The base station of claim 10, wherein the downlink data on the PDSCH is sequentially mapped on resources allocated by the DCI except for the union of the resources indicated as not available for the PDSCH, based on the 2-bit information.

12. The base station of claim 10, wherein at least one of the first rate matching pattern and the second rate matching pattern is associated with a physical broadcast channel.

13. The method of claim 1, wherein the RRC message includes a cell common control message, and wherein the 2-bit information is included in the DCI with a specific format among a plurality of formats for scheduling the PDSCH.

14. The method of claim 4, wherein the RRC message includes a cell common control message, and wherein the 2-bit information is included in the DCI with a specific format among a plurality of formats for scheduling the PDSCH.

15. The terminal of claim 7, wherein the RRC message includes a cell common control message, and wherein the 2-bit information is included in the DCI with a specific format among a plurality of formats for scheduling the PDSCH.

16. The base station of claim 10, wherein the RRC message includes a cell common control message, and wherein the 2-bit information is included in the DCI with a specific format among a plurality of formats for scheduling the PDSCH.

* * * * *